US010883926B2

(12) United States Patent
Tajima

(10) Patent No.: US 10,883,926 B2
(45) Date of Patent: Jan. 5, 2021

(54) GENERAL-PURPOSE OPTICAL MEASURING DEVICE AND METHOD OF SAME

(71) Applicant: UNIVERSAL BIO RESEARCH Co., Ltd., Matsudo (JP)

(72) Inventor: Hideji Tajima, Matsudo (JP)

(73) Assignee: UNIVERSAL BIO RESEARCH CO., LTD., Chiba (JP)

( * ) Notice: Subject to any disclaimer, the term of this patent is extended or adjusted under 35 U.S.C. 154(b) by 81 days.

(21) Appl. No.: 16/091,287

(22) PCT Filed: Apr. 7, 2017

(86) PCT No.: PCT/JP2017/014590
§ 371 (c)(1),
(2) Date: Oct. 4, 2018

(87) PCT Pub. No.: WO2017/175871
PCT Pub. Date: Oct. 12, 2017

(65) Prior Publication Data
US 2019/0120752 A1 Apr. 25, 2019

(30) Foreign Application Priority Data

Apr. 8, 2016 (JP) ................................ 2016-078452

(51) Int. Cl.
*G01N 21/27* (2006.01)
*G01N 21/01* (2006.01)
(Continued)

(52) U.S. Cl.
CPC ........... *G01N 21/272* (2013.01); *G01N 21/01* (2013.01); *G01N 21/03* (2013.01); *G01N 21/253* (2013.01);
(Continued)

(58) Field of Classification Search
CPC ...... G01N 21/01; G01N 21/03; G01N 21/253; G01N 21/27; G01N 21/272; G01N 21/64;
(Continued)

(56) References Cited

U.S. PATENT DOCUMENTS 5,919,706 A   7/1999  Tajima
6,083,763 A   7/2000  Balch
(Continued)

FOREIGN PATENT DOCUMENTS

EP    0136002       1/1989
JP    2004205415 A  7/2004
JP    2012047719 A  8/2012

OTHER PUBLICATIONS

European Search Report for EP 17779248, dated Oct. 23, 2019.
(Continued)

*Primary Examiner* — Hina F Ayub
(74) *Attorney, Agent, or Firm* — Andrus Intellectual Property Law, LLP

(57) ABSTRACT

A general-purpose optical measuring device enables at least measurement of a nucleic acid amplification amount; detection or quantitative measurement by a nucleic acid detection method, an immunoassay method, an enzyme method; or measurement of concentration or absorbance, and a method of the same. There are included a photometric content designation unit, an irradiation reception pair including an emission end that can emit measurement light, and a reception end that can receive light from the emission end, a photometric container that can store measurement target chemical substance solution, and includes a bottom portion having a formed translucent region, a nozzle communicated with a suction discharge mechanism of gas, a flow tube, an optical measurement unit, and a control unit configured to suck and hold the chemical substance solution into the flow (Continued)

tube, or store the chemical substance solution into the photometric container.

17 Claims, 20 Drawing Sheets

(51) Int. Cl.
    *G01N 21/25*      (2006.01)
    *G01N 21/64*      (2006.01)
    *G01N 21/03*      (2006.01)
    *G01N 21/76*      (2006.01)
    *G01N 35/10*      (2006.01)

(52) U.S. Cl.
    CPC ............. *G01N 21/27* (2013.01); *G01N 21/64* (2013.01); *G01N 21/645* (2013.01); *G01N 21/6428* (2013.01); *G01N 21/76* (2013.01); *G01N 35/1065* (2013.01)

(58) Field of Classification Search
    CPC .. G01N 21/6428; G01N 21/645; G01N 21/76; G01N 35/1065
    See application file for complete search history.

(56) References Cited

U.S. PATENT DOCUMENTS

| | | |
|---|---|---|
| 6,396,584 B1 | 5/2002 | Taguchi et al. |
| 2004/0023249 A1 | 2/2004 | Balch |
| 2008/0285025 A1 | 11/2008 | Adachi |
| 2010/0283995 A1* | 11/2010 | Durrer ................. G01N 21/272 356/73 |
| 2013/0183769 A1 | 7/2013 | Tajima |
| 2014/0186238 A1 | 7/2014 | Holmes et al. |
| 2015/0309059 A1 | 10/2015 | Tajima |
| 2016/0025722 A1 | 1/2016 | Tajima |

OTHER PUBLICATIONS

International Search Report issued by the Japan Patent Office for International Application No. PCT/JP2017/014590 dated Jul. 4, 2017, 2 pages.

Written Opinion issued by the Japan Patent Office for International Application No. PCT/JP2017/014590 dated Jul. 4, 2017, 5 pages.

* cited by examiner

GENERAL-PURPOSE OPTICAL MEASURING DEVICE AND METHOD OF SAME

CROSS REFERENCE

This application is a United States national phase application of co-pending international patent application number PCT/JP2017/014590, filed Apr. 7, 2017, which claims priority to Japanese patent application number 2016-078452, filed Apr. 8, 2016, the entire disclosures of which are hereby incorporated herein by reference.

TECHNICAL FIELD

The present invention relates to a general-purpose optical measuring device that can perform optical measurement of various chemical substance solutions to be measured, according to various types of measurement content, and a method of the same.

BACKGROUND ART

For chemical substance solution containing chemical substances such as various biological macromolecules such as nucleic acid and protein, in the case of measuring various physicochemical amounts such as, for example, an amount, concentration, absorbance, viscosity, a dispersion degree, a sedimentation rate, macromolecule molecular weight, an immunizing antigen amount, and a nucleic acid amplification amount, or, various physicochemical characters such as, for example, existence or non-existence of an immune antibody, existence or non-existence of target nucleic acid or a fraction thereof, existence or non-existence of target protein, existence or non-existence of target virus, and existence or non-existence of a target bacterium, the measurement has been conventionally performed by preparing a dedicated device.

For example, for measuring absorbance of chemical substance solution containing a chemical substance such as various biological macromolecules such as nucleic acid and protein, the solution is stored in a quartz cell serving as a target, measurement light of predetermined wavelength λ that can be transmitted through the quartz cell, and can be absorbed by the chemical substance (here, used as light to be emitted onto a measurement target for obtaining light to be detected. For example, absorbance measurement light, excitation light, etc.) is vertically emitted onto a predetermined side surface of the quartz cell, a ratio between incident light intensity $I_0$ and transmitted light intensity I (transmissivity) is measured, and absorbance $A_\lambda$ is obtained by $A_\lambda = -\log_{10}(I/I_0)$.

For example, in the case of measuring absorbance of a biological macromolecule substance such as nucleic acid, as a chemical substance, as light of wavelength that can be absorbed by the nucleic acid, ultraviolet around 260 nm is used as measurement light. This is because a base constructing nucleic acid of DNA, RNA, or oligonucleotide has an absorption peak around there. In addition, generally, also in the case of measuring absorbance for various solutions (including slurry) of various biological macromolecule substances such as protein in addition to nucleic acid, living tissue, a colloid substance, an agglutination of various substances, or various solids, measurement light having suitable wavelength is necessary, and it has been necessary to prepare a dedicated device that can emit the measurement light.

Meanwhile, in the case of horizontally emitting/receiving measurement light used according to various types of measurement content, from the outside of a container or the like that stores measurement target chemical substance solution, through side walls of the container, the measurement light passes through two side walls, and even if the side walls are transparent member, there is a concern that absorption of the measurement light cannot be ignored. In addition, aside from reflection, refraction, and absorption on the side walls, aside from light absorption of a measurement target in the container, the measurement light is subjected to absorption, scattering, refraction, and the like that are caused by solution. Thus, the measurement light is lost due to reasons other than light absorption, and a correct measurement result may fail to be obtained.

For reducing such influence of the side walls of the container on measurement light, an optical member of an optimum container has been used according to measurement light to be used. For example, in the case of measuring the absorbance, because glass often used as material of an optical component prominently increases in absorbance coefficient and rapidly decreases in transmissivity in a wavelength region of ultraviolet, and is difficult to be used, a dedicated optical component that uses particular materials is used (e.g. quartz glass [usable in wavelength 200 nm or more], calcium fluoride, magnesium fluoride [usable in 150 nm or more]), solution serving as a measurement target is stored into a cell container formed of these material, measurement light is emitted onto side surfaces using an emission end and a reception end that are provided on the side surfaces so as to sandwich the container, and absorbance has been thereby measured. Nevertheless, these materials are expensive, and in addition to having a possibility of leading to an increase in manufacturing cost of a device, there is such a problematic point that an optical path length may be limited to an interval between facing side walls of the container in the case of horizontal measurement, and an optical path length may be limited by the size of the container and an amount of liquid in the case of vertical measurement.

If the optical path length is limited, it may be difficult to employ an appropriate optical path length, and enhance measurement accuracy. For example, when the intensity of measurement light is assumed to remain the same, if transmissivity of measurement target solution is low (concentration is high), by shortening an optical path length is shortened, and if the transmissivity is high (if concentration is low), by elongating an optical path length, measurement accuracy can be enhanced, and there has been such a problematic point that, particularly in a case where an amount of the measurement target solution is a small amount, a cell container for measurement cannot be filled, and a defined optical path length may fail to be obtained.

Thus, the inventor of the subject application has invented a cartridge container provided with wells having a plurality of types of shapes that have a plurality of types of optical path lengths, and enables the plurality of types of optical path lengths to be used according to measurement targets. In this case, if the number of types of optical path lengths is increased, the shape of the container may become complicated, and the size of the container may be expanded.

On the other hand, in the case of performing measurement inside a container without performing measurement on the outside of a container that stores solution, because an optical path that is not interrupted by a wall surface of the glass container, or an optical path that does not sandwich the glass container wall surface is defined, measurement can be performed without using a dedicated optical component such as quartz glass. On the other hand, with respect to a glass container storing solution, an emission end from which measurement light is emitted, and a reception end that receives transmitted light transmitted through are immersed into the solution, and absorbance is measured. In this case, because the emission end and the reception end contact measurement target solution, cross-contamination may be caused, and there is such problematic points that increases in cost and burden are caused by using the emission end and the reception end as disposal, a fluid amount required for measurement increases, and a structure of a measurement device may be complicated and large-scale.

The inventor has conceived that, if a device or a method that can solve these problematic points is discovered, because the device or the method can be applied to various measurement having light with various wavelengths, various fluid amounts, and various processing steps, there is a possibility that optical measurement can be performed for various types of measurement content, not only for simply obtaining absorbance and concentration.

CITATION LIST

Patent Literature

Patent Literature 1: WO 2012/036296 A
Patent Literature 2: JP 2004-205415 A

SUMMARY OF INVENTION

Technical Problem

The present invention has been devised for solving the above problematic points, and the first object thereof is to provide a general-purpose optical measuring device that can eliminate the use of dedicated devices in the number and types that correspond to content to be measured, and can draw, using one device, using a common sample or a sample derived from the common sample, (big) data in various fields related to the sample, in a small-scale device, easily, high-accurately, efficiently, and promptly, by enabling one device to perform measurement for obtaining various physicochemical amounts and various physicochemical characters that has been conventionally performed using dedicated devices in different fields such as gene analysis, gene amplification, immunoassay, absorbance analysis, concentration measurement, and enzyme detection, using one or a plurality of types of samples serving as a measurement target that are stored in one or a plurality of containers, and a method of the same.

The second object thereof is to provide a general-purpose optical measuring device that can consistently perform processing including preprocessing such as extraction from the sample and amplification of a measurement target chemical substance such as nucleic acid, optical measurement for a physicochemical character or amount of the solution, and furthermore, postprocessing such as adjustment of concentration, and can concurrently perform a plurality of processes for a plurality of measurement targets, by providing an emission end or a reception end on a nozzle or a suction discharge mechanism, without changing a basic form and a basic function thereof, using a nozzle and a suction discharge mechanism that are common to normal dispensing processing, without providing a nozzle or a dedicated component that is dedicated for photometric processing, separately from the dispensing processing, and without thereby interrupting the suction discharge function, and a method of the same.

The third object thereof is to provide a general-purpose optical measuring device that can suppress a fluid amount required for measurement, by storing or holding measurement target solution into a shape having a cross section that measurement light can pass through, and can perform highly-accurate various measurements for measurement targets with various fluid amounts using various wavelengths, by excluding or minimizing a member such as a wall of a container that blocks the measurement light, and eliminating or reducing optical influence of the member on the measurement light, and a method of the same.

The fourth object thereof is to provide a general-purpose optical measuring device that can emit measurement light having appropriate wavelength, by defining an appropriate optical path length for chemical substance solution with various fluid amounts (including slurry in which the chemical substance is dispersed) that contains various chemical substances such as a macromolecule substance having various molecular weights and sizes, solid, bubbles, gas, or liquid, and enables highly-versatile measurement for measurement content of various chemical substance solutions, and a method of the same.

The fifth object thereof is to provide a general-purpose optical measuring device that can measure a physicochemical character or amount of various solutions containing chemical substances, without using various dedicated optical components or the like that can let through light having various wavelengths such as ultraviolet, or by using such components only in minimum portions, can be manufactured at low cost, and can prevent expansion of a device scale, and a method of the same.

The sixth object thereof is to provide a general-purpose optical measuring device that can prevent cross-contamination, and can measure a physicochemical character or amount of solution with high reliability and accuracy, and a method of the same.

The first invention is a general-purpose optical measuring device including a photometric content designation unit configured to designate photometric content for chemical substance solution serving as a target of any of at least measurement of an amplification amount by a nucleic acid amplification method; detection or quantitative measurement by a nucleic acid detection method, an immunoassay method or an enzyme method; or measurement of concentration or absorbance, one or two or more irradiation reception pairs each including an emission end that can emit measurement light defined by the designated photometric content, and a reception end that can receive at least light emitted from the emission end, one or two or more photometric containers that can store the chemical substance solution, and include a bottom portion having a formed translucent region translucent to the measurement light, one or two or more nozzles communicated with a suction discharge mechanism configured to perform suction and discharge of gas, one or two or more flow tubes each having, at a lower end, a port portion that can be inserted into the photometric container, and being detachably attached to the nozzle at an upper end, an optical measurement unit configured to supply measurement light to the emission end, and obtain intensity of light received at the reception end, and a control unit configured to control, based on the photometric content, at least the suction discharge mechanism and the optical measurement unit, suck and hold the chemical substance solution into the flow tube attached to the nozzle, or store the chemical substance solution into the photometric container, and derive a physicochemical character or numerical value that is related to the chemical substance solution, based on intensity of light received at the reception end, and in the general-purpose optical measuring device, one element of the irradiation reception pair is provided on the nozzle or the suction discharge mechanism, and the translucent region of the photometric container is installed on an upper side of the other element of the irradiation reception pair.

Here, the "chemical substance" corresponds to a substance used for chemical reaction, and particularly to a biochemical substance such as, for example, a genetic substance such as nucleic acid, protein such as an immune substance, a sugar group, peptide, or the like. The "flow tube" includes a dispensing flow tube that performs agitation of liquid in one liquid storing unit, move of liquid between a plurality of liquid storing units, and dispensing, by suction and discharge of liquid, and a photometric flow tube in which intensity of transmitted light is measured according to a vertical direction, for solution sucked thereinto. It is preferable that a side wall portion of the photometric flow tube is formed of a black substance serving as a shielding member, or translucent material is coated with black paint, thereby shielding outside light, for example. The "outside light" is mainly visible light or ultraviolet, and in the case of being formed of a black substance, the photometric flow tube is formed by performing molding after kneading black pigment into resin. In some cases, the dispensing flow tube and the photometric flow tube can both have a function of itself and a function of the other. It is preferable that because the flow tube is detachably attached to the nozzle, a detaching mechanism that detaches the flow tube from the nozzle is provided on a nozzle head to be described later, for example, and a flow tube storing unit in which the flow tube is attachably stored by the lowering of the nozzle is provided in the storing unit group.

In addition, it is preferable that the flow tube is formed so as to be shielded from outside light, the lower end portion of the flow tube can be inserted or loosely inserted into the photometric container from the above, a cylindrical concave portion formed at a substantially center of the bottom portion of the photometric container is included, the translucent region is formed in a thin bottom portion of the concave portion, and a thin side wall portion of the concave portion is formed so as to be shielded from the outside light.

In this case, the entire optical path passing through chemical substance solution serving as a measurement target can be shielded, entry of outside light into the optical path can be prevented, and highly-accurate measurement can be performed. In addition, the concave portion is formed into a thin cylindrical shape having an opening portion having a cross-sectional area sufficiently smaller than an opening portion of the photometric container into which a lower end portion of the flow tube can be inserted or loosely inserted. Here, it is preferable that the thin bottom portion of the concave portion is closely attached or contacted to a reception end surface of the reception end not via an air layer so as to be connected optically thereto. An optical path length can be thereby set from an upper end surface of liquid stored in the flow tube, to the reception end, not via the air layer. The "substantially center" is preferably the center.

The "photometric content" includes a photometric process defined from measurement content, and/or a physicochemical character or numerical value to be obtained as a result of photometry. For example, the photometric content is the number of samples, content of samples, the type of measurement such as, for example, measurement of absorbance, measurement of real-time PCR of nucleic acid, the type of measurement simultaneously performed, and measurement of concentration, the type of a label substance, and the like. The "measurement" includes, for example, measurement of an amplification amount by a nucleic acid amplification method regarding nucleic acid serving as a biochemical substance; detection or quantitative measurement of a biochemical substance by a nucleic acid detection method, an immunoassay method (immunoassay) or an enzyme method; or measurement of concentration or absorbance of biochemical substance solution. The "nucleic acid amplification method" includes, for example, a polymerase chain reaction (PCR) method, a loop-mediated isothermal amplification (LAMP) method, a ligase chain reaction (LCR) method, a strand displacement amplification (SDA) method, a transcription mediated amplification (MTD) method, and the like. In the "nucleic acid detection method", detection of target nucleic acid that uses complementarity is performed in some cases. The "enzyme method" is an examination method of measuring a target substance or a reaction product by causing specific bonding using specific enzyme, and the "immunoassay method" is an examination method of antigen or antibody protein that uses antigen-antibody reaction. In addition to this, the "measurement" includes a colorimetric method, a turbidimetric method, and the like in some cases. Furthermore, in some cases, the "measurement" includes measurement of a temporal change of the amplification amount, a biochemical substance amount, a reaction amount, concentration, absorbance, or the like, as in real-time PCR, enzyme activity, or reaction speed, for example.

The "physicochemical character" is, for example, identification of measurement target chemical substance solution, existence or non-existence of a target substance, identification of a chemical substance, identification of a structure of a chemical substance, a base sequence, a molecular structure, existence or non-existence of virus, existence or non-existence of bacterium, immunity measurement, and the like.

The "physicochemical numerical value" is, for example, a chemical substance solution amount, a chemical substance amount, concentration, absorbance, molecular weight, and the like.

The "measurement light" is light emitted for measuring a physicochemical character or numerical value of measurement target chemical substance solution, and is light having wavelength corresponding to photometric content and a chemical substance container. For example, this is for the case of measurement of absorbance, and ultraviolet around 260 nm is appropriate for the case of nucleic acid such as DNA, RNA, and oligonucleotide. This is because base of nucleic acid has an absorption peak around there (A: 259 nm, T: 267 nm, G: 253 nm, C: 267 nm). The value of absorption is affected by a structure (single strand, double strand), a length, and a base composition of nucleic acid. For example, white light is used for other substances. In addition, in the case of measuring fluorescence, excitation light having wavelength corresponding to the fluorescence. The "emission end (or reception end)" is an end portion of a light guide path that can emit (or receive) light, and includes an optical element such as a lens.

The "flow tube" is a tubular member having the port portion at a lower end, and an attachment opening portion to be detachably attached to the nozzle, at an upper end. It is preferable that the flow tube is a tip-shaped container having a narrow tube that has a port portion at the tip, and is formed to be thinner than the nozzle in which chemical substance solution serving as a measurement target is stored, and a wide tube that is communicated with the narrow tube, has the attachment opening portion, and is formed to be wider than the narrow tube. The flow tube having the narrow tube formed to be narrower than the nozzle has cross-sectional shape and size which the measurement light can pass through, and for example, an internal space of the flow tube has a cylindrical shape having a circular cross section, and an inner diameter thereof is 0.05 mm to 10 mm, preferably, 0.1 mm to 5 mm, and more preferably, about 0.5 mm to 1 mm, for example. The cross-sectional shape and size are defined based on shapes or sizes of the emission end and the reception end. Based on this, a length in an axial direction or the vertical direction that can set an optical path length corresponding to chemical substance solution having a small fluid amount (e.g. about 0.1μ liter to 10μ liter) is obtained. Additionally, an internal space of the flow tube can have a circular truncated cone shape, or a rectangular column shape in some case.

Because the port portion of the flow tube can be inserted into the "photometric container", the cross section thereof is larger than the cross section of the narrow tube of the flow tube, and in the case of measuring chemical substance solution with a small fluid amount, from the aspect of photometry, it is preferable that the chemical substance solution is sucked using the suction discharge mechanism into the flow tube having a smaller cross section corresponding to the fluid amount and photometric content, and holds the chemical substance solution therein, so that more appropriate optical path length can be thereby set, rather than storing the chemical substance solution into the photometric container.

The "one element of the irradiation reception pair" is the "emission end" or the "reception end", is the nozzle or the suction discharge mechanism, is a lower end of the nozzle, a lower end of a plunger sliding in a cylinder included in the suction discharge mechanism provided on the upper side of the nozzle, a concave portion or convex portion provided on the nozzle, or the like, for example, and is provided in a state where the emission end surface or the reception end surface faces downward. Similarly, "the other element of the irradiation reception pair element" is the "reception end" or the "emission end", and the translucent region of the photometric container is installed on the upper side thereof. Accordingly, the other element is provided on a stage to be described later, for example, in a state where the emission end surface or the reception end surface faces upward.

At the time of use, it is preferable that use is performed in a state a vertical line passing through in common the end surface of the emission end and the end surface of the reception end that belong to the irradiation reception pair, that is to say, a vertical common axis line exists. Furthermore, it is preferable that a position is set in a state where the vertical common axis line passes through the port portion of the flow tube attached to the nozzle. By providing either one of the irradiation reception pair on the vertical common axis line of the flow tube of at least one nozzle or suction discharge mechanism, and providing the other on the stage, the reception end and the emission end can be easily and reliably positioned on the vertical common axis line using a nozzle moving mechanism to be described later. Thus, the emission of measurement light can be easily and reliably performed along the vertical common axis line direction of the flow tube. The "vertical direction" is a direction set when the flow tube is attached to the nozzle, and it is preferable that the vertical direction corresponds to the direction extending along the vertical common axis line of the flow tube, or a suction and discharge direction of the flow tube.

More preferably, the "one element of the irradiation reception pair" provided on the nozzle or the suction discharge mechanism is the "emission end", and the "other element of the irradiation reception pair" is the "reception end". With this configuration, measurement light emitted from the emission end is emitted onto chemical substance solution more reliably as compared with the case of emitting measurement light upward from the port portion or bottom portion, and the entire amount or a main portion of the light can pass through the flow tube. Especially, when the flow tube is formed to be tapered like the tip-shaped container, the degree is high.

For example, the "optical measurement unit" includes one or two or more light sources and one or two or more photoelectric conversion units, the emission end can optically connect with the light source, and the reception end can optically connect with the photoelectric conversion unit that converts the intensity of light into an electrical signal. Here, as the "light source", for example, continuous wavelength from an ultraviolet region to a visible region can be emitted to a sample using a wavelength variable light source such as an LED, a deuterium lamp (e.g. Hamamatsu Photonics K.K., L10671D), and a halogen lamp. The "photoelectric conversion unit" converts the intensity of light into corresponding electrical signal and digital signal, and is a light receiving element such as, for example, a photomultiplier tube (PMT) that involves amplification, ADP, a CCD image sensor, and a photodiode.

One or two or more types of chemical substance solution can be stored in the one or two or more photometric containers. In this case, a character or numerical value of one or two or more types of chemical substance solution can be measured. In this case, there are a case of independently and concurrency measuring one or two or more types of chemical substance solution, and a case of mixing two or more types of chemical substance solution, and measuring the two or more types of chemical substance solution at a time. In the case of mixing and sucking, it is preferable that is mixed liquid once created and stored in the liquid storing unit, and then, sucked. In the case of measuring absorbance of each chemical substance solution, various types of measurement light suitable for various types of chemical substance solution are emitted in some cases.

It is preferable that the photometric container is provided on the stage such as, for example, in the cartridge container, as the liquid storing unit or a reaction container. It is preferable that the bottom portion is formed into a shape that the port portion of the flow tube can contact. The "translucent region" is the entire bottom portion or a part of the bottom portion. Accordingly, the "translucent region" has a size or a shape that at least tip surface of the port portion can contact. In addition, it is preferable that the translucent region is provided closely attached or contacted to the reception end surface of the reception end not via an air layer. With this configuration, an optical path length can be set not via an air layer from the upper end surface of liquid stored in the flow tube, to the reception end.

The "control unit" includes a computer (CPU) built in the general-purpose optical measuring device, a program for driving the computer, and the like, and includes, for example, a memory, a display device, and an input device such as a keyboard, a touch panel, and a mouse, exchanges signals through a DA converter and an AD converter, with the suction discharge mechanism, the nozzle moving mechanism to be described later, the nozzle head, the light source, the photoelectric conversion unit, or the like, thereby performing control.

Here, it is preferable that an amount of chemical substance solution sucked into and held in the flow tube, or stored into the photometric container is a predefined prescribed amount. The "light received at the reception end" is "light generated by emitting "the measurement light along the vertical direction through the inside of the flow tube or the inside of the photometric container, or light generated in the flow tube or photometric container", and is, for example, transmitted light, scattering light, or light related to luminescence, coloration, discoloring, or light variation for the chemical substance solution.

By deriving absorbance from intensity of transmitted light of measurement target chemical substance solution, for example, the control unit can various physical amounts based on the absorbance, and analyze the chemical substance solution.

For example, for performing analysis of concentration of various chemical substances (nucleic acid, fat, protein, carbohydrate, etc.), concentration of the solution is derived from the absorbance based on the Lambert-Beer law as indicated below.

When intensity of measurement light (wavelength $\lambda$) that is obtained before the incidence into the chemical substance solution in the flow tube is denoted by $I_0$, the intensity of transmitted light is denoted by I, a molar absorbance coefficient (standardized by unit molar concentration defined according to the wavelength $\lambda$ and the measurement target chemical substance) is denoted by e, molar concentration to be finally obtained is denoted by $\varepsilon$, and an optical path length is denoted by L, $I=I_0 \cdot 10^{(-\varepsilon cL)}$ is obtained. On the other hand, from the relationship of absorbance $A_\lambda = -\log_{10}(I/I_0)$, by obtaining absorbance $A_\lambda$, accordingly, transmissivity $I/I_0$, molar concentration c of nucleic acid or the like that is contained in the solution can be obtained by the following relational expression.

$$A_\lambda = \varepsilon cL \quad (1)$$

In addition, actually, due to scattering and reflection, measurement light does not directly travel in parallel, for enhancing accuracy, it is preferable that this expression is modified using a calibration curve and a calibration formula.

In addition, when the measurement target chemical substance (sample) reacts by various enzymes (AST, ALT, lipase, LDH, γ-GTP, etc.), and the concentration varies, the enzyme activity can be analyzed based on the absorbance derived from transmitted light of the chemical substance solution.

For obtaining the enzyme activity, because representation is performed in reaction speed, that is, a rate of change dc/dt of concentration of the chemical substance (rate of change of concentration: mol/liter), representation is performed in a change in absorbance ($dA_\lambda/dt$) per unit time of a change in absorbance, based on Expression (1) of the Beer-Lambert law. That is, $$dc/dt = (dA_\lambda/dt) \cdot (1/\varepsilon L) \quad (2).$$

For example, $\varepsilon$ is 6300 liter/(mol·cm) for nicotinamide adenine dinucleotide (NADH).

As a result, the enzyme activity is represented as follows. I.e.

$$\text{Enzyme activity} = (dc/dt)(V_t/V_s) \quad (3)$$

$V_t$=total content (liter) of the chemical substance solution
$V_s$=sample content (liter)

Accordingly, by substituting Expression (2) into Expression (3), $$\text{Enzyme activity} = (dA_\lambda/dt) \cdot V_t/(\varepsilon L V_s) \quad (4) \text{ is obtained.}$$

Nevertheless, because a unit of enzyme defines enzyme content can convert a substrate of 1 μmol in one minute in sample 1 liter under optimum conditions, as 1 U (Unit), the unit of enzyme activity is represented as 1 U/liter, and is represented by the following expression obtained by modifying Expression (4) described above.

$$\text{Enzyme activity (U/liter)} = \Delta A_\lambda \cdot (V_t \cdot 10^6)/(\varepsilon L V_s),$$

where $\Delta A_\lambda$: change in absorbance per minute
$V_t$: whole reactant content (m liter)
$V_s$: sample content (m liter)
s: molar absorbance (liter/(mol cm))
L: optical path length (cm).

Furthermore, as for concentration of unknown chemical substance solution (sample), the control unit measures absorbance of concentration known substance (standard solution), and creates a calibration curve representing a relationship between concentration and absorbance, using a graph or a table. Using the calibration curve or table, the concentration can be obtained from the absorbance of unknown chemical substance solution.

In addition, the control unit can perform immune antibody quantitative measurement (CPR, FDP, D-dimer, etc.) In the measurement of hemoglobin or the like in a specimen, antibody is fixed to resin latex particles utilizing antigen-antibody reaction, antigen-antibody reaction with antigen in the sample is caused, and the latex particles are aggregated. If the agglutination reaction regarded as a change in absorbance, a change amount of absorbance increases depending on an antigen amount in the sample. If a calibration curve is created using the concentration known standard solution, an antigen amount in the specimen can be measured from a change amount of absorbance.

In addition, the control unit can obtain absorbance of the one or two or more types of chemical substance based on the one or two or more types of transmitted light, and can obtain concentration or the like of the one or two or more types of chemical substance based on the absorbance. Similarly, based on the one or two or more types of transmitted light, scattering light, or the like, a physicochemical character or numerical value of the one or two or more types of chemical substance solution can be obtained.

The second invention is the general-purpose optical measuring device in which the other element of the irradiation reception pair is provided on a stage, a nozzle moving mechanism that makes the nozzle relatively movable with respect to the stage is included, and the control unit derives a physicochemical character or numerical value related to the chemical substance solution, by controlling at least the nozzle moving mechanism, the suction discharge mechanism, and the optical measurement unit.

It is preferable that the suction discharge mechanism and the nozzle are provided on the nozzle head.

In this case, in the nozzle moving mechanism, for example, there are a case of moving only the nozzle provided on the nozzle head fixed to the stage; a case of moving the nozzle, which is fixed to the nozzle head, together with the nozzle head, and a case of providing the nozzle so as to be movable with respect to the nozzle head and making the nozzle head movable, and the like.

It is preferable that the stage is provided with a flow tube storing unit that stores the flow tube in a state where the attachment opening portion is provided on an upper side so as to be attachable to the nozzle by the lowering of the nozzle that is performed by the nozzle moving mechanism. In addition, it is preferable that a reaction container that can perform temperature control is provided in addition to the liquid storing unit. It is preferable that the control unit controls the nozzle moving mechanism, and controls the flow tube to be attached to the nozzle by relative lowering of the nozzle. In this case, it is preferable that the nozzle head is provided with a detachment mechanism of the flow tube that detaches the flow tube from the nozzle by controlling the nozzle moving mechanism. With this configuration, by performing attachment and detachment of the flow tube without involving manpower, cross-contamination can be prevented, and the flow tube suitable for a fluid amount of a measurement target can be used. The photometric container is provided on the stage.

Here, "relative" indicates satisfying a relationship with another target to be compared. Accordingly, the case of "relatively moving" can include a case where one (e.g. nozzle) of the targets is moving, and the other one (e.g. stage) of the targets remains still, a case where the one of the targets remains still, and the other one of the targets is moving, or a case of both moving (a case where speeds are different).

In addition, one element of the irradiation reception pair is provided on the nozzle or the suction discharge mechanism, that is, the nozzle head, and the other element of the irradiation reception pair is provided on the stage, but it is not necessary that the light source or the photoelectric conversion unit is also provided on the same nozzle head or stage as the emission end or the reception end.

In addition, in some cases, the control unit performs control so as to suck the chemical substance solution to the upper side of a position spaced upward from the port portion of the flow tube by a regular interval. With this configuration, leak from the port portion of the lower end of the flow tube can be prevented, an optical path length can be stabilized, and highly-accurate physicochemical character or numerical value (e.g. absorbance) can be obtained. In addition, because an optical path in the flow tube that extends along the vertical common axis line connecting the emission end and the reception end is not blocked by substances other than chemical substance solution and air including the wall portion of the flow tube, they need not be formed of substances transparent to measurement light, including the flow tube and the container, and inexpensive and highly-accurate measurement of a physicochemical character or numerical value (e.g. absorbance) can be performed.

Here, for example, as for the flow tube having the entire length of about 3 cm to 20 cm, the regular interval is, for example, 0.5 mm to 10 mm, and preferably, 1 mm to 5 mm, and a portion in which chemical substance solution or mixed liquid is stored is, for example, 1 mm to 15 mm. With this configuration, leak from the port portion of the lower end of the flow tube can be prevented, an optical path length can be stabilized, highly-reliable various numerical values or characters, including absorbance and concentration can be obtained.

The third invention is the general-purpose optical measuring device in which the optical measurement unit includes one or two or more light sources and one or two or more photoelectric conversion units, and an irradiation reception pair interlock switching unit configured to switch, based on the photometric content designated by the photometric content designation unit, for the one pair or two pairs or more irradiation reception pairs, connection or interruption between the emission end and the one or two or more light sources, and connection and interruption between the reception end and the one or two or more photoelectric conversion units, for each of the irradiation reception pairs in an interlocked manner.

As the irradiation reception pair interlock switching unit, for each irradiation reception pair, a light source to be connected with the emission end, and a photoelectric conversion unit to be connected with the reception end are prepared in advance, and the connection or interruption therebetween is switched for each irradiation reception pair in an interlocked manner. As the irradiation reception pair interlock switching unit, in addition to the case of switching, for one irradiation reception pair, between the reception end and a plurality of photoelectric conversion units in an interlocked manner with switching of a plurality of types of measurement light between the emission end and a plurality of light sources, there can be a case of performing, for a plurality of irradiation reception pairs, connection or interruption between each reception end and one photoelectric conversion unit in an interlocked manner with connection or interruption between each emission end and one light source. In addition, it is preferable that by the reception end or the emission end being connected with the photoelectric conversion unit or the light source using a flexible light guide path such as, for example, an optical fiber, movement of the light source or the photoelectric conversion unit itself for switching can be made unnecessary.

In addition, the "switching" is performing connection and interruption between each irradiation reception pair and the light source or the photoelectric conversion unit at a predetermined speed defined based on the photometric content designated by the photometric content designation unit, or repeatedly performing the connection and interruption at a predetermined cycle. Especially, in the case of using a plurality of irradiation reception pairs (in the case of simultaneously measuring a plurality of types of samples) or in the case of performing a plurality of types of measurement, repetition is sometimes performed at a predetermined cycle. The "predetermined speed" or the "predetermined cycle" is defined according to intensity of light such as chemiluminescence or fluorescence (because fluorescence intensity is generally large, the intensity is repeatedly measured at a relatively high speed or relatively short cycle, for example, and because chemiluminescence intensity is generally small, the intensity is repeatedly measured at a relatively low speed or a relatively long cycle, for example), or life of luminescence (e.g. in the case of fluorescence, for example, several tens of seconds, and in the case of chemiluminescence, for example, several minutes), content of processing or measurement, the number of samples, that is, the number of irradiation reception pairs, a structure of the optical measurement unit such as, for example, a connection end to be described later, the array of a measurement end, and the position. For example, in the case of performing measurement at the same time for a plurality of irradiation reception pairs, as the predetermined cycle, a time sufficiently shorter than a time required for measurement is set, and connection and interruption with the light source or photoelectric conversion unit repeated by time division, thereby enabling more precise measurement. In addition, it is preferable that the "predetermined speed" is constant speed.

The fourth invention is the general-purpose optical measuring device in which the irradiation reception pair interlock switching unit includes, for the emission end and the reception end belonging to each of the one pair or two pairs or more irradiation reception pairs, one pair or two pairs or more connection end pairs including a first connection end optically connected with the emission end, and a second connection end optically connected with the reception end, one pair or two pairs or more measurement end pairs including a first measurement end optically connected with zero, one or two or more light sources, and a second measurement end optically connected with one or two or more photoelectric conversion units that are combined based on the photometric content that can be designated by the photometric content designation unit, a connection end array body having a connection end array surface on which the one pair or two pairs or more connection end pairs are arrayed, a measurement end array body having a measurement end array surface on which the one pair or two pairs or more measurement end pairs are arrayed, and a switching mechanism configured to relatively move the connection end array body and the measurement end array body so that the connection end array surface and the measurement end array surface slide, enable simultaneous connection or interruption between corresponding elements belonging to the connection end pair and the measurement end pair, and sequentially perform, for each of the one pair or two pairs or more irradiation reception pairs, connection or interruption between the emission end and the light source, in an interlocked manner with connection and interruption between the reception end and the photoelectric conversion unit, based on the photometric content designated by the photometric content designation unit.

Here, "the elements of the connection end pair" are the "first connection end" and the "second connection end", "the elements of the measurement end pair" are the "first measurement end" and the "second measurement end", "the corresponding elements belonging to the connection end pair and the measurement end pair" are the "first measurement end" corresponding to the "first connection end", and the "second measurement end" corresponding to the "second connection end". Accordingly, "the elements" are one type of the elements being the "first connection end" and the "first measurement end", and the other type of the elements being the "second connection end" and the "second measurement end". In addition, connection between the emission end and the first connection end, connection between the reception end and the second connection end, connection between the light source and the first measurement end, and connection between the photoelectric conversion unit and the second measurement end are performed using a light guide path such as a flexible optical fiber, and a light guide portion such as a hollow and a translucent member. In this case, one end of the light guide portion is the emission end, the reception end, or the light source and photoelectric conversion unit, and the other end is the first connection end, the second connection end, the first measurement end, or the second measurement end.

Here, regarding the "switching", when there are a plurality of connection end pairs (i.e. in the case of simultaneously measuring a plurality of types of samples) or there are a plurality of measurement end pairs (i.e. in the case of performing a plurality of types of measurement), it is preferable that relative movement between the connection end array body and the measurement end array body is repeatedly performed at a predetermined speed defined based on the photometric content designated by the photometric content designation unit, or a reciprocal motion, or at a predetermined cycle by swinging, for example.

The elements belonging to each of connection end pairs and each of the measurement end pairs are the connection end array surface and the measurement end array surface, are arrayed with being separated by the same predetermined distance along the vertical direction in the inside and outside of each array surface, with respect to a mutual movement route of the connection end array body and the measurement end array body, for example, and corresponding elements are connectable. For example, on the connection end array surface, a first connection end line in which the one or two or more first connection ends are arrayed in a line, and a second connection end line in which the one or two or more second connection ends are arrayed in a line are formed in parallel with being spaced from each other by a predetermined distance, and on the measurement end array surface, a first measurement connection end line in which the one or two or more first measurement ends are arrayed in a line, and a second measurement end line in which the one or two or more second measurement ends are arrayed in a line are formed in parallel with being spaced from each other by a predetermined distance. In this case, the connection end array surface can be a single plane, a double planes, or a curved surface. In the case of the single plane, the first connection end line and the second connection end line are formed on the same plane in parallel with being spaced from each other by a predetermined distance. In response to this, the measurement end array surface is also formed in a single plane, and the first measurement end line and the second measurement end line are formed on the same plane in parallel with being spaced from each other by a predetermined distance. In the case of the double planes, the first connection end line and the second connection end line are formed on different planes, but on one virtual plane including the first connection end line and the second connection end line, the first connection end line and the second connection end line are formed in parallel, and a distance between the connection end lines on the virtual plane corresponds to the predetermined distance. In this case, the double planes are parallel to each other in some cases, and in other cases, are formed so as to intersect with each other at a predetermined angle (e.g. right angle)(an intersection line of the double planes may become parallel to the connection end line). In response to this, the measurement end array surface also exists on double planes, and on one plane thereof, the first measurement end line that can overlap the first connection end line is formed, and on the other plane, the second measurement end line that can overlap the second connection end line is formed, the first measurement end line and the second measurement end line are formed in parallel on one virtual plane including the first measurement end line and the second measurement end line, and a distance between the measurement end lines on the virtual plane corresponds to the predetermined distance. Corresponding planes (the plane having the first connection end and the plane having the first measurement end, and the plane having the second connection end and the plane having the second measurement end) are provided so as to be slidable. By using double planes, with respect to the light guide path connecting between irradiation reception pair, deformation of the light guide path that is caused by movement can be reduced in some cases.

It is preferable that the "in a line" is in a straight line when the array surface is a flat surface, for example. A relative movement direction between the connection end array body and the measurement end array body is a direction extending along the first and second connection end lines and the first and second measurement end lines, and they are arrayed so that the first connection end line and the first measurement end line overlap, the second connection end line and the second measurement end line overlap, and switching is interlocked with movement. In this case, because switching of one or two or more irradiation reception pairs can be performed by one common switching mechanism, expansion of a device scale can be prevented.

The fifth invention is the general-purpose optical measuring device further including a temperature control unit, and the photometric container is provided so as to be temperature-controllable by the temperature control unit, and an opening portion of the photometric container can fit with the nozzle directly or indirectly.

The "indirectly" refers to a case where the opening portion is attached to the nozzle via a translucent sealed lid. In this case, it is preferable that the sealed lid is provided to fit with the nozzle, and to be transferable by the nozzle.

The sixth invention is the general-purpose optical measuring device in which a carrier that can be measured from lower outside, and to which a bound substance bondable with the chemical substance of the chemical substance solution is fixed is sealed into or stored in the flow tube or the photometric container.

Here, the "carrier" is an insoluble solid, and includes one or two or more granular carriers, planar carriers, and block-like carriers. The granular carriers include magnetic grains. In this case, it is preferable that a magnetic force means for sticking the magnetic grains to the wall portion of the flow tube is provided.

The seventh invention is the general-purpose optical measuring device in which one or two or more cartridge containers at least including the photometric container, a flow tube storing unit storing the flow tube so as to be attachable to the nozzle, and a sealed lid storing unit storing a sealed lid that is translucent to the measurement light, and is configured to fit with the opening portion of the photometric container to seal the photometric container, so as to be attachable to the nozzle are provided to be mountable on the stage.

In the cartridge container in which the photometric container is provided as a part thereof, additionally, for example, a plurality of liquid storing units that can store chemical substance solution, extraction reagent, amplification reagent, a labeling reagent of a fluorescence substance, a chemiluminescence substance, or the like, or reagent of enzyme or the like, and one or two or more reaction containers that can perform temperature control are arrayed in a line on a substrate having a substantially rectangular shape, and a partition wall with a predetermined height is formed at a rim portion on one side extending long the longitudinal direction of the substrate. The reaction container that can be sealed by the cap corresponds to the photometric reaction container. The partition wall is provided for preventing, when a plurality of the cartridge containers are adjacently arranged side by side to be used, droplets of reagents or the like from being mixed from another cartridge container. In this case, using the photometric reaction container, amplification processing of target nucleic acid contained in measurement target nucleic acid solution can be performed.

For example, the photometric container includes a wide cylindrical portion having a cylindrical shape that can fit on the lower side of the sealed lid (upper side can fit with the nozzle), a thin cylindrical portion having a cylindrical shape formed to be thinner than the wide cylindrical portion (accordingly, nozzle), and having a bottom portion with an inner side and an outer side that are flat in the horizontal direction that are formed on the lower end, and a taper shaped intermediate portion that is formed to be communicated with the wide cylindrical portion and the thin cylindrical portion so as to be interposed therebetween, and formed so as to have an inner diameter and an outer diameter that are intermediate of the wide cylindrical portion and the thin cylindrical portion. In the intermediate portion, a cylindrical acceptance portion for fitting with and accepting a seal portion 1 of the cap to be described later is formed near the center. The outer diameter of the thin cylindrical portion is, for example, 3.0 mm, the inner diameter is 2.5 mm, and a thickness of the bottom portion of the thin cylindrical portion is, for example, 0.5 mm. With this configuration, measurement light emitted from the emission end to be described later, in the axial direction of the thin cylindrical portion of the photometric reaction container, can be reliably transmitted through the bottom portion, and the transmitted light can be reliably received not via an air layer by the reception end to be described later that is closely connected with the bottom portion on the lower side. In addition, because chemical substance solution is stored in a thin cylindrical shape having a cross section that measurement light can pass through, a fluid amount required for measurement can be suppressed, and photometry of liquid with small volume can be performed.

Furthermore, an appropriate optical path length corresponding to a fluid amount stored within a range of a length in the vertical direction of the thin cylindrical portion can be set, measurement light can be emitted and received without bringing the emission end and the reception end, and the solution into contact, and cross-contamination is prevented, so that reliability is high.

The length of the substrate in the longitudinal direction of the goods is, for example, 150 mm to 200 mm.

The eighth invention is a general-purpose photometry device in which the photometric content designation unit can designate, for any one solution selected as the measurement target chemical substance solution from among nucleic acid solution, protein solution including immune substance solution, amino acid solution, fat solution, or sugar chain solution, at least one photometric content selected from among absorbance, concentration, existence or non-existence of a target substance, and an amount of the target substance, at least one of the one or two or more light sources is a white light source that emits white light as measurement light, and at least one is a light source that can emit light with wavelength that has been designated as measurement light, a part of the one or two or more photoelectric conversion units are a plurality of photoelectric conversion units connected via one spectral device, and at least one is a photoelectric conversion unit connected via a bandpass filter that the fluorescence can pass through, when photometric content of the absorbance or concentration is designated for the measurement target chemical substance solution by the photometric content designation unit, the irradiation reception pair interlock switching unit switches connection and interruption between the emission end of the one pair or two pairs or more irradiation reception pairs and the white light source, and connection and interruption of the reception end with a plurality of photoelectric conversion units connected via one spectral device, in an interlocked manner, when photometric content of existence or non-existence or an amount of a target substance in which a fluorescence substance is used is designated for the measurement target chemical substance solution by the photometric content designation unit, the irradiation reception pair interlock switching unit switches connection and interruption between the emission end of the one pair or two pairs or more irradiation reception pairs and the light source that emits excitation light for exciting the fluorescence, and connection and interruption of the reception end with a photoelectric conversion unit via a bandpass filter that the fluorescence can pass through, in an interlocked manner, and when photometric content of existence or non-existence or an amount of a target substance labeled with a chemiluminescence substance is designated for the measurement target chemical substance solution by the photometric content designation unit, the irradiation reception pair interlock switching unit switches interruption of the emission end of the one pair or two pairs or more irradiation reception pairs from the one or two or more light sources, and connection and interruption of the reception end with the photoelectric conversion unit, in an interlocked manner.

Here, in the two or more liquid storing units, two types or more of chemical substance solution are respectively stored, one type of chemical substance solution of the plurality of types of chemical substance solution is solution of an internal standard known physicochemical numerical value (e.g. concentration), one type of measurement light of the plurality of types of measurement light is standard measurement light corresponding to the internal standard (e.g. can be absorbed), the control unit mixes a prescribed amount of the chemical substance solution and a prescribed amount of the internal standard solution and sucks into the flow tube, emits, from the emission end, the measurement light and the standard measurement light into the flow tube, and based on the photometric content designated for the measurement light received at the reception end (e.g. intensity of transmitted light and intensity of transmitted light with respect to the standard measurement light), sometimes derives the physicochemical character or numerical value (e.g. absorbance) related to the chemical substance solution, based on transmitted light, scattering light, or light related to luminescence, coloration, discoloring, or light variation for the chemical substance solution.

In this example, for one pair of irradiation reception pair, connection and interruption of light sources having a plurality of wavelengths need to be sequentially performed.

In this case, by mixing measurement target chemical substance solution and internal standard, and obtaining a relative physicochemical character or numerical value with the internal standard, high reliability can be obtained without being effected by a variation of an optical path length.

When nucleic acid solution is to be measured as chemical substance solution, the "internal standard" having low absorption near a concentration measurement region 260 nm of nucleic acid is preferable. For example, a bromophenol blue (BPB, blue dye) is used. By using the internal standard, measurement of a highly-reliable physicochemical character or numerical value (e.g. absorbance) can be performed by eliminating influence on measurement accuracy that is caused by an exponential variation of transmissivity that is caused by a variation of an optical path length that is caused by a fluctuation in solution volume that is involved with introduction of solution into the flow tube.

Here, the control unit is a general-purpose optical measuring device that obtains, based on transmitted light or scattering light of the measurement light, coloring, coloration, discoloring, or light variation, a physicochemical character or numerical value (e.g. absorbance of the chemical substance solution) related to the chemical substance solution, obtains, based on transmitted light or scattering light of the standard measurement light, coloring, coloration, discoloring, or light variation, a physicochemical character or numerical value (e.g. absorbance) related to the internal standard solution, and further obtains, using concentration of the internal standard solution that has been obtained from, for example, an absorbance coefficient of the chemical substance solution, the absorbance coefficient of the internal standard solution, and an amount of mixed liquid, a physicochemical character or numerical value (e.g. absorbance) related to the chemical substance solution.

Here, for certain chemical substance solution (A1), corresponding absorbance for measurement light having wavelength suitable for the measurement is denoted by $A_1$, an absorbance coefficient is denoted by $\varepsilon_1$, and concentration of the chemical substance is denoted by $c_1$. In addition, for an internal standard (A0), corresponding absorbance for standard measurement light having wavelength suitable for the measurement is denoted by $A_0$, an absorbance coefficient is denoted by $\varepsilon_0$, and prescribed concentration of the internal standard is denoted by $c_0$. In addition, when an optical path length set when mixture and suction into the flow tube is performed is denoted by L (common as mixed liquid), the following expressions are obtained from the Beer-Lambert law.

$$A_1 = \varepsilon_1 c_1 L$$

$$A_0 = \varepsilon_0 c_0 L$$

When the optical path length is erased from these expressions, concentration $c_1$ is obtained by $c_1 = (A_1 \varepsilon_0 c_0)/(A_0 \varepsilon_1)$, highly-reliable concentration that is based on a relative ratio with the internal standard can be obtained without being affected by an easily-varying optical path length.

Furthermore, two types or more of chemical substance solution are respectively stored in the two or more liquid storing units, one type of chemical substance solution of the plurality of types of chemical substance solution is diluted solution, and the control unit mixes a prescribed amount of the chemical substance solution and a predetermined amount of diluted solution, and sucks into the flow tube, emits the measurement light from the emission end into the flow tube, and sometimes derives absorbance of the chemical substance solution based on intensity of transmitted light with respect to the measurement light received at the reception end and intensity of the measurement light.

In this case, for one type of a plurality of types of chemical substance solution, by using diluted solution or solvent, a physicochemical character or numerical value (e.g. absorbance) related to diluted chemical substance solution can be measured.

The ninth invention is a general-purpose optical measurement method including a photometric content designation step of designating photometric content for chemical substance solution serving as a target of any of at least measurement of an amplification amount by a nucleic acid amplification method; detection or quantitative measurement by a nucleic acid detection method, an immunoassay method or an enzyme method; or measurement of concentration or absorbance, a holding storage step of, for one or two or more irradiation reception pairs each including one or two or more emission ends that can emit measurement light defined by the designated photometric content, and a reception end that can receive at least light emitted from the emission end, one element of the irradiation reception pair being provided on one or two or more nozzles or a suction discharge mechanism, a photometric container including a bottom portion having a formed translucent region translucent to the measurement light being installed on an upper side of the other element of the irradiation reception pair, based on the designated photometric content, sucking and holding chemical substance solution into a flow tube having, at a lower end, a port portion, and being detachably attached to the nozzle at an upper end, using a suction discharge mechanism, or storing the chemical substance solution into the photometric container, an optical measurement step of receiving light generated by positioning the port portion of the flow tube or the nozzle on an upper portion of the other element of the irradiation reception pair, and emitting the measurement light from the emission end along a vertical direction through an inside of the flow tube or an inside of the photometric container, or light generated inside the flow tube or inside the photometric container, at the reception end, and obtaining intensity of light, and a photometry analysis step of deriving the physicochemical character or numerical value related to the chemical substance solution, based on intensity of light received at the reception end.

Here, it is preferable that the holding storage step includes an attachment step of performing detachable attachment by one or two or more flow tubes being stored into a flow tube storing unit storing so as to be attachable to the nozzle, and relatively lowering the one or two or more nozzles with respect to the one or two or more flow tubes by the nozzle moving mechanism. It is preferable that the photometric container liquid and the flow tube storing unit are provided on a stage. The flow tube has, at an upper end, an attachment opening portion detachably attachable to the nozzle, and at a lower end, a port portion insertable into the storing unit, and in the flow tube storing unit, the attachment opening portion is stored on an upper side.

In the optical measurement step, it is preferable that one element of the emission end reception pair is provided by the nozzle moving mechanism on a vertical common axis line passing through in common the port portion and the attachment opening portion of the one or two or more the flow tubes, which is the nozzle or the suction discharge mechanism, and the other element of the irradiation reception pair is positioned on the vertical common axis line. In addition, in the case of storing the one or two or more types of the chemical substance solution into the one or two or more liquid storing units, and performing measurement for the chemical substance solution, it is sometimes preferable that one or two or more types of measurement light that can be absorbed by the chemical substance in the chemical substance solution are emitted from the emission end. In the optical measurement step, received light is further converted into an electrical signal by the photoelectric conversion unit. The photometry analysis step can derive, for example, absorbance, and further obtain, based on the derived absorbance, concentration, enzyme activity, an immunizing antigen amount, and the like of the chemical substance solution.

The tenth invention is the general-purpose optical measurement method in which, in the optical measurement step, the other element of the irradiation reception pair is provided on the stage, and by a nozzle moving mechanism that makes the nozzle relatively-movable with respect to the stage, the port portion of the flow tube or the nozzle is positioned on the upper portion of the other element of the irradiation reception pair. It is preferable that the suction discharge mechanism and the nozzle are provided on the nozzle head.

The eleventh invention is the general-purpose optical measurement method in which the optical measurement step includes an irradiation reception pair interlock switching step of switching, based on the photometric content designated by the photometric content designation step, for the one pair or two pairs or more irradiation reception pairs, connection or interruption between the emission end and the one or two or more light sources, and connection and interruption between the one or two or more reception ends and the one or two or more photoelectric conversion units, for each of the irradiation reception pairs in an interlocked manner.

The twelfth invention is the general-purpose optical measurement method in which the optical measurement step includes a switching step of sequentially performing, for the emission end and the reception end belonging to each of the one pair or two pairs or more irradiation reception pairs, by simultaneous connection or interruption between corresponding elements belonging to one pair or two pairs or more connection end pairs including a first connection end optically connected with the emission end, and a second connection end optically connected with the reception end, and one pair or two pairs or more measurement end pairs including a first measurement end optically connected with zero, one or two or more light sources, and a second measurement end optically connected with one or two or more photoelectric conversion units that are combined based on the photometric content that can be designated by the photometric content designation step, for each of the one pair or two pairs or more irradiation reception pairs, connection or interruption between the emission end and the light source, in an interlocked manner with connection and interruption between the reception end and the photoelectric conversion unit.

The thirteenth invention is the general-purpose optical measurement method in which the holding storage step sucks chemical substance solution stored in the photometric container into the flow tube using a suction discharge mechanism while leaving a part of the chemical substance solution, and the optical measurement step positions the port portion of the flow tube on the upper portion of the emission end or the reception end by bringing the port portion of the flow tube into contact with the translucent region of the bottom portion, and emits the measurement light from the emission end along the vertical direction through an inside of the flow tube.

With this configuration, because a part of chemical substance solution is left in the container, introduction of an air layer into the flow tube can be prevented, an optical path starting from the port portion only for the measurement target chemical substance solution can be formed, and highly-accurate measurement can be performed.

In addition, when a concave portion is provided in the bottom portion of the photometric container, positioning can be performed by loosely inserting or inserting the lower end portion of the flow tube into a thin bottom portion of the concave portion. It is preferable that the translucent region is provided closely attached or contacted to the reception end surface of the reception end not via an air layer.

The fourteenth invention is the general-purpose optical measurement method in which, in the optical measurement step, the photometric container is temperature-controlled by a temperature control unit, and the opening portion is fitted with the nozzle directly or indirectly.

The fifteenth invention is the general-purpose optical measurement method in which the flow tube is provided so as to be shielded from outside light, the lower end portion of the flow tube can be inserted or loosely inserted into the photometric container from the above, and the optical measurement step moves the flow tube onto the photometric container, and in a state where the lower end portion of the flow tube is inserted or loosely inserted into the photometric container to bring the port portion into contact with the bottom portion, emits the measurement light from the emission end in the vertical direction through the flow tube.

In addition, in the holding storage step, in some cases, the chemical substance solution is sucked to the upper side of a position spaced upward from the port portion of the flow tube by a regular interval, and the chemical substance solution is held in the flow tube. In this case, leak from the port portion of the lower end of the flow tube can be prevented, an optical path length can be stabilized, and highly-accurate physicochemical character or numerical value (e.g. absorbance) can be obtained. In addition, because an optical path in the flow tube that extends along the vertical common axis line connecting the emission end and the reception end is not blocked by substances other than chemical substance solution and air including the wall portion of the flow tube, they need not be formed of substances transparent to measurement light, including the flow tube and the container, and inexpensive and highly-accurate measurement of a physicochemical character or numerical value (e.g. absorbance) can be performed.

In addition, the chemical substance solution in the holding storage step is a plurality of types of chemical substance solution, one type of chemical substance solution of the chemical substance solution is solution of known concentration of an internal standard, a prescribed amount of the chemical substance solution and a prescribed amount of the internal standard are mixed and sucked into the flow tube, the measurement light in the measurement light emission step a plurality of types of measurement light, one type of measurement light thereof is standard measurement that can be absorbed by the internal standard, the measurement light and the standard measurement light are emitted into the flow tube, the optical measurement step is performed by receiving, at the reception end, based on the designated photometric content, transmitted light or scattering light of the measurement light, or light related to luminescence, coloration, discoloring, or light variation, and transmitted light or scattering light of the standard measurement light, or light related to luminescence, coloration, discoloring, or light variation, and the photometry analysis step sometimes derives the physicochemical character or numerical value (e.g. absorbance) related to the chemical substance solution, based on intensity of light such as transmitted light or the like of the measurement light, and transmitted light or the like of the standard measurement light.

In this case, by mixing measurement target chemical substance solution and internal standard, and obtaining a relative physicochemical character or numerical value with the internal standard, high reliability can be obtained without being effected by a variation of an optical path length.

In addition, in some cases, the photometry analysis step obtains a physicochemical character or numerical value (e.g. each absorbance) related to the chemical substance solution, from intensity of transmitted light or scattering light of the measurement light, or light related to luminescence, coloration, discoloring, or light variation, and obtains a physicochemical character or numerical value (e.g. absorbance) related to the internal standard solution, from intensity of transmitted light or scattering light of the standard measurement light, or light related to luminescence, coloration, discoloring, or light variation. Furthermore, for example, using concentration of the internal standard solution obtained from an absorbance coefficient of the chemical substance solution, an absorbance coefficient of the internal standard solution, and an amount of mixed liquid, for example, concentration of the chemical substance solution is obtained.

Furthermore, one type of chemical substance of the plurality of types of chemical substance solution in the holding storage step is diluted solution, and in some cases, the general-purpose optical measurement method is performed by mixing a prescribed amount of the chemical substance solution and a predetermined amount of the diluted solution, and sucking into the flow tube.

In this case, for one type of a plurality of types of chemical substance solution, by using diluted solution or solvent, a physicochemical character or numerical value (e.g. absorbance) related to diluted chemical substance solution can be measured.

The sixteenth invention is the general-purpose optical measurement method in which the photometric content designation step designates, for any one solution selected as the measurement target chemical substance solution from among nucleic acid solution, protein solution including immune substance solution, amino acid solution, fat solution, or sugar chain solution, at least one photometric content selected from among the absorbance, the concentration, existence or non-existence of a target substance, and an amount of the target substance, when the photometric content designation step designates, for the measurement target chemical substance solution, photometric content of the absorbance or concentration, the irradiation reception pair interlock switching step switches connection and interruption between the emission end of the one pair or two pairs or more irradiation reception pairs and the white light source, and connection and interruption of the reception end with a plurality of photoelectric conversion units connected via one spectral device, in an interlocked manner, when the photometric content designation step designates, for the measurement target chemical substance solution, photometric content of existence or non-existence or an amount of a target substance in which a fluorescence substance is used, the irradiation reception pair conversion step switches connection and interruption between the emission end of the one pair or two pairs or more irradiation reception pairs and the light source that emits excitation light for exciting the fluorescence, and connection and interruption of the reception end with a photoelectric conversion unit via a bandpass filter that the fluorescence can pass through, in an interlocked manner, and when the photometric content designation step designates, for the measurement target chemical substance solution, photometric content of existence or non-existence or an amount of a target substance labeled with a chemiluminescence substance, the irradiation reception pair interlock switching step switches interruption of the emission end of the one pair or two pairs or more irradiation reception pairs from the one or two or more light sources, and connection and interruption of the reception end with the photoelectric conversion unit, in an interlocked manner.

The seventeenth invention is an optical measurement device including one pair or two pairs or more irradiation reception pairs including an emission end that can emit measurement light, and a reception end that can receive at least light emitted from the emission end, and an optical measurement unit configured to supply measurement light to the emission end, and obtain intensity of light received at the reception end, and the optical measurement unit includes one or two or more light sources and one or two or more photoelectric conversion units, and an irradiation reception pair interlock switching unit configured to switch, based on the photometric content designated by the photometric content designation unit, for the one pair or two pairs or more irradiation reception pairs, connection or interruption between the emission end and the one or two or more light sources, and connection and interruption between the reception end and the one or two or more photoelectric conversion units, for each of the irradiation reception pairs in an interlocked manner.

In addition, for the present invention, the fourth invention to the eighth invention can be combined or can cause these inventions to depend on. In addition, the description of the third invention can be applied to the invention.

Advantageous Effects of Invention

According to the first invention or the ninth invention, the use of dedicated devices in the number and types that correspond to content to be measured can be eliminated, and using one device, using a common sample or a sample derived from the common sample, (big) data in various fields related to the sample can be derived in a small-scale device, easily, high-accurately, efficiently, and promptly, by enabling measurement for obtaining various physicochemical amounts and various physicochemical characters that has been conventionally performed using dedicated devices in different fields such as gene analysis, gene amplification, immunoassay, absorbance analysis, concentration measurement, and enzyme detection, for one or a plurality of types of samples.

In addition, by providing the emission end or the reception end on the nozzle or the suction discharge mechanism without changing the basic form and the basic function, without providing a nozzle or a suction discharge mechanism dedicated for photometric processing or dedicated component separately from dispensing processing, and in addition, without interrupting a suction discharge function, using a nozzle and a suction discharge mechanism that are common to those in normal dispensing processing, by attaching the flow tube to the nozzle or fitting with the photometric flow tube, the normal dispensing processing and photometric processing can be performed. Thus, processing is easy and work efficiency is high.

Furthermore, by holding or storing chemical substance solution into the flow tube or the photometric container into a thin columnar shape having a cross section that measurement light can pass through, a fluid amount required for measurement can be suppressed, and measurement of a physicochemical character or numerical value (e.g. absorbance) for small-volume liquid can be performed. In addition, because the measurement light is not blocked by the flow tube storing chemical substance solution, or the photometric flow tube having a translucent region, optical influence on the measurement light can be eliminated or reduced, and a highly-accurate physicochemical character or numerical value (e.g. absorbance) can be obtained. In addition, because the measurement light is not blocked by the flow tube or the translucent region of the photometric container, manufacturing can be performed at low cost without using a flow tube or a photometric container manufactured only of dedicated material corresponding to the type of measurement light, by using a member (e.g. black substance) nontransparent to measurement light, for the flow tube or the photometric container, entry of outside light can be prevented, and highly-accurate measurement of a physicochemical character or numerical value (e.g. concentration) can be performed. Here, the "thin columnar shape" refers to being formed into a thinner shape as compared with the cross section of the nozzle, for example, and being formed by storing and holding liquid in the flow tube or the photometric container.

An appropriate optical path length (e.g. in the case of transmitted light or scattering light) corresponding to the sucked fluid amount can be set within a range of a length in the vertical direction of the flow tube, and measurement light can be emitted and received without bringing the emission end and the reception end into with solution. Accordingly, because cross-contamination caused by contact between the reception end and the emission end, and solution can be prevented, a high-reliability appropriate optical path length corresponding to a fluid amount can be set without an optical path length being fixed by the size of the container, and physicochemical characters or numerical values (e.g. absorbance) corresponding to various fluid amounts can be measured, versatility is high.

Furthermore, by using a suction discharge mechanism and control unit having high quantitative performance, an optical path length can be accurately determined and stabilized, and highly-reliable measurement can be performed.

In addition, by using a plurality of nozzles, characters or numerical values of a plurality of types of chemical substance solution can be concurrently measured, and various characters or numerical values can be sequentially measured for one chemical substance solution, and efficiency is high.

According to the second invention or the tenth invention, by making relatively movable with respect to the stage on which the photometric container and the other element of the irradiation reception pair are provided, the flow tube can move to the container storing measurement target chemical substance solution, suck, and move to the photometric container, and the irradiation reception pair can be easily and reliably positioned at such a correct position as to be arranged along the vertical direction such as, for example, a vertical common axis line. In addition, measurement light can be emitted along the vertical direction without involving manpower, and a physicochemical character or numerical value (e.g. absorbance) related to the chemical substance solution can be measured. Thus, cross-contamination can be prevented, and highly-reliable measurement can be performed. Furthermore, by providing the flow tube storing unit storing the flow tube, on the stage, attachment of the flow tube to the nozzle can be executed without involving manpower. In addition, extraction of nucleic acid or the like from the sample, the creation of nucleic acid solution serving as chemical substance solution, and PCR processing can be consistently performed.

According to the third invention, the eleventh invention, or the seventeenth invention, by switching optical connection or interruption between one or two or more emission ends and one or two or more light sources, various types of measurement light can be emitted from the emission end, or can be shielded from the light source, and in an interlocked manner therewith, optical connection and interruption can be switched between one or two or more reception ends and one or two or more photoelectric conversion units. Thus, for one chemical substance solution, various types of measurement can be performed by combining various light sources or interruption from the light sources, and various photoelectric conversion unit, and versatility is high. In addition, because a plurality of types of measurement can be simultaneously and concurrently performed for a plurality of types of chemical substance solution, efficiency is high, and because there is no need to provide a light source and a photoelectric conversion unit for each of the plurality of types of chemical substance solution, expansion of a device scale and expansion of a manufacturing cost can be prevented.

According to the fourth invention or the twelfth invention, because connection and interruption with the light source at the emission end and connection and interruption with the photoelectric conversion unit at the reception end can be implemented by relative movement between the connection end array body and the measurement end array body that is performed by a common switching mechanism, for a plurality of consecutive samples, a plurality of types of measurement can be simultaneously and concurrently performed by one device. Thus, expansion of a device scale and an increase in the number of components are prevented, and versatility and efficiency become high.

According to the fifth invention or the fourteenth invention, because a change in reaction of chemical substance solution stored in the photometric container that is caused by temperature control can be measured after the opening portion of the photometric container is directly or indirectly fitted by the nozzle, use can be performed for real-time PCR of nucleic acid.

According to the thirteenth invention, by bringing into contact with the translucent region of the bottom portion of the photometric container in the port portion of the flow tube in a state where a part of liquid storage measurement target chemical substance solution of the photometric container that stores chemical substance solution is left and sucked into the flow tube, drop from the port portion, liquid movement through the port portion, and a variation of the lower end of an optical path length of liquid that is caused by interfusion of an air layer near the port portion can be prevented. Accordingly, an optical path length of the flow tube can be stabilized, and measurement of a highly-accurate physicochemical character or numerical value (e.g. absorbance) can be implemented. In addition, even when a prescribed amount of measurement target liquid is small, by sucking the prescribed amount of liquid into the flow tube, an appropriate optical path length can be set and measurement can be performed. Especially, when the translucent region is closely contacted or attached to the reception end surface, because interfusion of an air layer is not caused from the upper end surface of liquid to the reception end surface, an optical path length is stable.

According to the fifteenth invention, by providing the flow tube so as to be shielded from outside light, an outside light shielded state can be caused over the entire optical path length. Accordingly, the reception end can receive transmitted light obtained only by measurement light, and highly-accurate measurement of absorbance can be performed.

According to the sixth invention, photometry can be performed regarding a target substance captured in a carrier, and territory of photometric content can be further widened, and versatility becomes high.

According to the seventh invention, because various cartridge containers can be mounted on the stage, by pre-packaging reagent corresponding to a photometric content, into the cartridge container in advance, various types of processing can be promptly and efficiently performed without placing a burden on a user.

According to the eighth invention or the sixteenth invention, by performing connection and interruption between the emission end and the light source such as a white light source, and connection and interruption of a reception end with a photoelectric conversion unit, with the photoelectric conversion unit via the bandpass filter, or with a plurality of photoelectric conversion units via one spectral device, in an interlocked manner for each irradiation reception pair, absorbance, concentration, existence or non-existence or an amount of a target substance labeled with a fluorescence substance or a chemiluminescence substance can be sequentially measured for one chemical substance solution.

DESCRIPTION OF EMBODIMENTS

Figure 1:
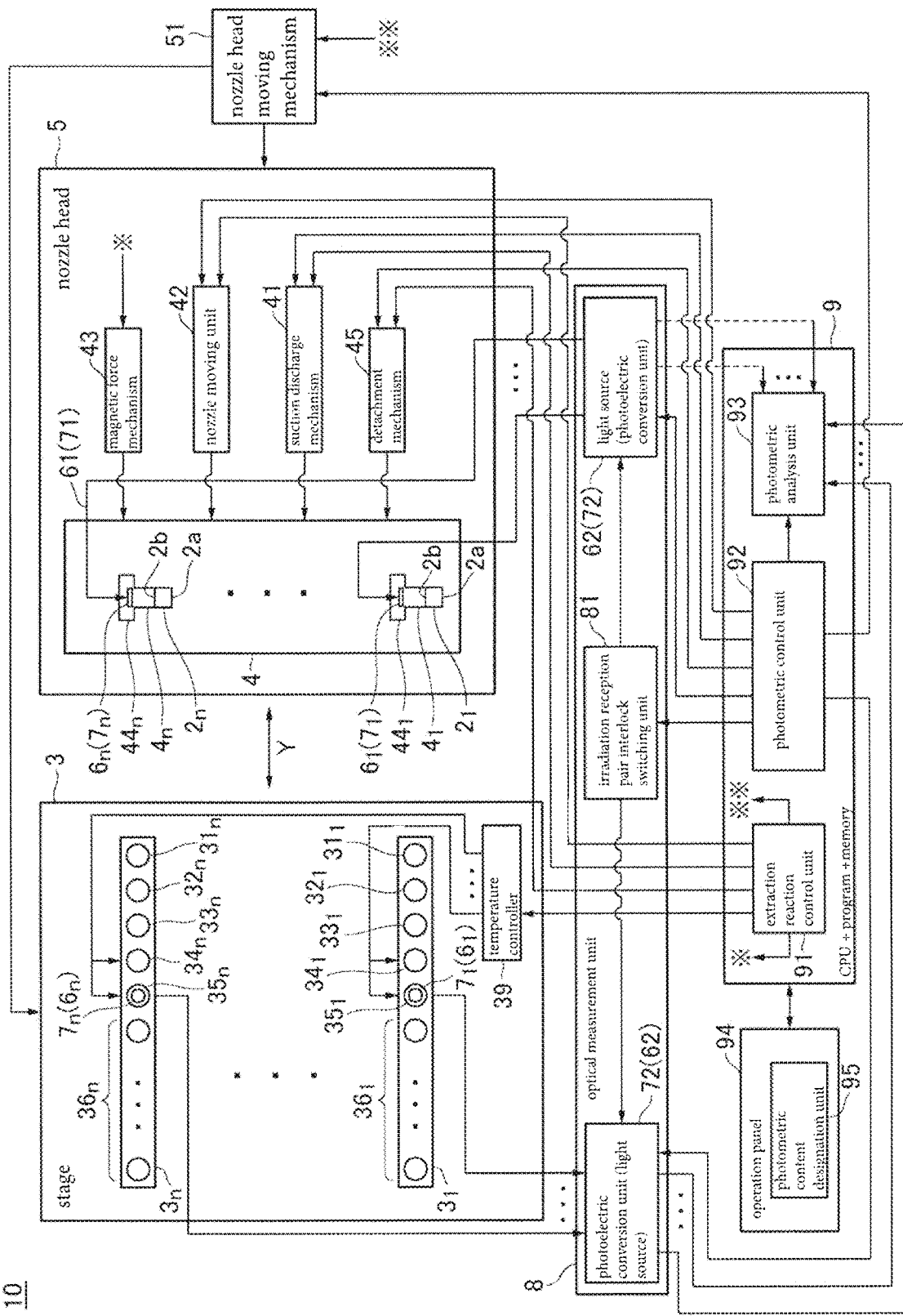
FIG. 1 is a block diagram of a general-purpose optical measuring device according to an embodiment of the present invention.

Based on FIG. 1, a general-purpose optical measuring device 10 according to an embodiment of the present invention is illustrated.

The general-purpose optical measuring device 10 includes one or two or more storing units storing one or two or more types of chemical substance solution, various reagents, flow tubes $2_1$ to $2_n$, and a sealed lid, a stage 3 on which a plurality of storing unit groups $3_1$ to $3_n$ each including one or two or more reaction containers that can perform temperature control and are arrayed along a Y-axis direction (column direction) in an extended manner are arrayed along an X-axis direction (row direction), a suction discharge mechanism 41 that performs suction and discharge of gas, a nozzle head 5 including a nozzle support member 4 which is communicated with the suction discharge mechanism 41, and on which a plurality of nozzles $4_1$ to $4_n$ arrayed along the X-axis direction at an interval corresponding to the array of the storing unit groups are supported, and a nozzle moving mechanism (51, 42) that makes the nozzles $4_1$ to $4_n$ relatively movable with respect to the stage 3.

Figure 8:
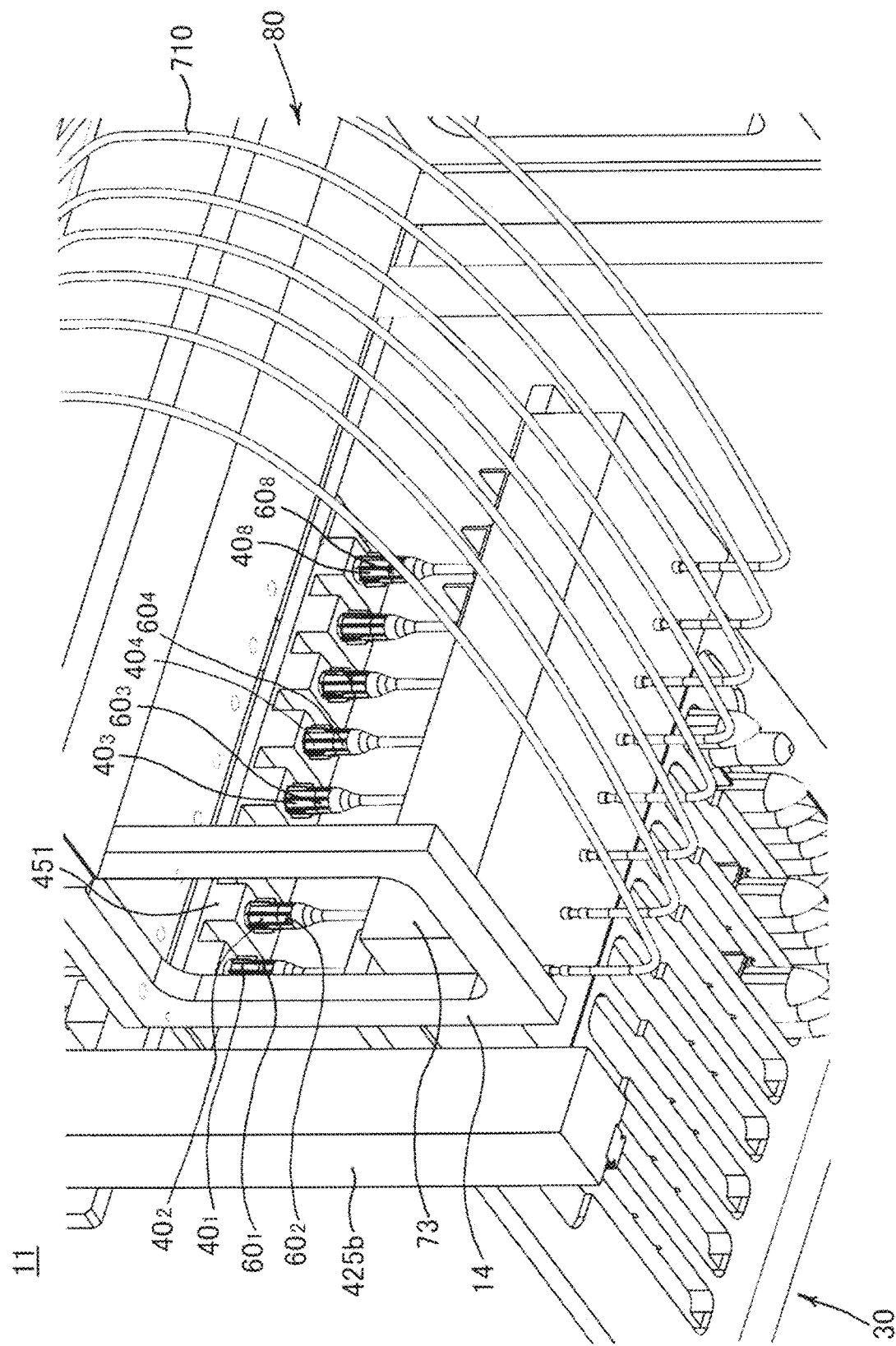
FIG. 8 is a perspective view illustrating a part of FIG. 3 from a lower side in an enlarged manner.

As the measurement target chemical substance solution, for example, there is nucleic acid solution, protein solution including immune substance solution, amino acid solution, fat solution, or sugar chain solution base sequence. As the various reagents, for example, there are nucleic acid extraction reagent, nucleic acid amplification reagent, real-time PCR reagent, a labeling substance, and various carrier slurries containing magnetic grains. As the flow tubes $2_1$ to $2_n$ (e.g. as illustrated in FIG. 8) lower end, a port portion $2a$ that can perform suction and discharge of liquid, and can concurrently insert into each storing unit of the storing unit groups or a reaction container (including a photometric container) is included, and at an upper end, an attachment opening portion $2b$ detachably attached to the nozzles $4_1$ to $4_n$ is included. As the flow tube, a dispensing flow tube (dispensing chip) used for dispensing and a photometric flow tube used for photometry are included in some cases. In other cases, one type of flow tube has functions of the both flow tubes.

Each of the storing unit groups $3_1$ to $3_n$ of the stage 3 includes one or two or more liquid storing units $36_1$ to $36_n$ storing the one or two or more types of the chemical substance solution, various reagents, and the like, dispensing flow tube storing units $32_1$ to $32_n$ storing dispensing flow tubes $2_{n+1}$ to $2_{2n}$ used as a dispensing chip, in a state where the attachment opening portion faces an upper side, so as to be attachable to the nozzles $4_1$ to $4_n$, photometric flow tube storing units $31_1$ to $31_n$ storing photometric flow tubes $2_1$ to $2_n$ that perform photometry, in a state where an attachment opening portion faces an upper side, so as to be attachable to the nozzles $4_1$ to $4_n$, reaction containers $34_1$ to $34_n$ that can perform temperature control, and photometric containers $35_1$ to $35_n$ in which temperature control can be performed and photometry is performed on the measurement target. On the stage 3, a temperature controller 39 including a Peltier element, a heat block, and the like that perform temperature control of the reaction containers $34_1$ to $34_n$ and photometric containers $35_1$ to $35_n$ is provided.

The general-purpose optical measuring device 10 includes one or two or more irradiation reception pairs $(6_1, 7_1)$ to $(6_n, 7_n)$ including one or two or more emission ends $6_1$ to $6_n$ that can emit the one or two or more types of measurement light to at least one photometric flow tubes $2_1$ to $2_n$ or the photometric containers $35_1$ to $35_n$ so as to pass through the inside of the photometric flow tubes $2_1$ to $2_n$ and/or the inside of the photometric containers $35_1$ to $35_n$, and one or two or more reception ends $7_1$ to $7_n$ that can receive light from the emission ends $6_1$ to $6_n$, and the photometric containers $35_1$ to $35_n$ includes a bottom portion in which the chemical substance solution can be stored, and a translucent region translucent to the measurement light is formed. In addition, it is preferable that pairs of the emission ends $6_1$ to $6_n$ and reception ends $7_1$ to $7_n$ are provided on a vertical common axis line passing through in common the port portion $2a$ of the flow tubes $2_1$ to $2_n$ attached to the nozzles $4_1$ to $4_n$, and the attachment opening portion $2b$.

The general-purpose optical measuring device 10 includes an optical measurement unit 8 that supplies measurement light to the emission ends $6_1$ to $6_n$, and obtains intensity of light received at the reception ends $7_1$ to $7_n$. The optical measurement unit 8 includes one or two or more light sources 62 optically connectable with the emission ends $6_1$ to $6_n$, one or two or more photoelectric conversion units 72 that are optically connectable with the reception ends $7_1$ to $7_n$, and convert intensity of received light into an electrical signal, and an perform irradiation reception pair interlock switching unit 81 that performs switching connection or interruption between the light sources 62 and the plurality of emission ends $6_1$ to $6_n$, and switching of connection and interruption between the photoelectric conversion units 72 and the plurality of reception ends $7_1$ to $7_n$, in an interlocked manner. Here, the emission ends $6_1$ to $6_n$, the reception ends $7_1$ to $7_n$, and the optical measurement unit 8 correspond to an optical measurement device.

For example, as a plurality of light sources, a plurality of types of specific wavelength light sources are included in some cases, or a plurality of wavelength variable light sources set to respective specific wavelengths are used. As a plurality of photoelectric conversion units, in some cases, a plurality of photoelectric conversion units are provided via bandpass filters corresponding to light with a plurality of types of specific wavelengths, or in other cases, photoelectric conversion units are provided via a spectrometer so as to correspond to the respective wavelengths.

The general-purpose optical measuring device 10 includes CPU+ program+memory 9 that performs information processing as a control unit that derives a physicochemical character or numerical value related to the chemical substance solution, by controlling the nozzle moving mechanism (51,42), the suction discharge mechanism 41, and the optical measurement unit 8, and an operation panel 94 that performs an operation such as an instruction of the user onto the CPU+ program+memory 9. The operation panel 94 is provided with a photometric content designation unit 95 that designates photometric content for measurement target chemical substance solution.

The CPU+ program+memory 9 sucks and holds a prescribed amount of the one or two or more types of chemical substance solution independently or by mixing, into the flow tubes $2_1$ to $2_n$ attached to the nozzles $4_1$ to $4_n$, or stores into the photometric containers $35_1$ to $35_n$, positions the port portion $2a$ or the nozzles $4_1$ to $4_n$ on the vertical common axis line and on an upper side of the other one of the emission ends $6_1$ to $6_n$ or the reception ends $7_1$ to $7_n$, emits the measurement light from the emission ends along the vertical direction through the inside of the flow tubes $2_1$ to $2_n$ or the inside of the photometric containers $35_1$ to $35_n$, and derives a physicochemical character or numerical value related to the chemical substance solution based on transmitted light or scattering light, received at the reception ends $7_1$ to $7_n$, or light related to luminescence, coloration, discoloring, or light variation for the chemical substance solution.

As described above, one of a column of the emission ends $6_1$ to $6_n$ that can emit the measurement light through the inside of the flow tubes or the inside of the photometric container, or a column of the reception ends $7_1$ to $7_n$ that can receive light from the emission ends is provided at portions $44_1$ to $44_n$ (e.g. tips of the nozzles $4_1$ to $4_n$, tip of plunger of cylinder, etc.) on the vertical common axis line of the suction discharge mechanism 41 of the nozzle head 5 or the nozzles $4_1$ to $4_n$, the other one is provided on the stage 3 and is arrayed so as to extend along the X-axis direction at the same interval as the interval of the nozzles. At the time of photometry, control is performed so that irradiation reception pairs (pairs having the same subscript numbers) including the reception ends $7_1$ to $7_n$ and the emission ends $6_1$ to $6_n$ are positioned on the vertical common axis line by inserting the flow tubes $2_1$ to $2_n$ attached to the nozzles $4_1$ to $4_n$, into the photometric container, or passing through the photometric containers $35_1$ to $35_n$ by fitting the nozzles $4_1$ to $4_n$ with the photometric containers directly or indirectly. The reception ends $7_1$ to $7_n$ or emission ends $6_1$ to $6_n$ that are provided on the portion $44_1$ to $44_n$ on the vertical common axis line of the nozzles $4_1$ to $4_n$ or the suction discharge mechanism 41 are optically connectable with the photoelectric conversion unit 72 or the light source 62 by a flexible light guide path 71(61).

The nozzle head 5 is further provided with a nozzle moving unit 42 that concurrently moves the nozzles $4_1$ to $4_n$ along a Z-axis direction, a magnetic force mechanism 43 that can exert magnetic force into the flow tubes $2_1$ to $2_n$ attached to the nozzles $4_1$ to $4_n$, and a detachment mechanism 45 that makes the flow tubes $2_1$ to $2_n$ concurrently detachable from the nozzles $4_1$ to $4_n$. Here, a combination of the nozzle moving unit 42 that can move the nozzles $4_1$ to $4_n$ in the Z-axis direction, and the nozzle head moving mechanism 51 that can move the nozzle head 5 in the Y-axis direction correspond to the nozzle moving mechanism (51, 42).

The CPU+ program+memory 9 includes an extraction reaction control unit 91 that performs an instruction of extraction or reaction to the nozzle moving mechanism (51,42), the suction discharge mechanism 41, the magnetic force mechanism 43, and a temperature controller, a photometric control unit 92 that performs, based on photometric content designated by the photometric content designation unit 95, control related to the photometric content, on the nozzle moving mechanism (51.42), the suction discharge mechanism 41, and the optical measurement unit, and a photometric analysis unit 93 that derives a physicochemical character or numerical value related to the measurement target chemical substance solution, based on intensity of transmitted light, scattering light, or light related to luminescence, coloration, discoloring, or light variation for the chemical substance solution that has been obtained from the optical measurement unit 8.

Subsequently, a general-purpose optical measuring device 11 obtained by further objectifying the general-purpose optical measuring device 10 according to the first embodiment of the present invention described in FIG. 1 will be described based on FIGS. 2 to 11.

Figure 2:
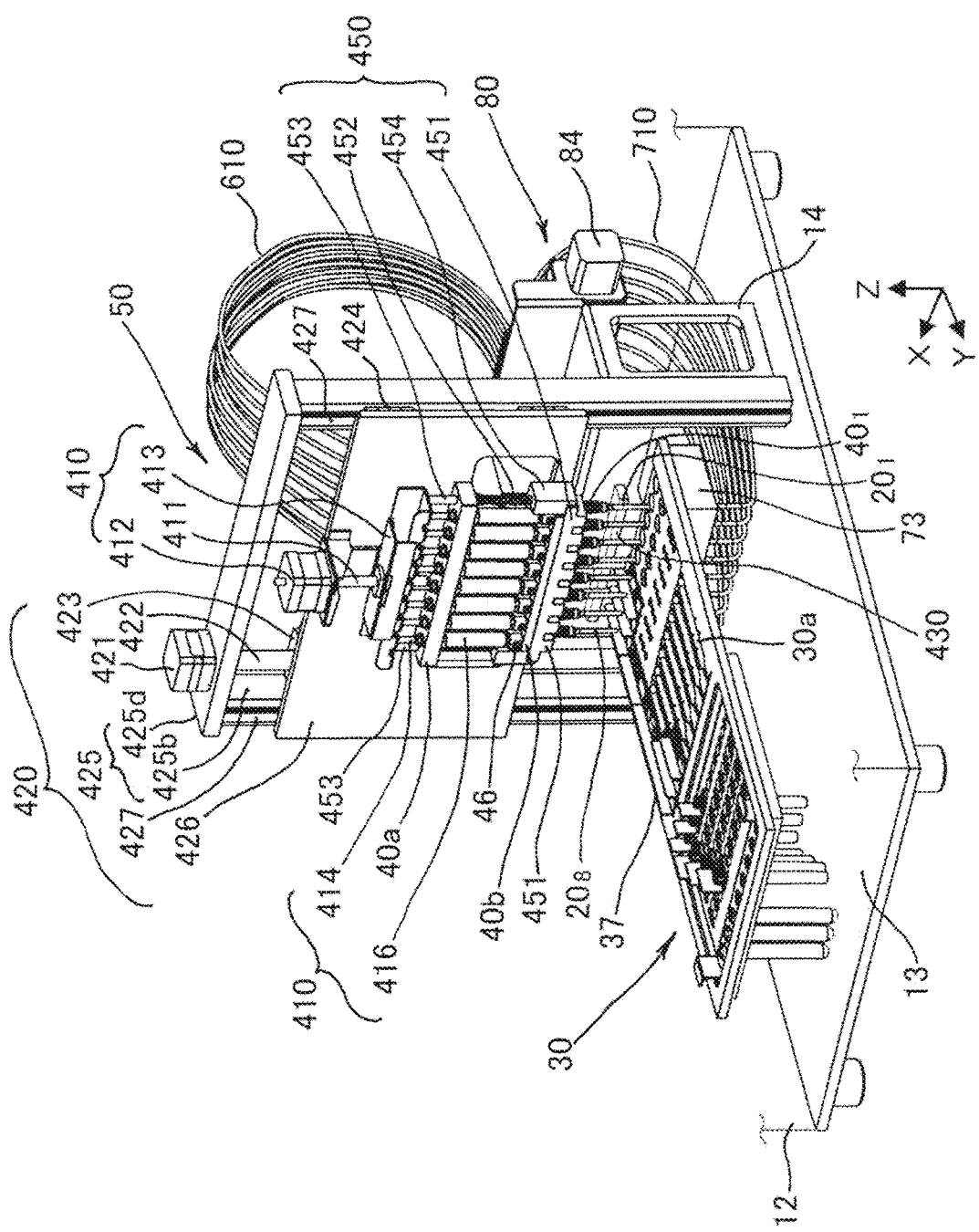
FIG. 2 is a perspective view of a general-purpose optical measuring device according to a first embodiment of the present invention.

As illustrated in FIG. 2, the general-purpose optical measuring device 11 is incorporated into a casing 12 having a function of a dark box that can interrupt intrusion of light from the outside, and a touch tablet (not illustrated) including the operation panel 94 including a photometric content designation unit that designates photometric content for measurement target chemical substance solution is provided on the outside of the casing.

Figure 3:
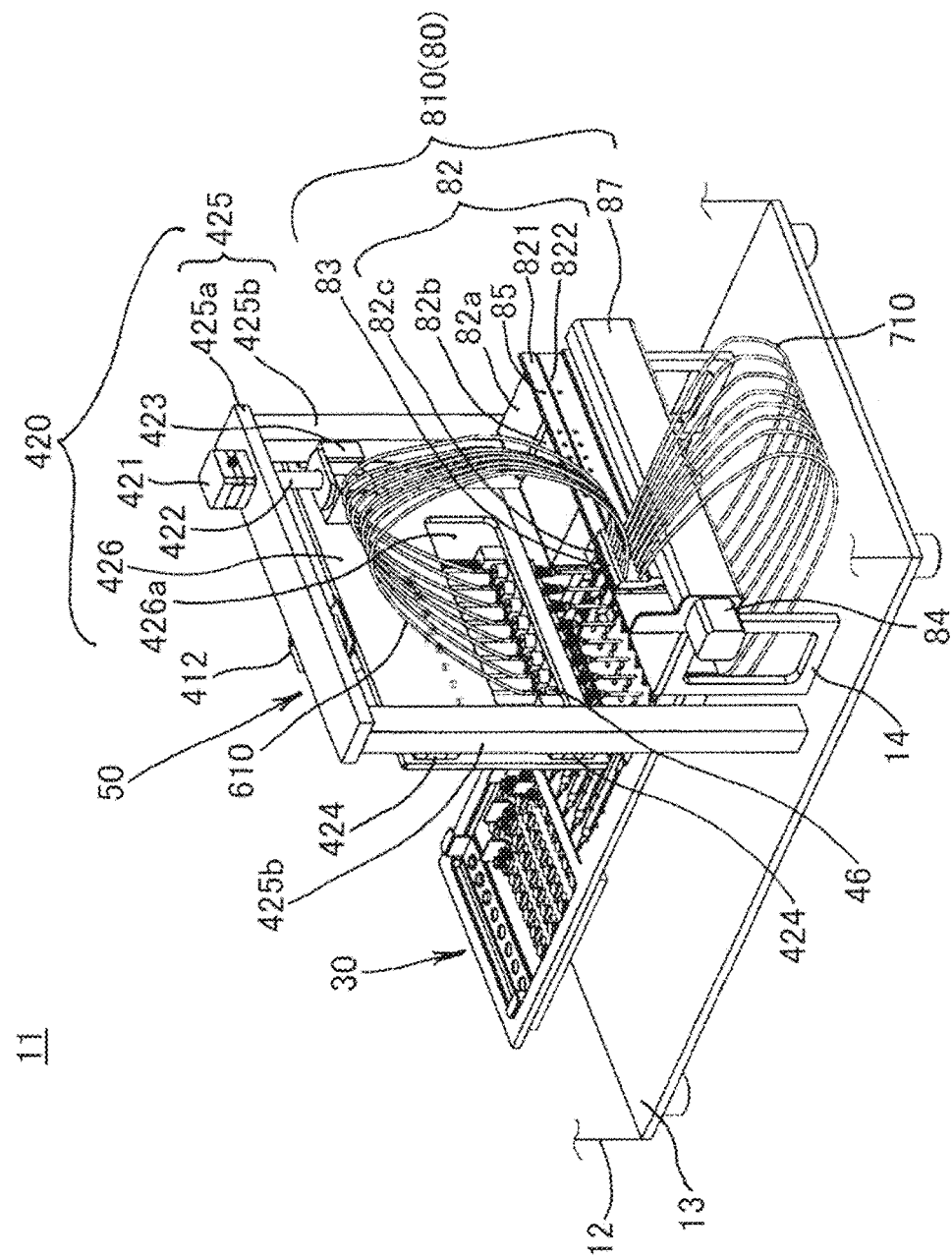
FIG. 3 is a rear side perspective view of the general-purpose optical measuring device illustrated in FIG. 2.
Figure 4:
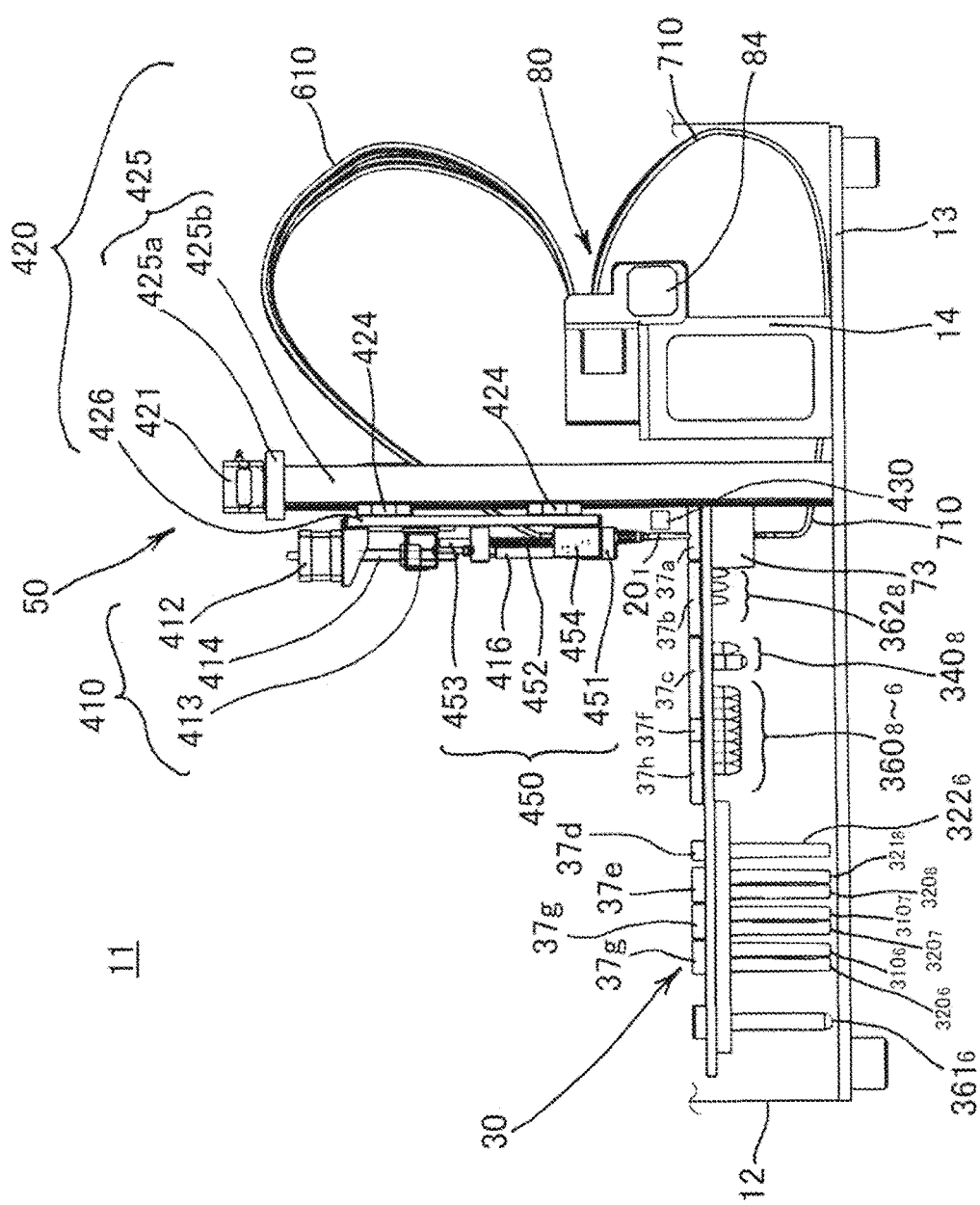
FIG. 4 is a side view of the general-purpose optical measuring device illustrated in FIG. 2 or 3.

As illustrated in FIGS. 2 to 4, the general-purpose optical measuring device 11 according to the present embodiment includes a stage 30 provided with mounting holes 301 to 305 through which storing unit groups $30_1$ to $30_8$ in a plurality of (8 in this example) columns can be mounted so as to be arrayed along the X-axis direction (row direction), in which one or two or more storing units storing one or two or more types of chemical substance solution, various reagents, flow tubes $20_1$ to $20_8$, a boring chip, and a sealed lid, and one or two or more reaction containers that can perform temperature control and includes a photometric container including a bottom portion having a formed translucent region translucent to measurement light defined by the photometric content are arrayed along the Y-axis direction (column direction) so as to extend in a line, a suction discharge mechanism 410 that performs suction and discharge of gas, a nozzle head 50 that is communicated with the suction discharge mechanism 410, and includes a plurality of (8 in this example) nozzles $40_1$ to $40_8$ arrayed along the X-axis direction at an interval of the storing unit groups $30_1$ to $30_8$, a stage moving mechanism (not illustrated) that makes the stage 30 movable with respect to the nozzle head 50, as a nozzle head moving mechanism that makes relatively-movable along the Y-axis direction between the nozzle head 50 and the stage 30, and an optical measurement unit 80.

The general-purpose optical measuring device 11 further includes a plurality of (8 in this example) pairs of irradiation reception pairs including emission ends $60_1$ to $60_8$ that can emit measurement light defined by the designated photometric content, and reception ends $70_1$ to $70_8$ that can receive at least light emitted from the emission ends, and the emission end of one element of the irradiation reception pairs is provided at the tip of the nozzles $40_1$ to $40_8$, and a reception pair of the other element of the irradiation reception pairs is provided on the lower side of the photometric container. Furthermore, the general-purpose optical measuring device 11 is provided with optical fibers 610 serving as a plurality of (8 in this example) bundles of light guide paths having one end connected with the emission end, and the other end connected with the optical measurement unit 80, and an optical fiber 710 serving as a plurality of (8 in this example) bundles of light guide paths having one end connected with the reception end, and the other end connected with the optical measurement unit 80. The optical measurement unit 80 thereby supplies measurement light to the emission ends, and obtains intensity of light received at the reception ends.

Furthermore, the nozzle head 50 is provided with eight flow tubes $20_1$ to $20_8$ including, at the lower end, a port portion 20a that can perform suction and discharge of liquid, and can be inserted into the storing unit, and at the upper end, an attachment opening portion 20b detachably attached to the nozzles $40_1$ to $40_8$, a nozzle moving unit 420 that makes the nozzles $40_1$ to $40_8$ concurrently movable in the Z-axis direction with respect to the stage 30, a magnetic force mechanism (not illustrated) that can concurrently exert and remove magnetic force to the inside of the flow tubes $20_1$ to $20_8$ attached to the nozzles $40_1$ to $40_8$, and is provided with a magnet so as to be operable forward and backward with respect to the flow tubes $20_1$ to $20_8$, and a detachment mechanism 450 that can detach the flow tubes $20_1$ to $20_8$ attached to the nozzles $40_1$ to $40_8$. Here, a combination of the stage moving mechanism and the nozzle moving unit 420 corresponds to the nozzle moving mechanism.

The nozzle head 50 is supported by a nozzle head support frame 425 fixedly provided on a substrate 13 of the general-purpose optical measuring device 11, and the stage moving mechanism includes a Y-axis moving mechanism in which a rail provided on the substrate 13 and laid in the Y-axis direction, a timing belt stretched over the rotor along the Y-axis direction, and the stage 30 that is movable in the Y-axis direction by the timing belt are coupled.

As illustrated in FIGS. 2 to 4, the nozzle moving unit 420 of the nozzle head 50 includes a motor 421 provided on a beam 425a extending in the X-axis direction of the support frame 425, a ball screw 422 that is rotatably driven by the motor 421, and is provided so as to extend in a lower direction, a Z-axis moving plate 426 attached to a nut portion 423 screwed with the ball screw 422 by the rotation of the ball screw 422, a guide rail 427 laid along the Z-axis direction along two prismatic columns 425b that are vertically installed on the substrate 13, and support the beam 425a of the support frame 425 at both ends, and movable guide members 424 that are provided at both rim portions of the Z-axis moving plate 426, and are vertically movable by being slidingly fitted with the guide rail 427.

As illustrated in FIGS. 2 to 4, the suction discharge mechanism 410 of the nozzle head 50 includes a motor 412 for gas suction and discharge that is supported on the Z-axis moving plate 426, a ball screw 411 rotationally-driven by the motor 412, a plunger drive plate 413 that is vertically movable in conjunction with a nut portion screwed with the ball screw 411, and a plurality of (8 in this example) plungers 414 that is engaged with the plunger drive plate 413, and slides in a plurality of (8 in this example) cylinders 416. In addition, a coil spring is winded around the plunger, and the plunger is always biased in the lower direction with respect to the cylinder.

As illustrated in FIGS. 2 to 4, the plurality of cylinders 416 is supported at the upper end by a cylinder support substrate 40a attached to the Z-axis moving plate 426, so as to extend in the lower direction, and at the lower end, coupled so as to respectively fit with a plurality of (8 in this example) coupling tools 46 provided with being arrayed on a nozzle support substrate 40b attached to the Z-axis moving plate 426. The cylinder support substrate 40a and the nozzle support substrate 40b correspond to the nozzle support member 4.

As illustrated in FIGS. 2 to 4, the nozzle head 50 includes a detachment mechanism 450 for detaching the flow tubes $20_1$ to $20_8$ attached to the nozzles $40_1$ to $40_8$, and the detachment mechanism 450 includes a comb teeth detachment member 451 in which a detachment hole or a clearance which has an inner diameter larger than an outer diameter of the nozzles $40_1$ to $40_8$, but smaller than an outer diameter of the flow tubes attached to the nozzles $40_1$ to $40_8$, and through which the each nozzle penetrates is formed at the tip of each comb tooth, and is provided in a state of being in contact with the lower side of the nozzle support substrate 40b, two box-shaped spring retainers 454 passing through both ends of the nozzle support substrate 40b, and being attached to both ends of the comb teeth detachment member 451, two poles 453 having an lower end fixed to the spring retainer 454, and an upper end penetrating through the cylinder support substrate 40a to reach the upper side, and positioned on the lower side of the plunger drive plate 413 at a predetermined distance, and a coil spring 452 spirally winded around the poles 453, having an upper end attached to the cylinder support substrate 40a, and a lower end attached to the spring retainer 454. By moving to a position lower than a height position for suction and discharge, the plunger drive plate 413 separates the detachment member 451 from the nozzle support substrate 40b in the lower direction, and performs detachment of the flow tubes. If the plunger drive plate 413 is returned to the height position for suction and discharge, by compressing force of the spring 452, the detachment member 451 retracts up to the nozzle support substrate 40b.

The stage 30 of the general-purpose optical measuring device 11 according to the present embodiment will be described based on FIGS. 4 and 5.

The stage 30 is formed into a plate, and eight columns of mounting holes 301 to 305 provided so that a plurality of (8 in this example) columns of the storing unit groups $30_1$ to $30_8$ can be mounted are pierced along the column direction (Y-axis direction). The storing unit groups $30_1$ to $30_8$ respectively include a measurement area 30A in which photometric containers $350_1$ to $350_8$ used for measurement, storing units $330_1$ to $330_8$ storing a sealed lid 25, and liquid storing unit groups $362_1$ to $362_8$ storing amplification reagent are provided, and cartridge containers 38a and 38b provided with partition walls 37a and 37b along a rim portion on one side can be mounted, an extraction area 30B in which cartridge containers 38c, 38f, and 38h having liquid storing units $360_1$ to $360_8$ storing extraction reagent or the like, or reaction containers $340_1$ to $340_8$, and provided with partition walls 37c, 37f, and 37h can be mounted, and a flow tube area 30C in which cartridge containers 38d, 38e, and 38g including a boring chip storing unit 322 storing a boring chip 23, flow tube storing units 310, 320, and 321 storing various flow tubes 20 and 21, and partition walls 37d, 37e, and 37g, and further includes a sample area 30D provided with a cartridge container 38i which is one row of cartridge container extending in the row direction (X-axis direction), and in which sample is to be stored.

Figure 5:
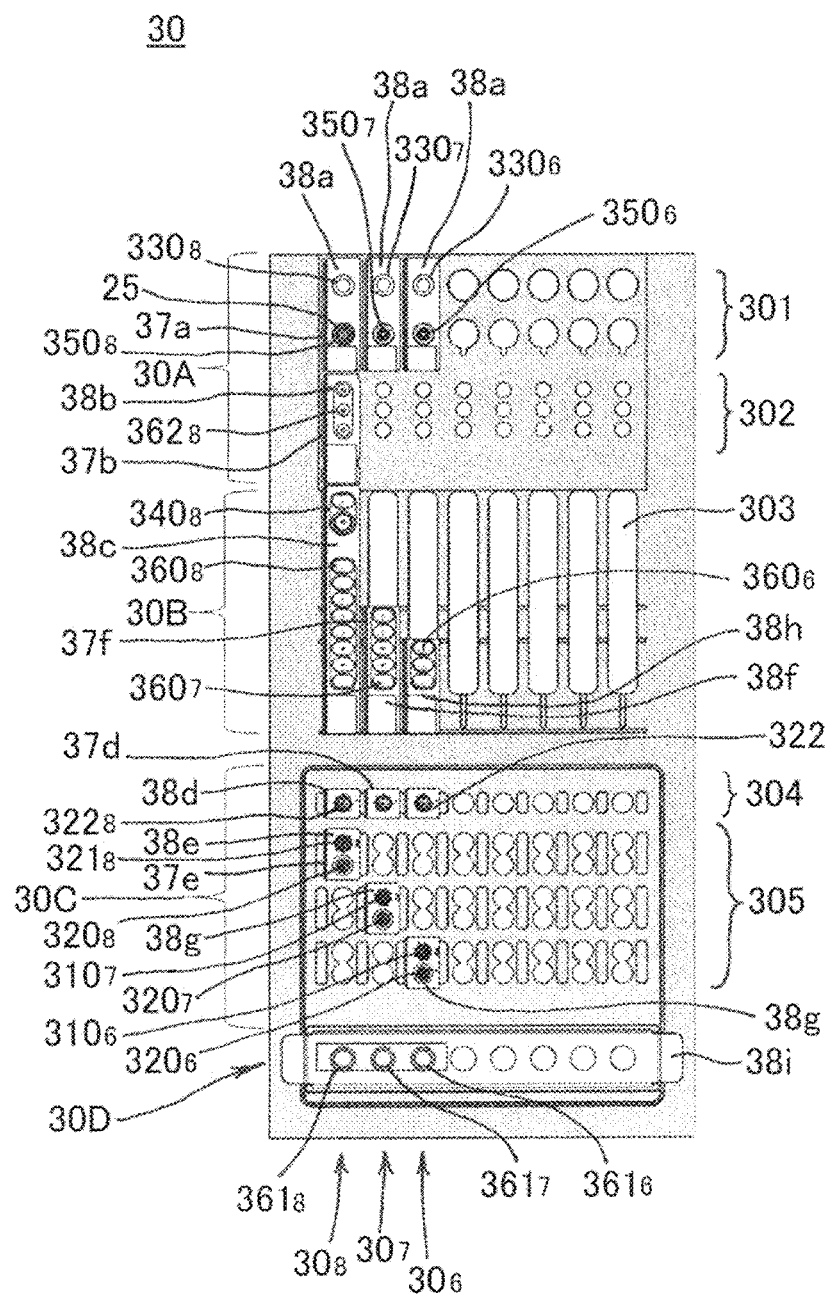
FIG. 5 is a plane view illustrating an array example of a cartridge container on a stage of the general-purpose optical measuring device illustrated in FIGS. 2 to 4.

FIGS. 4 and 5 illustrate an arrangement example of the stage 30 for performing real-time PCR measurement (storing unit group $30_8$), immunochemistry luminescence measurement (storing unit group $30_7$), measurement of living substance absorption spectrum (OD value) (storing unit group $30_6$), using three columns of storing unit groups $30_8$ to $30_6$ of the stage 30.

In the storing unit group $30_8$, reagent or the like that is to be used for real-time PCR measurement is prestored, and in the measurement area 30A of the storing unit group $30_8$, the photometric cartridge container 38a including the sealed lid storing unit $330_8$ storing the sealed lid 25 and the photometric container $350_8$ that can be made by the sealed lid 25, and the partition wall 37a provided in the rim portion on one side, and the PCR reagent cartridge container 38b including three liquid storing units $362_8$ storing real-time PCR measurement PCR reagent, and the partition wall 37b are mounted in the mounting holes 301 and 302 of the measurement area 30A. In the extraction area 30B of the storing unit group $30_8$, the extraction cartridge container 38c including the eight liquid storing units $360_8$ storing extraction reagent for extracting target nucleic acid from the sample, magnetic grains, or the like, the reaction container $340_8$ that can perform temperature control, the liquid storing unit $340_8$ storing a product, and the partition wall 37c are mounted in a mounting hole 303. In addition, in the flow tube area 30C of the storing unit group $30_8$, the boring cartridge container $38d$ including the boring chip storing unit $322_8$ storing the boring chip 23, and the partition wall $37d$, and the flow tube cartridge container $38e$ including the dispensing flow tube storing unit $320_8$, a minute amount dispensing flow tube storing unit $321_8$, and the partition wall $37e$ are mounted in mounting holes 304 and 305. In the sample area 30D of the storing unit group $30_8$, a sample liquid storing unit $361_8$ of the sample cartridge container $38i$ provided with sample liquid storing units $361_1$ to $361_8$ so as to cross over the storing unit groups $30_1$ to $30_8$ is provided.

Furthermore, the storing unit group $30_7$ prestores reagent or the like that is to be used for immunochemistry luminescence measurement, and in the measurement area 30A of the storing unit group $30_7$, the cartridge solution $38a$ including a sealed lid storing unit $330_7$ not storing a sealed lid, and a photometric container $350_7$ is mounted in the mounting hole 301. In the extraction area 30B of the storing unit group $30_7$, the extraction cartridge container $38f$ including five liquid storing units $360_7$ storing antibody reagent labeled with a chemiluminescence substance that extracts a target immune substance form the sample, antibody fixing magnetic grains slurry, substrate liquid, and the like, and the partition wall $37f$ is mounted in the mounting hole 303. In the flow tube area 30C of the storing unit group $30_7$, the boring cartridge container $38d$ and the flow tube cartridge container $38g$ including a photometric flow tube storing unit $310_7$ storing a light-blocking photometric flow tube $20_7$ formed of black material, a dispensing flow tube $21_7$ and the partition wall $37g$ are mounted in the mounting holes 304 and 305. The flow tube cartridge container $38g$ is mounted with being shifted in the Y direction so as not to overlap the flow tube cartridge container $38e$ of the adjacent storing unit group $30_8$ in the X direction. This is for attaching only one flow tube to the nozzle of the nozzle head 50. In the sample area 30D of the storing unit group $30_7$, the sample liquid storing unit $361_7$ of the sample cartridge container $38i$ is provided.

In addition, the storing unit group $30_6$ stores reagent or the like that is to be used for absorbance (OD value) measurement, and in the measurement area 30A of the storing unit group $30_6$, the photometric cartridge container $38a$ including a sealed lid storing unit $330_6$ not storing the sealed lid 25, and a photometric container $350_6$ is mounted in the mounting hole 301. In the extraction area 30B of the storing unit group $30_6$, extraction reagent for extracting a target chemical substance from the sample or the like is stored. For example, the extraction cartridge container $38h$ including three liquid storing units $360_6$ is mounted in the mounting hole 303 (when nucleic acid is extracted, the extraction cartridge container $38c$ is used as necessary), and in the flow tube area 30C of the storing unit group $30_6$, the boring cartridge container $38d$ including a boring chip storing unit $322_6$, and the flow tube cartridge container $38g$ including a photometric flow tube storing unit $310_6$ and a dispensing flow tube storing unit $320_6$ are mounted in the mounting holes 304 and 305. The cartridge container $38g$ is mounted with being further shifted in the Y direction so as not to overlap both of the cartridge container $38e$ of the storing unit group $30_8$, and the cartridge container $38g$ of the adjacent storing unit group $30_7$, in the X direction. This is for attaching only one flow tube to the nozzle of the nozzle head 50. In the sample area 30D of the storing unit group $30_6$, a sample liquid storing unit $361_6$ of the sample cartridge container $38i$ is provided.

In addition, additionally, as an array example of the stage 30, there is a case of mounting eight columns of storing unit groups $30_1$ to $30_8$ of the stage 30 into a cartridge container group that is based on one type of measurement of the three types of measurement, and performing measurement of the set one type, for eight different samples, or the case of sequentially replacing mounting with another cartridge container group without changing a sample, and performing measurement of another type. Alternatively, a case of using eight same samples, but performing measurement while changing a measurement condition for each sample is possible.

Subsequently, an optical system of the general-purpose optical measuring device 11 according to the present embodiment will be described in more detail based on FIGS. 6 to 11.

Figure 6:
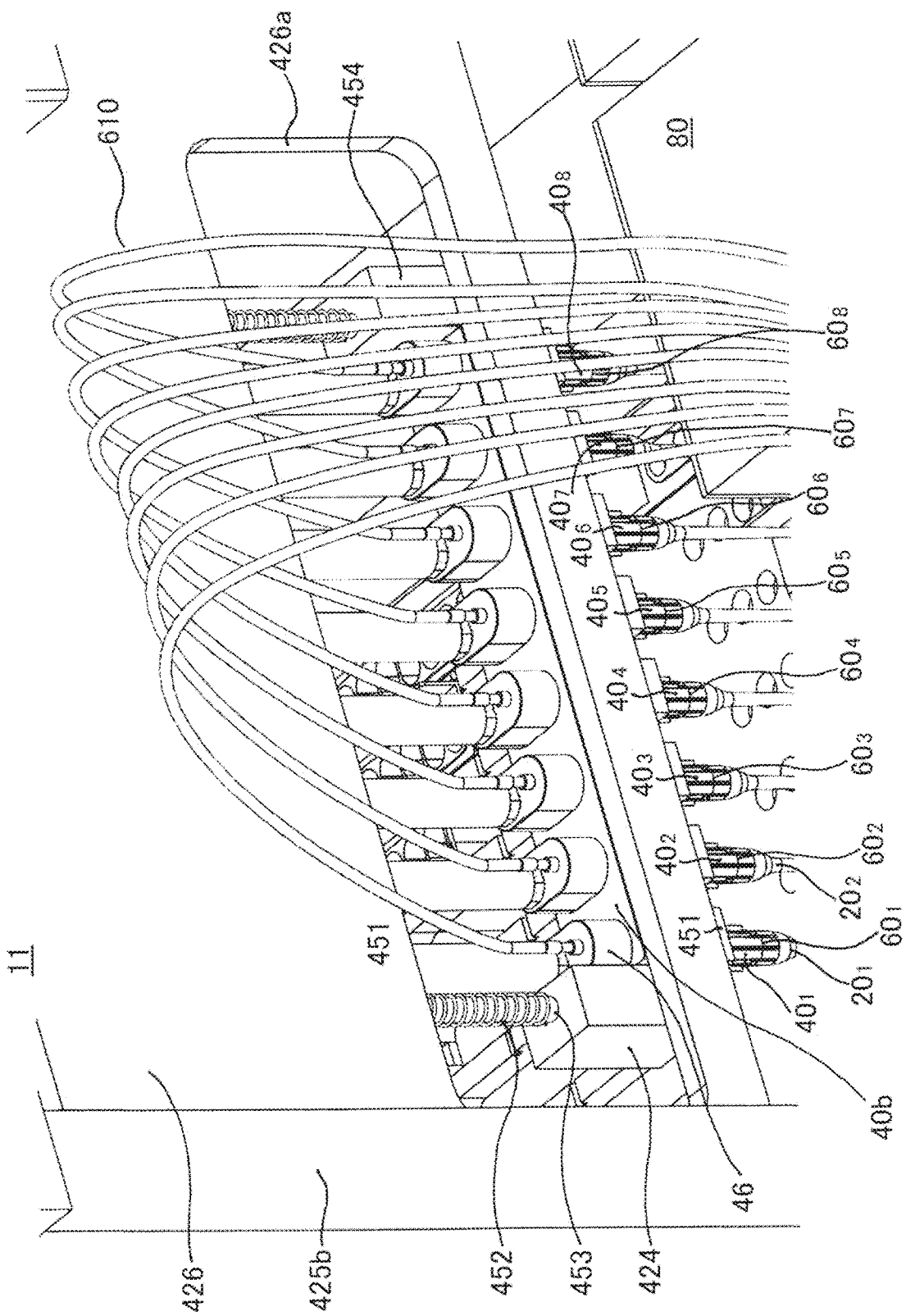
FIG. 6 is a partially-enlarged perspective view illustrating a part of FIG. 3 in an enlarged manner.
Figure 7:
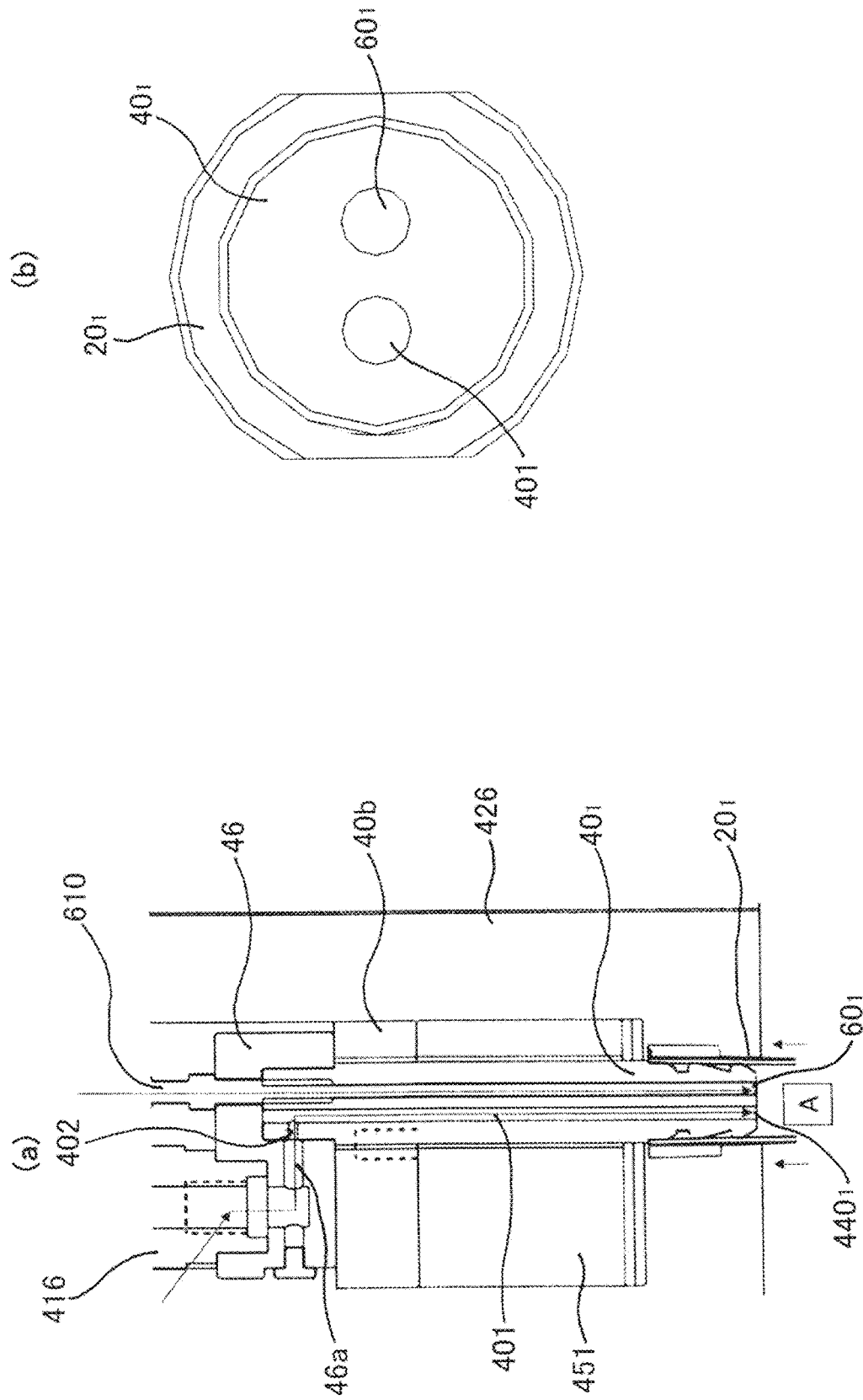
FIG. 7 is a cross-sectional view illustrating a coupling tool and a nozzle illustrated in FIG. 6.

As illustrated in FIGS. 6 and 7, in the general-purpose optical measuring device 11, one element of a plurality of (8 in this example) pairs of the irradiation reception pairs, that is, a plurality of (8 in this example) emission ends $60_1$ to $60_8$ that can emit measurement light defined by photometric content designated by the photometric content designation unit 95 are provided at tips $440_1$ to $440_8$ of the respective nozzles $40_1$ to $40_8$. The optical fibers 610 are optically connected with the emission ends $60_1$ to $60_8$ via the respective coupling tools 46. The coupling tools 46 optically connect the optical fibers 610 with the nozzles $40_1$ to $40_8$ and the emission ends $60_1$ to $60_8$, and each of the emission ends $60_1$ to $60_8$ is not only provided as one end portion of the eight (or bundles, the same applies to the following) optical fibers 610, but also communicate a dispensing air hole 401 and a cylinder 416 of the nozzle via a flow path $46a$ provided in the coupling tool. The eight optical fibers 610 penetrate through a hole $426a$ pierced in the Z-axis moving plate 426, to reach the optical measurement unit 80, and the other end portions of the optical fibers 610 are arrayed in a line along the horizontal direction as a first connection end line, on a connection end array surface 831 of a connection end array body 83 provided on an irradiation reception pair interlock switching unit 81 of the optical measurement unit 80 as first connection ends $88_1$ to $88_8$ (refer to FIG. 11).

Figure 9:
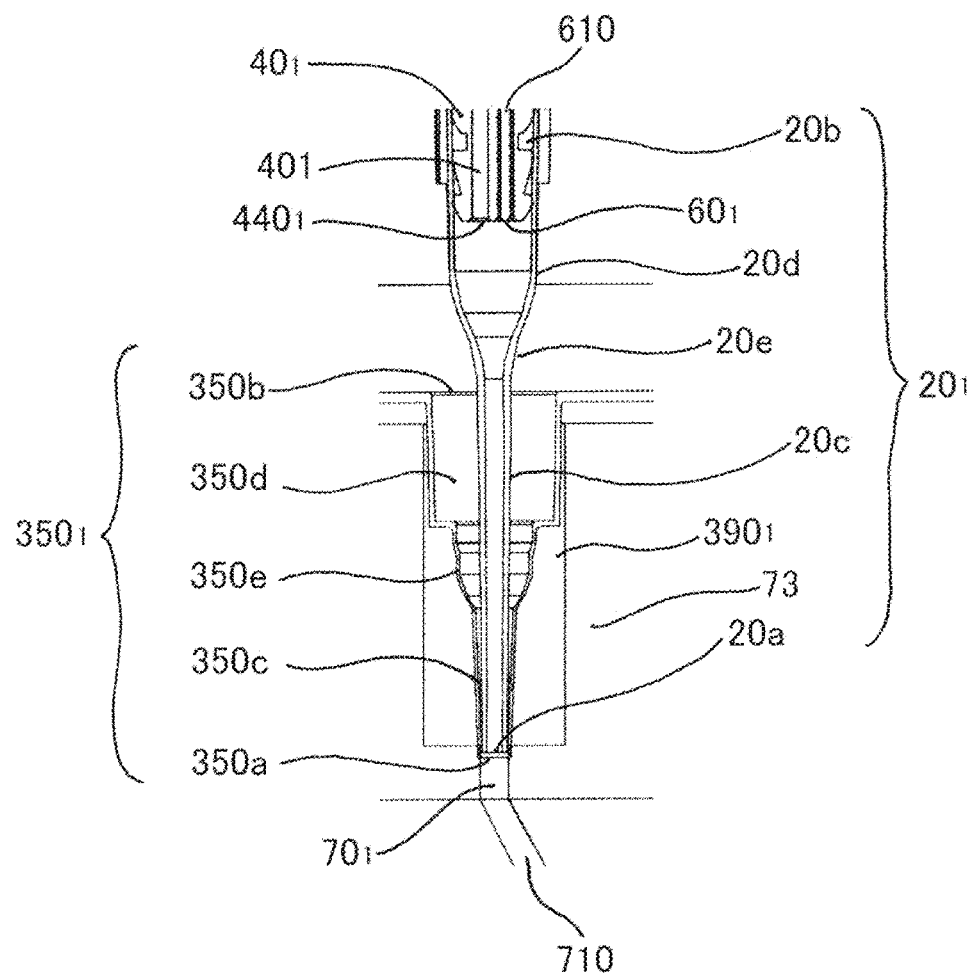
FIG. 9 is an enlarged cross-sectional view illustrating a use state of a flow tube and a photometric container of the general-purpose optical measuring device illustrated in FIGS. 2 to 4.
Figure 10:
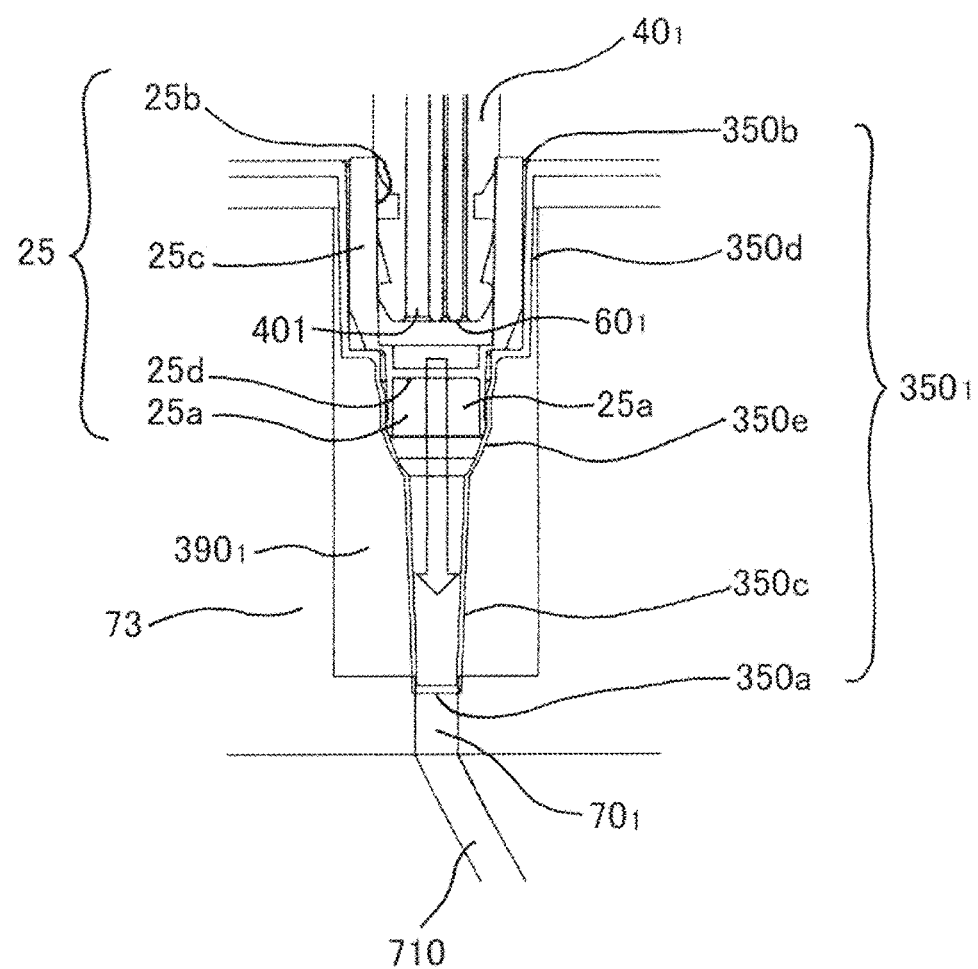
FIG. 10 is an enlarged cross-sectional view illustrating a use state of a sealed lid and a photometric container of the general-purpose optical measuring device illustrated in FIGS. 2 to 4.

As illustrated in FIGS. 8 to 11, the other elements of the plurality of (8 in this example) pairs of the irradiation reception pairs, that is, a plurality of (8 in this example) reception ends $70_1$ to $70_8$ that can receive light emitted from the emission ends $60_1$ to $60_8$ is provided in a reception box 73 illustrated in FIG. 8, provided with being closely attached to the bottom portion $350a$ which is a lower side of the translucent region of each bottom portion $350a$ of the plurality of (8 in this example) photometric containers $350_1$ to $350_8$ as illustrated in FIG. 9 or 10, and provided as one end portions of the eight optical fibers 710. The eight optical fibers 710 penetrate through a lower side plate of the reception box 73 to reach the optical measurement unit 80, and the other end portions of the optical fibers 710 are arrayed in parallel in a line in the horizontal direction at a predetermined distance from the first connection end line, as a second connection end line of the connection end array surface 831 of the connection end array body 83 provided on the irradiation reception pair interlock switching unit 81 of the optical measurement unit 80 as second connection ends $89_1$ to $89_8$. At this time, on the connection end array surface 831, sets (sets having the same subscript numbers) of first connection ends and second connection ends arrayed along the vertical direction form eight pairs of connection end pairs (1) to (8).

As illustrated in FIG. 9, the photometric container $350_1$ is formed of translucent material in entirety, and accordingly, includes a thin cylindrical portion $350c$ including a translucent bottom portion $350a$, a wide cylindrical portion $350d$ being formed to be wider than the thin cylindrical portion 350c, and including an opening portion 350b at an upper end, and an intermediate portion 350e communicated with the thin cylindrical portion 350c and the wide cylindrical portion 350d. A lower side of the bottom portion 350a is closely connected with the reception end $70_1$. In addition, a sign $390_1$ is a temperature control block.

In addition, while the photometric flow tube $20_1$ is formed of black material in entirety to have a light blocking effect, the dispensing flow tube has a shape similar to that of the photometric flow tube, but differs in having translucency. The flow tube $20_1$ includes a narrow tube 20c including the port portion 20a at the tip, a wide tube 20d formed to be wider than the narrow tube 20c, and including the attachment opening portion 20b at the upper end, and a transition portion 20e communicated with the narrow tube 20c and the wide tube 20d. The narrow tube 20c of the flow tube $20_1$ is inserted into the thin cylindrical portion 350c, and provided so that the port portion 20a can contact the bottom portion 350a.

FIG. 9 illustrates a state where the narrow tube 20c of the photometric flow tube $20_1$ attached to the nozzle $40_1$ is inserted into the thin cylindrical portion 35c of the photometric container $350_1$, and the port portion 20a is brought into contact with the bottom portion 350a. A case where transmitted light is received at the reception end $70_1$ based on measurement light emitted from the emission end $60_1$ is illustrated.

As illustrated in FIG. 10, the sealed lid 25 includes a depression 25b that can fit with the nozzle $40_1$, includes an upper side blocking portion 25c blocking the wide cylindrical portion 350d of the photometric container $350_1$, and a lower side blocking portion 25a formed to be thinner than the upper side blocking portion 25c, and can block the intermediate portion 350e, and is formed to entirely have translucency.

Figure 11:
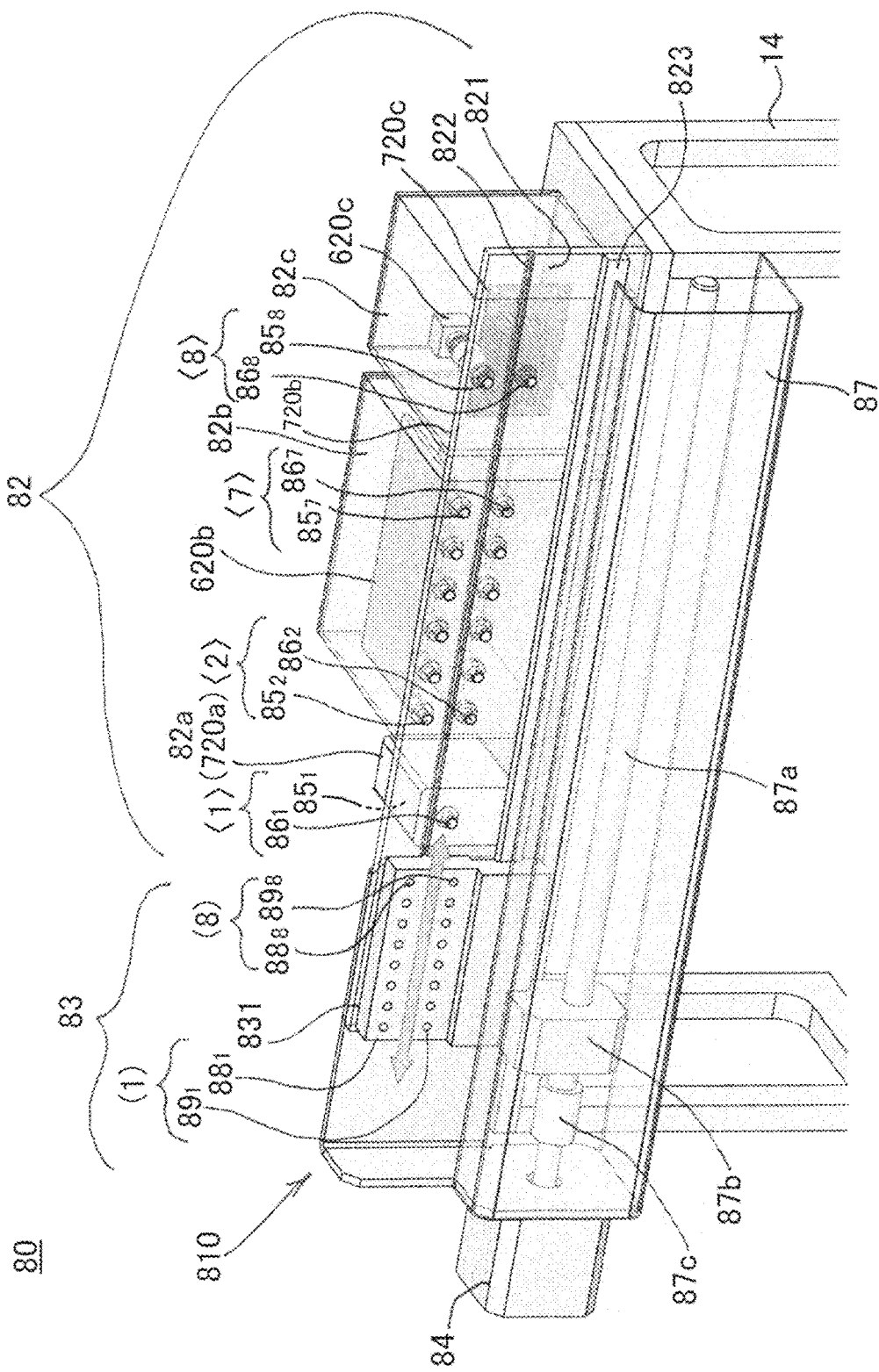
FIG. 11 is a perspective transparent view illustrating, in an enlarged manner, an optical measurement device taken out from the general-purpose optical measuring device illustrated in FIGS. 2 to 4.

As illustrated in FIG. 11, the optical measurement unit 80 of the general-purpose optical measuring device 11 according to the first embodiment of the present invention includes a plurality of light sources 620b and 620c, that is, six wavelength variable light sources 620b respectively set to be able to emit six types of excitation light (e.g. 496 nm, 527 nm, 555 nm, 587 nm, 593 nm, 647 nm), and a white light source 620c that can emit white light, and these are optically connected with respective first measurement ends $85_2$ to $85_8$ by respective light guide portions. In addition, a plurality of photoelectric conversion units 720a, 720b, and 720c, that is, one photoelectric conversion unit 720a, a plurality of photoelectric conversion units 720b connected via a plurality of bandpass filters (e.g. 517 nm, 549 nm, 580 nm, 599 nm, 613 nm, 653 nm, these wavelengths correspond to fluorescence substance FAM, HEX, TAMURA, ROX, Texas Red, and Cy5), and a plurality of photoelectric conversion units (e.g. line sensor-type spectrophotometer) 720c connected via a spectral device are optically connected with respective second measurement ends $86_1$ to $86_8$ by respective light guide portions.

That is, for example, as for a measurement end pair <1>, there is no light source, and light is shielded, and a photoelectric conversion unit is a photon counter. As for a measurement end pair <2>, a light source is an LED that emits light with excitation light source 496 nm, and a photoelectric conversion unit is a high-sensitivity photodiode connected via a bandpass filter of wavelength 517 nm, as for a measurement end pair <3>, a light source is an LED that emits light with excitation light source 527 nm, and a photoelectric conversion unit is a high-sensitivity photodiode connected via a bandpass filter of wavelength 549 nm, as for a measurement end pair <4>, a light source is an LED that emits light with excitation light source 555 nm, and a photoelectric conversion unit is a high-sensitivity photodiode connected via a bandpass filter of wavelength 580 nm, as for a measurement end pair <5>, a light source is an LED that emits light with excitation light source 587 nm, and a photoelectric conversion unit is a high-sensitivity photodiode connected via a bandpass filter of wavelength 599 nm, as for a measurement end pair <6>, a light source is an LED that emits light with excitation light source 593 nm, and a photoelectric conversion unit is a high-sensitivity photodiode connected via a bandpass filter of wavelength 613 nm, and as for a measurement end pair <7>, a light source is an LED that emits light with excitation light source 647 nm, and a photoelectric conversion unit is a high-sensitivity photodiode connected via a bandpass filter of wavelength 653 nm. These measurement end pairs <2> to <7> correspond to fluorescence substance FAM, HEX, TAMURA, ROX, Texas Red, and Cy5. In addition, as for the measurement end pair <8>, a light source is a deuterium lamp, and a photoelectric conversion unit is a line sensor-type spectrophotometer.

The optical measurement unit 80 further includes an irradiation reception pair interlock switching unit 810, and the irradiation reception pair interlock switching unit 810 switches, for the plurality of pairs of irradiation reception pairs, connection or interruption between the emission ends $60_1$ to $60_8$ and the plurality of light sources 620b and 620c, and connection and interruption between the reception ends $70_1$ to $70_8$ and the plurality of photoelectric conversion units 720a, 720b, and 720c, for each of the irradiation reception pairs, in an interlocked manner, by an unidirectional motion at a predetermined speed, or a reciprocating motion or fluctuation at a predetermined cycle (rotational reciprocating motion at a predetermined angle).

As illustrated in FIG. 11, the irradiation reception pair interlock switching unit 810 includes the connection end array body 83 including the connection end array surface 831 on which a plurality of (8 in this example) pairs of connection end pairs (1) to (8) including the plurality of first connection ends $88_1$ to $88_8$ optically connected with the plurality of emission ends $60_1$ to $60_8$ by the plurality of optical fibers 610, and the plurality of second connection ends $89_1$ to $89_8$ optically connected with the plurality of reception ends $70_1$ to $70_8$ by the plurality of optical fibers 710 are arrayed, a measurement end array body 82 including a measurement end array surface 821 on which a plurality of (8 in this example) pairs of measurement end pairs <1> to <8> (sets (sets having the same subscript numbers) of first measurement ends and second measurement ends) including first measurement ends $85_1$ to $85_8$ (measurement end $85_1$ is not connected with a light source, and optically interrupted by the measurement end array surface 821) connected via the plurality of light sources 620a and 620b and a light guide portion, and second measurement ends $86_1$ to $86_8$ connected via the plurality of photoelectric conversion units 720a, 720b, and 720c and a light guide portions are arrayed, and switching mechanisms 87 and 84 that moves the connection end array body 83 with respect to the measurement end array body 82 so that the connection end array surface 831 and the measurement end array surface 821 slide, enables simultaneous connection or interruption between corresponding elements belonging to the connection end pairs (1) to (8) and the measurement end pairs <1> to <8>, and sequentially performs, for each of the one or two or more irradiation reception pairs, connection or interruption between the emission end and the light source, in an interlocked manner with connection and interruption between the reception end and the photoelectric conversion unit.

In this example, on the connection end array surface 831, the first connection end line in which the plurality of first connection ends 88$_1$ to 88$_8$ are arrayed in a line, and the second connection end line in which the plurality of second connection ends 89$_1$ to 89$_8$ are arrayed in a line are formed in parallel for each connection end pair at a predetermined distance, and on the measurement end array surface 821, the first measurement end line in which the plurality of first measurement ends 85$_1$ to 85$_8$ are arrayed, and the second measurement end line in which the plurality of second measurement ends 86$_1$ to 86$_8$ are arrayed are formed for each measurement end pair at the predetermined distance. In addition, the respective array routes or directions of the first connection end line, the second connection end line, the first measurement end line, and the second measurement end line coincide with or are parallel to a movement route or direction of the connection end array body, and the first connection end line and the first measurement end line pass through each other, and the second connection end line and the second measurement end line pass through each other. In addition, the switching mechanisms 87 and 84 include a motor 84, a ball screw 87*a* extending in the X-axis direction that is rotationally-driven by the motor 84, a nut portion 87*b* screwed with the ball screw 87*a*, and an adapter 87*c* that mechanically connects the motor 84 shafts and the ball screw 87*a*, and the nut portion 87*b* is coupled to the connection end array body 83. In accordance with the movement of the nut portion 87*b*, the connection end array body 83 moves along the X-axis direction by being engaged with a rail 823 laid along the X-axis direction of the measurement end array surface 821. In addition, a sign 822 is a guide groove 822 engraved along the X-axis direction of the measurement end array surface 821, and guides the connection end array body 83 along the X-axis direction by being engaged with a convex portion of the connection end array body 83.

Here, the measurement end pair <1> measures existence or non-existence of or an amount of a target chemical substance labeled with a chemiluminescence, and the first measurement end 85$_1$ is not connected with a light source. The measurement end pairs <2> to <7> measure existence or non-existence of or an amount of a target chemical substance labeled with six types of fluorescence substances, and for example, are applied to real-time PCR, and the measurement end pair <8> is applied to measurement of absorbance and concentration. In addition, the emission ends 60$_1$ to 60$_n$, the reception ends 70$_1$ to 70$_n$, and the optical measurement unit 80 correspond to an optical measurement device.

Subsequently, an operation of the general-purpose optical measuring device 11 according to an embodiment of the present invention will be described.

In the liquid storing units 361$_1$ to 361$_8$ of the sample area 30D provided on the stage 30 of the general-purpose optical measuring device 11, any sample of solution containing whole blood, blood serum, biological fluid, slops, and the like that are collected from human or animals, soil, soil water, or the like, diluted solution, and the like is stored. Designated various examinations are performed based on these samples. Here, the description will be given of a case where various measurements that are based on designated photometric content are performed using whole blood collected from a dog, as a sample.

An example case where, as a sample, the canine genome is extracted from whole blood collected from eight different dogs, for example, and measurement of concentration of extracted DNA is performed is illustrated. The measurement corresponds to quality evaluation (QC) as to whether DNA extraction with predefined quality has been performed, and is performed for enhancing reliability such as amplification that uses the DNA.

For achieving this, the description will be given of a case where various cartridge containers 38*a*, 38*b*, 38*c*, 38*d*, and 38*e* corresponding to eight columns of the real-time PCR measurement storing unit group 30$_8$ illustrated in FIG. 5 are mounted on the stage 30 of the general-purpose optical measuring device 11 to be regarded as storing unit groups 30$_1$ to 30$_8$, nucleic acid such as canine genome is extracted from whole blood solution of dog of the sample liquid, and measurement of the concentration is performed. In each sample liquid storing units 361$_1$ to 361$_8$ of the cartridge container 38*i* of the sample area 30D, blood serum solution obtained by diluting dog whole blood with normal saline solution is stored. In addition, extraction reagent and cleaning liquid are prepacked in each of liquid storing units 360$_1$ to 360$_8$ of the DNA extraction cartridge container 38*c*.

In step S1, by an operation of the photometric content designation unit 95 of the operation panel 94, extraction of canine genome from the sample and measurement of absorbance are instructed.

In step S2, the extraction reaction control unit 91 of the CPU+ program+memory 9 of the general-purpose optical measuring device 11 instructs a stage moving mechanism serving as the nozzle head moving mechanism 51, to move the stage 30 in the Y-axis direction, attaches the boring chip 23 to the nozzle by moving the nozzles 40$_1$ to 40$_8$ to the upper side of the boring cartridge container 38*d*, and lowering using the nozzle moving unit 420, bores a film coating an opening portion of the liquid storing unit by positioning the boring chip on the upper side of the first liquid storing units 360$_1$ to 360$_8$ of the extraction cartridge container 38*c* using the stage moving mechanism, and lowering the nozzle by the nozzle moving unit 420, and similarly, sequentially bores the other liquid storing units 360$_1$ to 360$_8$ and reaction containers of the extraction cartridge container 38*c* by moving the stage 30 in the Y-axis direction by the stage moving mechanism. In addition, the extraction cartridge container 38*c* stores separation and extraction solution in the following manner. 40 μL of Lysis 1 is stored in a first liquid storing unit, 200 μL of Lysis 2 is stored in a second liquid storing unit, 500 μL of binding buffer liquid is stored in a third liquid storing unit, magnetic grain slurry is stored in a fourth liquid storing unit, 700 μL of cleaning liquid 1 is stored in a fifth liquid storing unit, 700 μL of a cleaning liquid 2 is stored in a sixth liquid storing unit, 50 μL of distilled water is stored in a seventh liquid storing unit as disaggregation liquid, and isopropyl alcohol (isopropanol) used for removal of protein or the like is stored in an eighth liquid storing unit as part of the protein separation and extraction solution.

In step S4, by moving in the Y-axis direction again using the stage moving mechanism, moving to the boring cartridge container 38*d*, detaching using the detachment mechanism, moving the stage 30 again in the Y-axis direction, and lowering the nozzles 40$_1$ to 40$_8$ using the nozzle moving unit 420, the flow tubes 21$_1$ to 21$_8$ are attached.

In step S5, after moving to the sample liquid storing units 361$_1$ to 361$_8$ storing the sample, by lowering and inserting the narrow tube of the flow tube 21$_i$ (i=1 to 8) using the nozzle moving unit 420, raising and lowering the drive plate 413 of the suction discharge mechanism 410, and repeating suction and discharge for slurry of whole blood stored in the sample liquid storing units $361_1$ to $361_8$, the sample is suspended in liquid, and then, the sample slurry is sucked into the flow tube $21_i$. The sample specimen slurry is moved along the X-axis by a stage moving mechanism serving as the nozzle head moving mechanism 51, to the first liquid storing unit of the liquid storing unit group $27_i$ storing the Lysis 1 (enzyme) serving as separation and extraction solution, the port portion 21ia (having the same shape as the flow tube $20_1$ illustrated in FIG. 9) of the flow tube $21_i$ is inserted through the pierced hole of the film, and suction and discharge for agitating the sample slurry and the Lysis 1 are repeated.

In step S6, the entire amount of the agitated liquid is sucked by the flow tube $21_i$, stored in each reaction container $340_i$ set to 55° C. by the temperature control unit 390, and incubation is performed. With this configuration, protein contained in the sample is destroyed and lower molecule is obtained. After the lapse of a predetermined time, in a state where the reaction liquid is left in the reaction container $340_i$, the flow tube $21_i$ is moved to the second liquid storing unit of the extraction cartridge container 38c by the stage moving mechanism, the entire amount of liquid stored in the second liquid storing unit is sucked using the nozzle moving unit 420 and the suction discharge mechanism 410, transferred by the stage moving mechanism using the flow tube $21_i$, the narrow tube is inserted into the third liquid storing unit through the hole of the film, and the reaction solution is discharged.

In step S7, binding buffer liquid serving as separation and extraction solution that is stored in the third liquid storing unit and the reaction solution are agitated, solubilized protein is further dehydrated, and nucleic acid or a fraction thereof is dispersed in the solution.

In step S8, using the flow tube $21_i$, the narrow tube is inserted into the third liquid storing unit through the hole of the film, the entire amount is sucked, the flow tube $21_i$ is raised by the nozzle moving unit 420, the reaction solution is transferred to the fourth liquid storing unit, and magnetic grain slurry stored in the fourth liquid storing unit and the reaction solution are agitated. A cation structure in which binding of Na+ ion is caused is formed in hydroxyl formed on a surface of magnetic grains contained in the magnetic grain slurry. Thus, negatively-charged DNA is captured by magnetic grains.

In step S9, eight magnets 430 (refer to FIGS. 2 and 4) of the magnetic force mechanism 43 are provided on the narrow tube of the flow tube $21_i$ with being arrayed on a magnet support member extending in the Y-axis direction, so as to correspond to the respective flow tubes $21_i$, and are concurrently brought closer along the Y-axis direction using a magnet forward and backward moving mechanism (not illustrated), and the magnetic grains are thereby adhered to the inner wall of the narrow tube of the flow tube $21_i$. In a state where the magnetic grains are adhered to the inner wall of the narrow tube of the flow tube $21_i$, the narrow tube is inserted through the hole of the film by raising using the nozzle moving unit 420, and moving the flow tube $21_i$ from the fourth liquid storing unit to the fifth liquid storing unit using the stage moving mechanism.

By concurrently separating the magnets 430 of the magnetic force mechanism 43 from the narrow tube of the flow tube $21_i$, by repeating suction and discharge for cleaning liquid 1 (NaCl, SDS, isopropanol) stored in the fifth liquid storing unit in a state where magnetic force into the narrow tube is removed, the magnetic grains are detached from the inner wall, and agitated in the cleaning liquid 1, and protein is thereby cleaned. After that, by bringing the magnets of the magnetic force mechanism 43 closer to the narrow tube of the flow tube $21_i$ again, in a state where the magnetic grains are adhered to the inner wall of the narrow tube, the flow tube $21_i$ is moved by the nozzle moving unit 420 from the fifth liquid storing unit to the sixth liquid storing unit by the stage moving mechanism.

In step S10, using the nozzle moving unit 420, the narrow tube of the flow tube $21_i$ is inserted through the hole of the film. By separating magnets 430 of the magnetic force mechanism 43 from the narrow tube of the flow tube $21_i$, by repeating suction and discharge for the cleaning liquid 2 (isopropanol) stored in the sixth liquid storing unit, in a state where magnetic force into the narrow tube is removed, the magnetic grains are agitated in liquid, NaCl and SDS are removed, and protein is cleaned. After that, by bringing the magnets of the magnetic force mechanism 43 closer to the narrow tube of the flow tube $21_i$ again, in a state where the magnetic grains are adhered to the inner wall of the narrow tube, the flow tube $21_i$ is raised by the nozzle moving unit 420, and then, moved by the stage moving mechanism from the sixth liquid storing unit to the seventh liquid storing unit storing distilled water.

In step S11, by lowering the narrow tube of the flow tube $21_i$ through the hole by the nozzle moving unit 420, and in a state where the magnetic force is exerted into the narrow tube of the flow tube $21_i$, repeating suction and discharge of the distilled water at slow flow speed, the cleaning liquid 2 (isopropanol) is replaced with water and removed. After that, the magnets of the magnetic force mechanism 43 are separated from the narrow tube of the flow tube $21_i$, in a state where magnetic force is removed, the magnetic grains are agitated by repeating suction and discharge in the distilled water serving as the disaggregation liquid, and nucleic acid or a fraction thereof that is held by the magnetic grains is dissociated (eluted) from the magnetic grains into liquid. After that, by bringing the magnets closer to the narrow tube of the flow tube $21_i$, a magnetic field is exerted into the narrow tube, magnetic grains are adhered to the inner wall, and solution containing the extracted nucleic acid and the like is caused to stay in the eighth liquid storing unit. The flow tube $21_i$ is moved by the stage moving mechanism serving as the nozzle head moving mechanism 51, to the flow tube storing units $320_1$ to $320_8$ of the flow tube cartridge container 38e, and the flow tube $21_i$ to which magnetic grains are adhered is detached using the detachment mechanism 450 from the nozzles $40_1$ to $40_8$ into the storing unit together with the magnetic grains.

In step S12, by moving the nozzle head 50 using the stage moving mechanism serving as the nozzle head moving mechanism 51, to the upper side of the flow tube storing unit groups $321_1$ to $321_8$, and lowering the nozzles $40_1$ to $40_8$ using the nozzle moving unit 420, minute amount dispensing flow tubes $22_1$ to $22_8$ are attached to the nozzles $40_1$ to $40_8$. Extracted nucleic acid solution stored in the eighth liquid storing unit is sucked using the attached flow tubes $22_1$ to $22_8$, and raised by the nozzle moving unit 420, and then, using the stage moving mechanism the serving as the nozzle head moving mechanism 51, the emission end $60_6$ provided on the upper side of the photometric containers $350_1$ to $350_8$ of the stage 30, and at the lower end of the nozzles $40_1$ to $40_8$, and the reception end $70_6$ on the lower side of the bottom portion 350a of the photometric containers $350_1$ to $350_8$ are positioned to be on the vertical common axis line connecting the port portion 20a and the attachment opening portion 20b of the flow tube $20_6$. The photometric flow tube $20_6$ of the nozzle head 50 is lowered by the nozzle moving unit 420, and inserted into the photometric container $350_6$ installed at the reception end $70_6$ of the stage 30, and the port portion is brought into contact with the bottom portion of the photometric container $350_6$.

In step S13, the connection end array body 83 of the optical measurement unit 80 is consecutively moved in the X-axis direction with respect to the measurement end array body 82, a predetermined speed and mode that are defined based on photometric content designated by the photometric content designation unit, that is, by about 10 cm in one second, for example, and the connection end pairs (1) to (8) including the first connection ends $88_6$ to $88_8$ and the second connection ends $89_1$ to $89_8$ that are provided on the connection end array surface 831 of the connection end array body 83 sequentially optically connect corresponding elements of the measurement end pair <8> including the first measurement end $85_8$ and the second measurement end $86_8$ that are provided on the measurement end array surface 821, that is, the first connection ends $88_1$ to $88_8$ and the first measurement end $85_8$, and the second connection ends $89_1$ to $89_8$ and the second measurement end $86_8$. With this configuration, for example, by the white light source 620c by a deuterium lamp (or xenon lamp), for example, measurement light of white light (including ultraviolet) in a range of wavelengths 220-350 nm is emitted, and intensity of transmitted light of the solution C that has been received via a lens provided at the reception end $70_6$ is obtained from the measurement end $86_8$ via a spectral device, as intensity data serving as an electrical signal that is obtained by the photoelectric conversion unit 720 for wavelength 260 nm.

In step S14, by the photometric analysis unit 93 of the CPU+ program+memory 9 serving as the control unit, based on the intensity data $I_0$ and the intensity data I, absorbance of nucleic acid solution of canine genome extracted from the dog whole blood serving as the chemical substance solution A is obtained.

That is, as described above, the photometric analysis unit 93 can obtain, from preliminarily-obtained incident light intensity $I_0$, absorbance of wavelength λ of the chemical substance solution A by $A_\lambda = -\log_{10}(I/I_0)$. As a result, when the concentration of the chemical substance solution A is denoted by ε, using a known absorbance coefficient ε (molar absorbance coefficient, =0.002 mg/m liter) of the chemical substance solution A(dNTP), for example, by an optical path length L, the concentration c can be obtained from the relational expression $A_\lambda = \varepsilon c L$.

Figure 12:
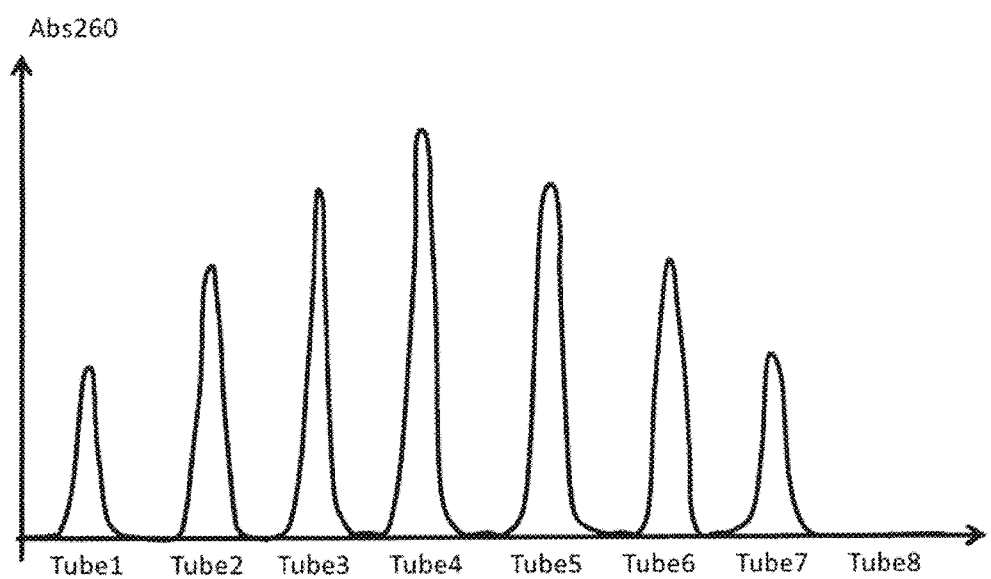
FIG. 12 is a graph illustrating a measurement example of absorbance of nucleic acid solution extracted from a sample using the general-purpose optical measuring device illustrated in FIGS. 2 to 4.

At this time, it is preferable that, from absorbance $A_{260}$ at wavelength λ=260 nm at the peak of the absorbance curve, using the optical path length L or fluid amount, the concentration c is obtained from the preliminarily-obtained relational expression. FIG. 12 illustrates an example of the thus obtained absorbance $A_{260}$ of each nucleic acid solution that corresponds to the photometric containers $350_1$ to $350_8$, storing nucleic acid solution of canine genome extracted from the dog whole blood, and the photometric analysis unit 93 can obtain concentration (30 ng/μL, 45 ng/μL, 60 ng/μL, 75 ng/μL, 60 ng/μL, 45 ng/μL, 30 ng/μL, 0 ng/μL) from the preliminarily-obtained relational expression. A vertical axis in FIG. 12 indicates absorbance at wavelength 260 nm, and a horizontal axis indicates an X-coordinate along the X-axis direction which is an array direction on the connection end array surface 831 of the connection end pairs (1) to (8) corresponding to irradiation reception pairs of the photometric containers $350_1$ to $350_8$ and nozzles $40_1$ to $40_8$. The measurement is sequentially performed along the X-axis direction, for example, at a predetermined speed such as, for example, at a speed of 0.1 mm in 1 msec, while traveling in one direction within one predetermined cycle (1 second).

Figure 13:
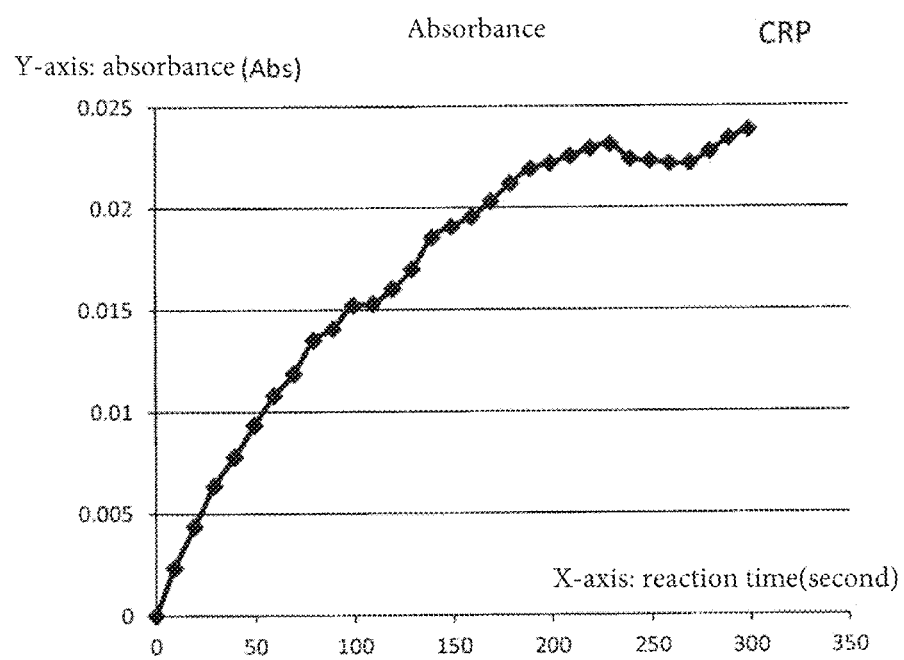
FIG. 13 is a graph illustrating a measurement example of latex agglutination reaction for a component contained in the sample according to FIG. 12 that has been obtained using the general-purpose optical measuring device illustrated in FIGS. 2 to 4.

Subsequently, FIG. 13 illustrates a measurement example of immune antibody quantitative measurement (CRP).

In the measurement, as a specimen, measurement of C responsive protein (CRP) concentration in the dog blood serum that is obtained from whole blood solution stored in the sample liquid storing units $361_1$ to $361_8$ is perform using antigen-antibody reaction, and CRP concentration in the blood serum is measured by optically measuring the degree of agglutination of agglutination reaction that corresponds to concentration of CRP serving as antigen of resin latex fixing anti-dog CRP (rabbit and goat) polyclonal antibody. In this example, measurement is performed for liquid obtained by diluting the dog blood serum obtained from the dog whole blood solution as a sample stored in the sample liquid storing unit $361_6$ with normal saline solution. In the liquid storing unit $360_6$, absorbance measurement cartridge containers 38a, 38h, 38d, and 38g storing latex slurry fixing the anti-dog CRP (rabbit and goat) polyclonal antibody, buffer fluid, and cleaning liquid are mounted.

In step S21, in the sample liquid storing unit $361_6$ of the sample area 30D provided on the stage 30 of the general-purpose optical measuring device 11, dog blood serum solution is prestored as measurement target chemical substance solution. In addition, the dispensing flow tube $21_6$ is stored in the (dispensing) flow tube storing unit $320_6$. Furthermore, in the liquid storing unit $360_6$, resin latex slurry fixing dog CRP polyclonal antibody, buffer fluid, and cleaning liquid are stored.

In step S22, by moving the nozzle head 50 using the stage moving mechanism to the upper side of the flow tube storing unit $320_6$, and lowering the nozzle $40_6$ using the nozzle moving unit 420, only the flow tube $21_6$ is attached to the nozzle $40_6$. After raising the attached flow tube $20_6$ using the nozzle moving unit 420, by positioning to the upper side of the sample liquid storing unit $361_6$ using the stage moving mechanism, lowering using the nozzle moving unit 420, sucking a prescribed amount of the dog blood serum solution into the flow tube $21_6$ using the suction discharge mechanism 410, raising again, the flow tube $21_6$ is positioned on the upper side of the photometric container $350_6$ of the stage 30 using the stage moving mechanism.

In step S23, the port portion of the flow tube $21_6$ is inserted into the photometric container $350_6$ by the nozzle moving unit 420, and 3μ liter of the dog blood serum solution is discharged and stored into the container. The flow tube $21_6$ is raised again and moved to the upper side of the flow tube storing unit by the stage moving mechanism, detached by the detachment mechanism 450, and instead, the photometric flow tube $20_6$ is attached to the nozzle $40_6$. By the stage moving mechanism, the flow tube $20_6$ sucks buffer fluid and the latex slurry stored in the liquid storing unit of the liquid storing unit $360_6$, into the flow tube, transfers and stores into the photometric container by the stage moving mechanism and nozzle moving unit 420, and repeats suction and discharge by the flow tube, and the sample liquid and the latex slurry are thereby mixed and agitated.

In step S24, by the nozzle moving unit 420, in a state where the port portion 20a of the flow tube $20_6$ is brought into contact with the bottom portion of the photometric container $350_6$, the connection end array body 83 is moved in the X-axis direction with respect to the measurement end array body 82, and corresponding elements of the connection end pair (6) optically connected with the irradiation reception pair and the measurement end pair <8> are optically connected. This state is immobilized, and by the white light source 620c by a deuterium lamp, for example, measurement light mainly containing wavelength of 658 nm is emitted from the emission end $60_6$, intensity of transmitted light received at the reception end $70_6$ is converted into intensity data as an electrical signal by the photoelectric conversion unit 720, and absorbance is measured for every the ten seconds as a measurement cycle (a reciprocating motion of the connection end array body is not performed, but corresponds to a predetermined cycle being a cycle of connection or interruption between the connection end pair and the measurement end pair). The reaction is all performed at 37° C., for example.

In step S25, FIG. 13 illustrates a graph obtained by the photometric analysis unit serving as the control unit calculating absorbance based on the intensity data. In this example, a change in absorbance at wavelength of 658 nm is measured using a spectrophotometer. By measuring last absorbance (or absorbance at a prescribed time), concentration of a measurement target object can be estimated. For correlationship between the absorbance and concentration, a calibration formula is obtained by preliminarily measuring a sample of known concentration. In FIG. 13, a vertical axis indicates absorbance, and a horizontal axis indicates a reaction time (second). The measurement has been repeatedly performed at a predetermined cycle (1 second) while moving at the predetermined speed of 10 cm in 1 second, for example.

Figure 14:
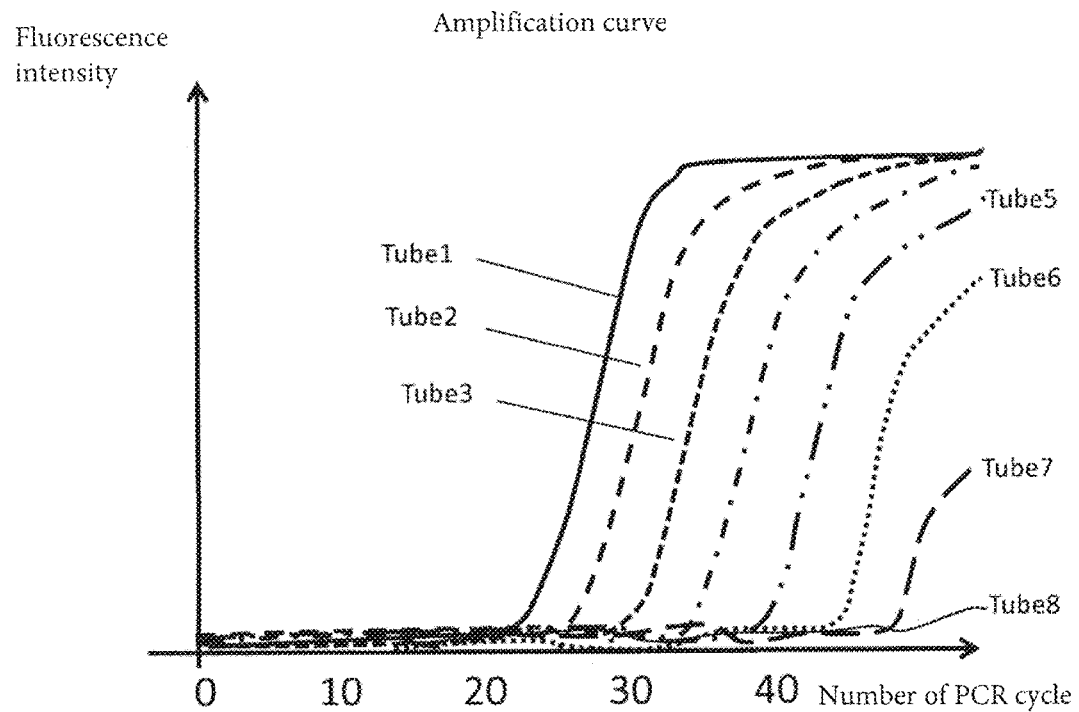
FIG. 14 is a graph illustrating amplification by a real-time PCR method for the sample according to FIG. 12 that has been obtained using the general-purpose optical measuring device illustrated in FIGS. 2 to 4.

Subsequently, FIG. 14 illustrates a measurement example of real-time PCR.

In this example, an amplification curve obtained from fluorescence intensity measured using real-time PCR reagent that uses an FAM fluorescence substance for estimating the concentration for influenza A virus of eight dogs extracted from blood serum obtained by a centrifugal machine or the like from the whole blood solution used by the general-purpose optical measuring device 11 in FIG. 12 is illustrated.

In this example, the description will be given of a case where, on the stage 30 of the general-purpose optical measuring device 11, various cartridge containers 38*a*, 38*b*, 38*c*, 38*d*, and 38*e* corresponding to eight columns of the real-time PCR measurement storing unit group $30_8$ in FIG. 5 are mounted as storing unit groups $30_1$ to $30_8$, nucleic acid is extracted from of the blood serum solution of seven dogs of the sample liquid, and real-time PCR is performed for identifying an infection amount of influenza A virus, for example.

In each sample liquid storing units $361_1$ to $361_7$ of the cartridge container 38*i* of the sample area 30D, blood serum solution obtained by diluting the blood serum of seven dogs with normal saline solution is stored. Solution functioning as negative control is stored in $361_8$. In addition, extraction reagent, cleaning liquid, and the like are prepacked in each liquid storing units $360_1$ to $360_8$ of the DNA extraction cartridge container 38*c*. In addition, in the cartridge container 38*b*, real-time PCR reagent that uses the FAM fluorescence substance, and solution containing a probe that can be hybridized with the influenza A virus are stored. In addition, in the case of measuring a plurality of types of influenza viruses, corresponding real-time PCR reagent is used depending on a fluorescence substance different for each type of viruses such as, for example, fluorescence substance HEX, fluorescence substance TAMURA, fluorescence substance ROX, fluorescence substance Texas Red, and fluorescence substance Cy5.

Extraction processing of nucleic acid that uses the dispensing flow tube will be omitted.

In step S31, each extracted nucleic acid is stored into neighboring liquid storing units $360_1$ to $360_8$ of the reaction containers $340_1$ to $340_8$ of the extraction cartridge container 38*c*.

In step S32, the dispensing flow tubes $22_1$ to $22_8$ having the minute amount are attached to the nozzles $40_1$ to $40_8$, moved in the Y-axis direction using the stage moving mechanism, and moved in the Z-axis direction using the nozzle moving unit 420, the extracted nucleic acid solution stored in the liquid storing units $360_1$ to $360_8$, and real-time PCR reagent that uses the fluorescence substance FAM that is stored in the liquid storing units $362_1$ to $362_8$ of the cartridge container 38*b* are sequentially sucked using the suction discharge mechanism 410, raised again using the nozzle moving unit 420, and transferred to the photometric containers $350_1$ to $350_8$ by the stage moving mechanism and the nozzle moving unit, to be discharged, mixed, and stored.

In step S33, by the stage moving mechanism, the flow tubes $22_1$ to $22_8$ are positioned on the upper side of the flow tube storing units $321_1$ to $321_8$, and by the detachment mechanism 450, the flow tubes $22_1$ to $22_8$ are detached into the flow tube storing unit. By positioning the nozzles $40_1$ to $40_8$ on the upper side of the sealed lid storing units $330_1$ to $330_8$ of the cartridge container 38*a* by the stage moving mechanism, and lowering, the sealed lid 25 is attached to the nozzles, and positioning again on the upper side of the photometric containers $350_1$ to $350_8$, and then, lowering the nozzles by the nozzle moving unit 420, the sealed lid 25 is fitted with the opening portion of the photometric containers $350_1$ to $350_8$.

In step S34, according to a PCR method, by the temperature control unit 390, temperature control and amplification are concurrently performed on the photometric containers $350_1$ to $350_8$, and the connection end array body 83 of the optical measurement unit 80 moved in the X-axis direction with respect to the measurement end array body 82, at a predetermined speed based on photometric content designated by the photometric content designation unit, or repeatedly moved in a reciprocating manner at a defined predetermined cycle. Connection and interruption of each connection end pair (1) to (8) of the connection end array body 83 are thereby sequentially repeated with respect to the measurement end pair <2> corresponding to a used fluorescence substance of a corresponding measurement end array body 82. By performing the reciprocating motion at a predetermined cycle of 2 to 3 seconds, for example, for 1 temperature cycle of the PCR method (e.g. for example, 40 cycles are repeated in 30 seconds), optical connection and interruption are repeated. By making a graph using the obtained fluorescence intensity as a vertical axis, and each of the temperature cycles as a horizontal axis, the photometric analysis unit 93 obtains an amplification curve illustrated in FIG. 14. In addition, Tube1 to Tube8 indicate X-coordinates on the array surface 831 of the connection end pairs (1) to (8) corresponding to the photometric containers $350_1$ to $350_8$. With this configuration, an amplification curve can be simultaneously and concurrently obtained for eight samples.

Subsequently, measurement of a target chemical substance labeled with a chemiluminescence substance, and chemiluminescence enzyme immunity measurement (CLEIA) will be described.

In each of the liquid storing units $361_1$ to $361_8$ of sample liquid of the sample area 30D provided on the stage 30 of the general-purpose optical measuring device 11, whole blood solution collected from the eight dogs exists, and in each of the storing unit groups $30_1$ to $30_8$ of the stage 30, chemiluminescence immunity measurement cartridge containers 38a, 38f, 38d, and 38g are mounted.

In step 41, the photometric content designation unit 95 designates photometric content for examining connective tissue disease of dogs. The liquid storing unit of the cartridge container 38f at least includes, for example, a liquid storing unit storing magnetic beads slurry solid-phased by anti-ENA antibody, anti-Sm antibody, anti-SS-A antibody, or the like, a liquid storing unit storing solution of antibody labeled with HRP, a liquid storing unit storing luminol/hydrogen peroxide serving as substrate solution, and cleaning liquid.

In step 42, the flow tube is attached to the nozzle, the sample liquid is sucked and stored into the empty liquid storing unit, the flow tube is cleaned with cleaning liquid by performing suction and discharge, and then, the solid-phased magnetic beads slurry and the labeled antibody solution are agitated and mixed in the whole blood solution.

Figure 15:
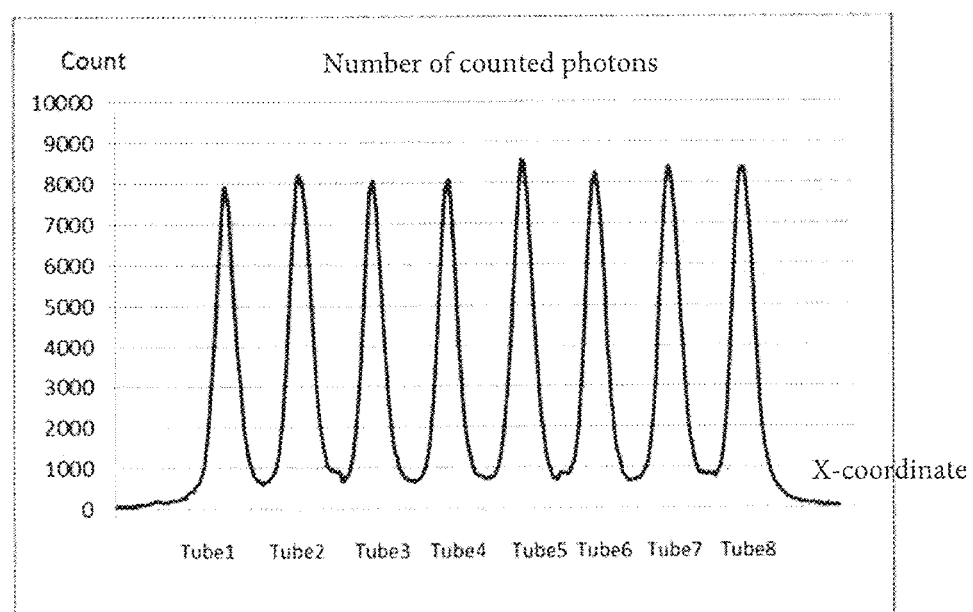
FIG. 15 is a graph illustrating an example of the number of counted photons for the sample according to FIG. 12 that has been obtained using the general-purpose optical measuring device illustrated in FIGS. 2 to 4.

In step S43, in a state where the magnetic grains are adhered to the inner wall using the magnetic force mechanism 43, suction and discharge is repeated using cleaning liquid, and cleaning is thereby performed. When the cleaned magnetic grains are transferred and resuspended in the photometric container, and the substrate liquid is discharged into the photometric container, while sequentially moving the connection end array body 83 in the X-axis direction between each of the connection end pairs (1) to (8) of the connection end array body 83 of the optical measurement unit 80 and the measurement end pair <1> for chemiluminescence measurement, at speed of 0.1 mm in 20 msec, for example, the number of counts is measured, and a result of repeatedly adding a distance in the X direction of the array surface 831 of the connection end array body 83 such as, for example, a predetermined speed of traveling by 10 cm in 1 second, and the predetermined cycle (1 second) every 20 msec is obtained, and is made into a graph as illustrated in FIG. 15. Here, a vertical axis in FIG. 15 indicates the number of counted photons for every 20 msec, and a horizontal axis indicates an X-coordinate on the connection end array surface 831.

Each of the embodiments described above is given for specifically describing the present invention for better understanding, and does not limit other configurations. Thus, the embodiments can be modified without changing the gist of the invention.

For example, in the above example, various measurements are performed using dog whole blood or blood serum solution in common, but it should be appreciated that various samples can be used. In addition, measurement is not limited to real-time PCR, absorbance, and chemiluminescence immunity measurement, and another type of measurement such as, for example, measurement of enzyme activity, reaction speed, or the like can also be performed. In addition, simultaneous measurement for a plurality of measurement containers or multiple nozzles has only been described, but the described measurement examples can be combined, and a plurality of types of measurement can also be simultaneously executed.

In addition, if diluted solution is used in place of the internal standard, absorbance of the diluted chemical substance solution can be measured.

Subsequently, a general-purpose optical measuring device 111 according to a second embodiment will be described based on FIGS. 16 to 22. Because the same signs as the signs used in the first embodiment indicate the same components, the description will be sometimes omitted.

Figure 16:
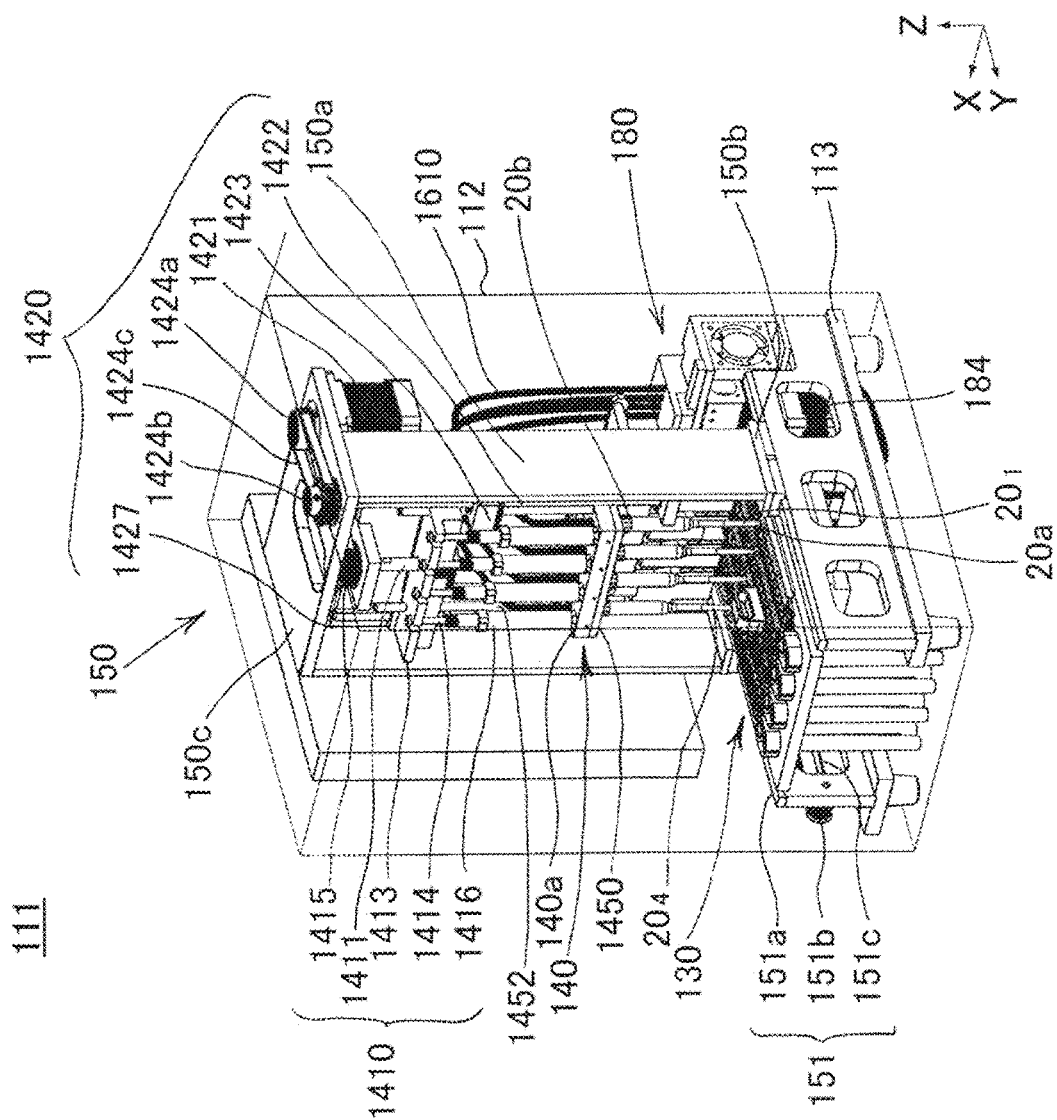
FIG. 16 is a perspective view of a general-purpose optical measuring device according to a second embodiment of the present invention.

As illustrated in FIG. 16, it is preferable that the general-purpose optical measuring device 111 is placed in a casing 112 having a function of a dark box that can interrupt intrusion of light from the outside. A touch tablet (not illustrated) including the operation panel including a photometric content designation unit that designates photometric content for measurement target chemical substance solution is provided on the outside of the casing.

Figure 21:
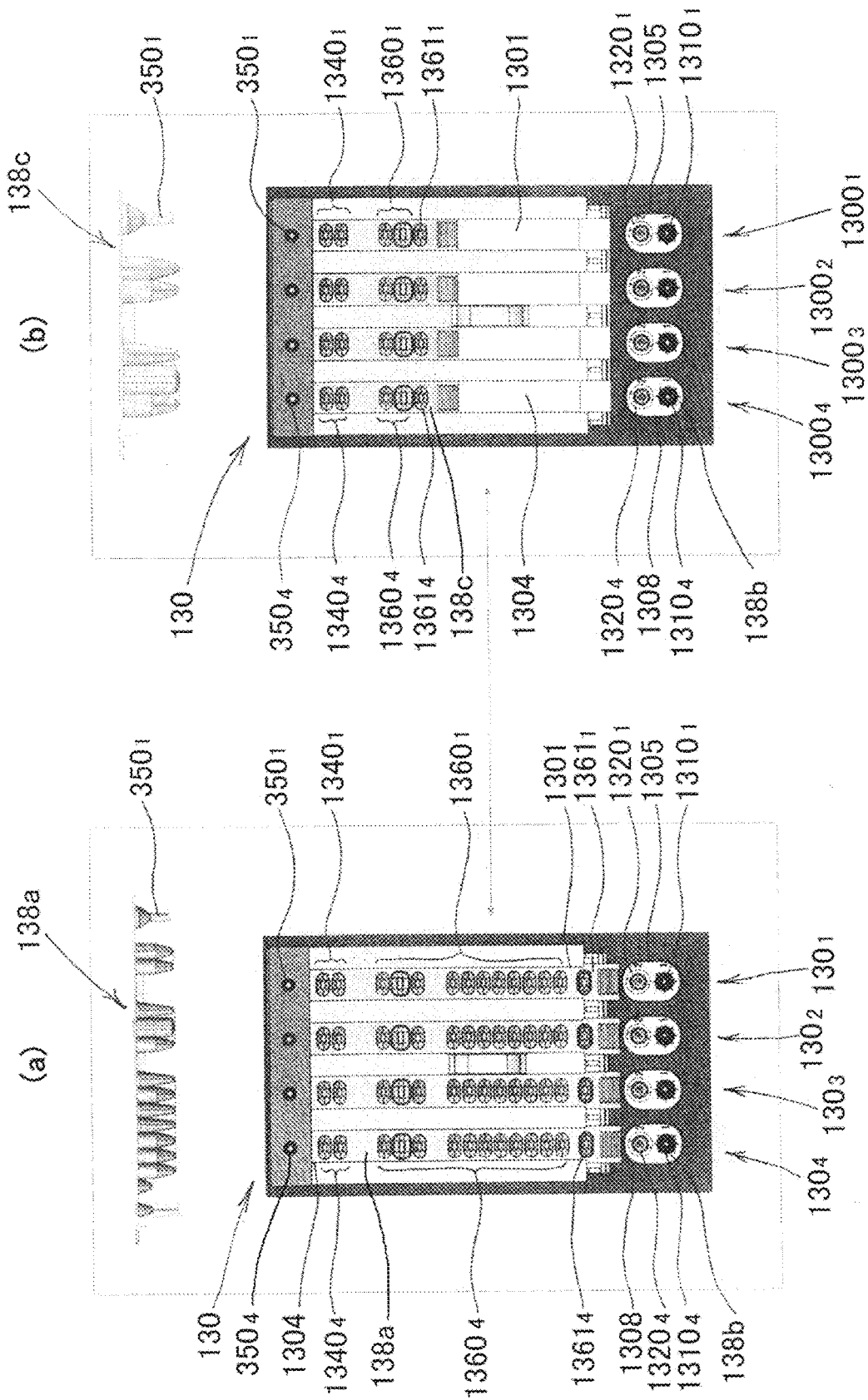
FIG. 21 is a plane view of the general-purpose optical measuring device illustrated in FIG. 16.

As illustrated in FIGS. 16 to 22, the general-purpose optical measuring device 111 according to the present embodiment includes a stage 130 (refer to FIG. 21(a)) provided with mounting holes 1301 to 1308 through which a plurality of (4 in this example) columns of storing unit groups $130_1$ to $130_n$ (n=4 in this example) can be mounted so as to be arrayed along the X-axis direction (row direction), in which liquid storing units $1360_1$ to $1360_n$ storing one or two or more types of chemical substance solution and various reagents, one or two or more storing units storing flow tubes $20_1$ to $20_n$ (n=4 in this example) and one or two or more reaction containers $1340_1$ to $1340_n$ including photometric containers $350_1$ to $350_n$ that can perform temperature control, and include a bottom portion having a formed translucent region translucent o measurement light defined by the photometric content are arrayed along the Y-axis direction (column direction) so as to extend in a line, a suction discharge mechanism 1410 that performs suction and discharge of gas, a nozzle head 150 that is communicated with the suction discharge mechanism 1410, and includes a plurality of (4 in this example) nozzles $140_1$ to $140_n$ (refer to FIG. 18) arrayed along the X-axis direction at an interval of the storing unit groups $130_1$ to $130_n$, on a nozzle support block 140a serving as a nozzle support member 140, a nozzle head moving mechanism 151 that makes the nozzle head 150 relatively movable along the Y-axis direction with respect to the stage 130, and an optical measurement unit 180.

The general-purpose optical measuring device 111 includes a plurality of (4 in this example) pairs of irradiation reception pairs (refer to FIG. 17) including emission ends $160_1$ to $160_4$ that can emit measurement light defined by the designated photometric content, and reception ends $170_1$ to $170_4$ that can receive at least light emitted from the emission ends, and the emission end of one element of the irradiation reception pairs is provided at the tips $1440_1$ to $1440_4$ of the nozzles $140_1$ to $140_4$, and a reception pair of the other element of the irradiation reception pairs is provided on the lower side of the photometric containers $350_1$ to $350_n$. Furthermore, the general-purpose optical measuring device 111 is provided with optical fibers 1610 serving as a plurality of (4 in this example) light guide paths having one end connected with the emission ends $160_1$ to $160_4$, and the other end connected with the optical measurement unit 180, and an optical fiber 1710 serving as a plurality of (4 in this example) light guide paths having one end connected with the reception ends $170_1$ to $170_4$, and the other end connected with the optical measurement unit 180. The optical measurement unit 180 thereby supplies measurement light to the emission ends, and obtains a digital value of intensity of light received at the reception ends.

The nozzle head 150 is further provided with four flow tubes $20_1$ to $20_4$ including, at the lower end, a port portion 20a that can perform suction and discharge of liquid, and can be inserted into the storing unit, and at the upper end, an attachment opening portion 20b detachably attached to the nozzles $140_1$ to $140_4$, a nozzle moving unit 1420 that makes the nozzles $140_1$ to $140_4$ concurrently movable in the Z-axis direction with respect to the stage 130, an isothermal means 147 that can keep the inside of the flow tube in a constant temperature state by bringing closer n (4 in this example)

heating walls $147_1$ to $147_n$ arrayed so as to be closely connected to or approaching the flow tubes $20_1$ to $20_4$ from one side, for keeping the flow tubes $20_1$ to $20_4$ attached to the nozzles $140_1$ to $140_4$ at constant temperature, a detachment plate 1450 serving as a detachment mechanism that is provided in a state of being in contact with the lower side of the nozzle support block 140a, and can detach the flow tubes $20_1$ to $20_4$ attached to the nozzles $140_1$ to $140_4$ from the nozzles, and boring protruding portions $123_1$ to $123_n$ that are provided so as to protrude from the rim portion of the detachment plate 1450 toward the lower direction, and are interlocked with the detachment plate 1450. On the detachment plate 1450, a plurality of (4 in this example) detachment clearances or holes 1451 (refer to FIG. 18) which have an inner diameter larger than an outer diameter of the nozzles $140_1$ to $140_n$, but smaller than the largest outer diameter of the flow tubes $20_1$ to $20_n$ attached to the nozzles, and through which the nozzles penetrate through are formed. There are provided two poles 1452 that penetrate through the both ends of the nozzle support block 140a to be attached to both ends of the detachment plate 1450, are provided so as to be movable in the lower direction by a later plunger drive plate 1413 to be described falling over a suction and discharge section, and return to the original positions by compressing force of a spring by the plunger drive plate 1413 rising to the height of the suction and discharge section. By the plunger drive plate 1413 moving to a position lower than a height position for suction and discharge, the detachment plate is separated from the nozzle support block 140a in the lower direction and the flow tubes are detached, and if the plunger drive plate 1413 is returned to the height position, the detachment plate 1450 retracts up to the nozzle support block 140a. Additionally, there is included a magnetic force mechanism 143 that can concurrently exert and remove magnetic force into the flow tubes $20_1$ to $20_4$ attached to the nozzles $140_1$ to $140_4$, and is provided with magnets so as to be operable forward and backward with respect to the flow tubes $20_1$ to $20_4$ (refer to FIG. 20). In addition, in FIG. 19, a sign 147a is ball screw that has one end attached to the heating walls $147_1$ to $147_4$, is screwed with a nut portion, and can move forward and backward along the Y-axis direction by the rotation of the nut portion, a sign 174b is a motor that directly rotationally-drives the nut portion provided on the nozzle head support frame 150a, a sign 174c is a guide bar having one end attached to the heating walls, and guiding the movement in the Y-axis direction of the heating walls $147_1$ to $147_4$, and a sign 147e is a coupling plate that couples the end of the guide member 174c and the end of the ball screw 147a.

The nozzle head 150 is supported by a nozzle head support frame 150a movably provided on a substrate 113 of the general-purpose optical measuring device 111, and the nozzle head moving mechanism 151 includes a guide rail 151a provided on the substrate 113 and laid in the Y-axis direction, two pulleys 151b and 151b along the Y-axis direction, and a timing belt 151c stretched over between the two pulleys 151b, and the guide rail 151a is provided with a guide portion 151d in which a concave portion to be slidingly fitted with the rail 151a is provided in a leg portion 150b on the lower side of the nozzle head support frame 150a. In addition, a sign 150e is a motor that rotationally drives the pulleys 151b.

As illustrated in FIGS. 16 to 22, the nozzle moving unit 1420 of the nozzle head 150 includes a motor 1421 suspended on a top board 150c of the support frame 150a, a timing belt 1424c, a ball screw 1422 provided so as to extend in the lower direction that is rotationally-driven by the motor 1421 via pulleys 1424a and 1424b, a Z-axis moving plate 1426 attached to a nut portion 1423 screwed with the ball screw 1422, a guide rail 1427 laid along the Z-axis direction along two prismatic columns that are vertically installed on the substrate 113, and supporting the top board 150c of the support frame 150a at both ends, and movable guide members 1428 that are provided at both rim portions of the Z-axis moving plate 1426, and are vertically movable by being slidingly fitted with the guide rail 1427.

As illustrated in FIGS. 16 to 22, the suction discharge mechanism 1410 of the nozzle head 150 includes a motor 1412 for gas suction and discharge that is supported on the Z-axis moving plate 1426, a ball screw 1411 rotationally-driven by the motor 1412, a plunger drive plate 1413 that is vertically movable in conjunction with a nut portion screwed with the ball screw 1411, and a plurality of (4 in this example) plungers 1414 that is engaged with the plunger drive plate 1413, and slides in a plurality of (4 in this example) cylinders 1416. In addition, a coil spring is winded around the plunger, and the plunger is always biased in the lower direction with respect to the cylinder.

As illustrated in FIGS. 16 to 22, the plurality of dispensing cylinders 1416 includes internal hollows, and the plungers 1414 are provided to be slidable in the hollows. The dispensing cylinder 1416 is attached to the nozzle support block 140a attached to the Z-axis moving plate 1426 at the lower end portion 1416a, and supported so as to extend in the upper direction, and the nozzles $140_1$ to $140_n$ are attached at the upper end portion, and supported so as to extend in the lower direction. In the lower end portion 1416a of the dispensing cylinder 1416, a cylinder lateral hole 1417 serving as a suction and discharge port through which suction and discharge of the gas are performed is provided penetrating through a side wall. In addition, the nozzle $140_n$ includes a nozzle lateral hole communicated with a tip opening portion 1401 of the nozzle $140_n$, and provided penetrating through the side wall. That is, the four dispensing cylinders 1416 and the nozzles $140_1$ to $140_n$ are supported in parallel in the nozzle support block 140a.

The nozzle support block 140a is provided with a nozzle attachment longitudinal hole 146b through which upper end portions of the plurality of (4 in this example) pairs of the nozzles $140_n$ are closely attached from the lower side, a cylinder attachment longitudinal hole 146a through which the lower end portion 1416a of the dispensing cylinder is closely attached from the upper side, and a coupling flow path 146c communicated with the nozzle attachment longitudinal hole 146b and the cylinder attachment longitudinal hole 146a. The coupling flow path 146c communicates the cylinder lateral hole 1417 of the attached dispensing cylinder 1416, and the nozzle lateral hole of the attached nozzle $140_n$. The nozzle support block 140a, the nozzle attachment longitudinal hole 146b, and the cylinder attachment longitudinal hole 146a correspond to the nozzle support member 140.

The stage 130 of the general-purpose optical measuring device 111 according to the present embodiment will be described based on FIG. 21.

In FIG. 21(a)(b), the stage 130 is formed into a plate, and four columns of mounting holes 1301 to 1304 provided so that a plurality of (4 in this example) columns of the storing unit groups $130_1$ to $130_4$, and $1300_1$ to $1300_4$ can be mounted are pierced along the column direction (Y-axis direction). Each of the storing unit groups $130_1$ to $130_4$, and $1300_1$ to $1300_4$ includes mounting holes 1305 to 1308 through which cartridge containers 138a and 138c provided with photometric containers $350_1$ to $350_8$ used for measurement, liquid storing unit groups $1360_1$ to $1360_4$ storing various reagents, and reaction containers $1340_1$ to $1340_4$, and a cartridge container 138b provided with photometric flow tube storing units $1310_1$ to $1310_4$ storing photometric flow tubes $21_1$ to $21_4$, and dispensing flow tube storing units $1320_1$ to $1320_4$ storing dispensing flow tubes can be mounted.

FIG. 21(a) illustrates an arrangement example in which measurement of immunochemistry luminescence is performed using the four columns of storing unit groups $130_1$ to $130_4$ of the stage 130, for example, and FIG. 21(b) illustrates an arrangement example in which agglutination absorbance measurement or measurement (OD value) of living substance absorption spectrum is performed using four columns of the storing unit groups $1300_1$ to $1300_4$ of the stage 130, for example. These are decided based on the number of reagents or the like, depending on the content of measurement.

Furthermore, in each of the storing unit groups $130_1$ to $130_4$, a reagent or the like to be used for immunochemistry is prestored, and the storing unit groups $130_1$ to $130_4$ includes five liquid storing units $1360_1$ to $1360_4$ storing antibody reagent labeled with a chemiluminescence substance extracting a target immune substance from the sample, antibody fixing magnetic grain slurry, substrate liquid, and the like. In addition, in the photometric flow tube storing units $1310_1$ to $1310_4$ of the storing unit groups $130_1$ to $130_4$, for example, photometric flow tubes $20_1$ to $20_4$ formed of black material and having a light blocking effect are stored, and in the dispensing flow tube storing units $1320_1$ to $1320_4$, dispensing flow tubes $21_1$ to $21_4$ are stored. One of liquid storing units of the storing unit groups $130_1$ to $130_4$ is provided with sample liquid storing units $1361_1$ to $1361_4$ storing the sample.

As illustrated in FIG. 21(b), in the storing unit groups $1300_1$ to $1300_4$, reagent or the like to be used for absorbance (OD value) measurement is stored, and in the photometric containers $350_1$ to $350_4$ and the storing unit groups $1300_1$ to $1300_4$, extraction reagent for extracting a target chemical substance from the sample, or the like is stored. For example, two liquid storing units $1360_1$ to $1360_4$, and reaction containers $1340_1$ to $1340_4$ are provided. Each flow tube cartridge container 138b of the storing unit groups $1300_1$ to $1300_4$ includes dispensing flow tube storing units $1320_1$ to $1320_4$ and photometric flow tube storing units $1310_1$ to $1310_4$.

Subsequently, an optical system of the general-purpose optical measuring device 111 according to the present embodiment will be described in more detail based on FIGS. 17, 18, 20 and 22.

As illustrated in FIGS. 17, 18, 20 and 22, in the general-purpose optical measuring device 111, one element of a plurality of (4 in this example) pairs of the irradiation reception pairs, that is, a plurality of (4 in this example) emission ends $160_1$ to $160_4$ that can emit measurement light defined by photometric content designated by the photometric content designation unit 95 are provided at tips $1440_1$ to $1440_4$ of the respective nozzles $140_1$ to $140_4$. The optical fibers 1610 are optically connected with the emission ends $160_1$ to $160_4$ via the nozzle attachment longitudinal hole 146b. The optical fibers 1610 provided so as to penetrate through the nozzle attachment longitudinal hole 146b in the Z-axis direction are optically connected with the nozzles $140_1$ to $140_4$ and the emission ends $160_1$ to $160_4$, and each of the emission ends $160_1$ to $160_4$ is not only provided as one end portion of the four (or bundles of) optical fibers 1610, but also communicated with the nozzle attachment longitudinal hole 146b, and communicates a nozzle lateral hole provided with penetrating through the side wall of the nozzle via the coupling flow path 146c provided in the nozzle support block 140a, and a cylinder attachment longitudinal hole 146a for attaching cylinders $1416_1$ to $1416_4$, and a cylinder lateral hole 1417 provided with penetrating through the side wall of the lower end portion 1416a of the cylinders $1416_1$ to $1416_4$. The fourth optical fibers 1610 pass through a hole 1426a pierced in the Z-axis moving plate 1426, to reach the optical measurement unit 180, and the other end portions of the optical fibers 1610 are arrayed in a line along the horizontal direction (X-axis direction) as a first connection end line, on a first connection end array surface 1831 of a connection end array body 183 provided on an irradiation reception pair interlock switching unit 181 of the optical measurement unit 180 as first connection ends $188_1$ to $188_4$ (refer to FIG. 22).

Figure 17:
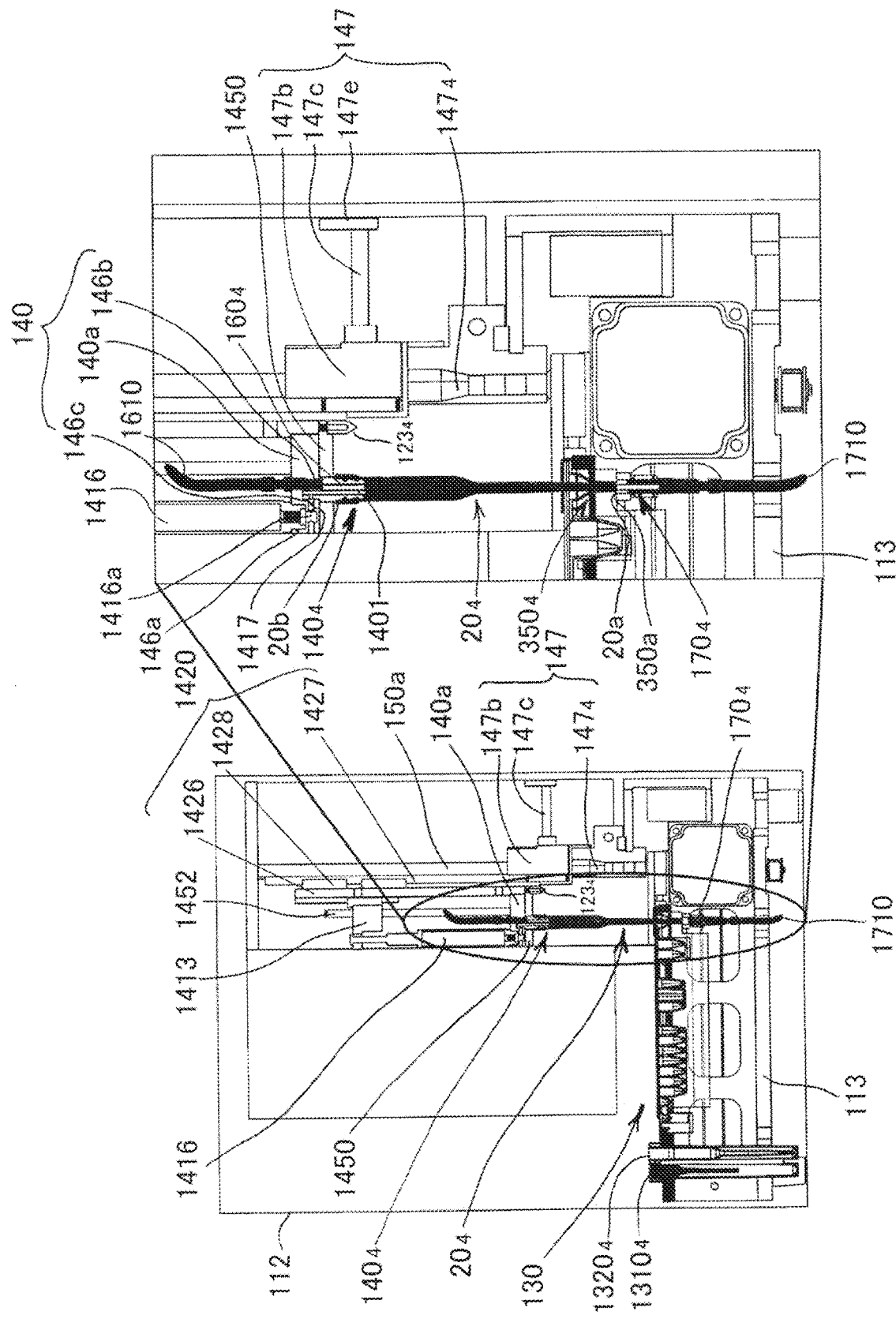
FIG. 17 is a cross-sectional side view of the general-purpose optical measuring device illustrated in FIG. 16, and a partially-enlarged view thereof.
Figure 18:
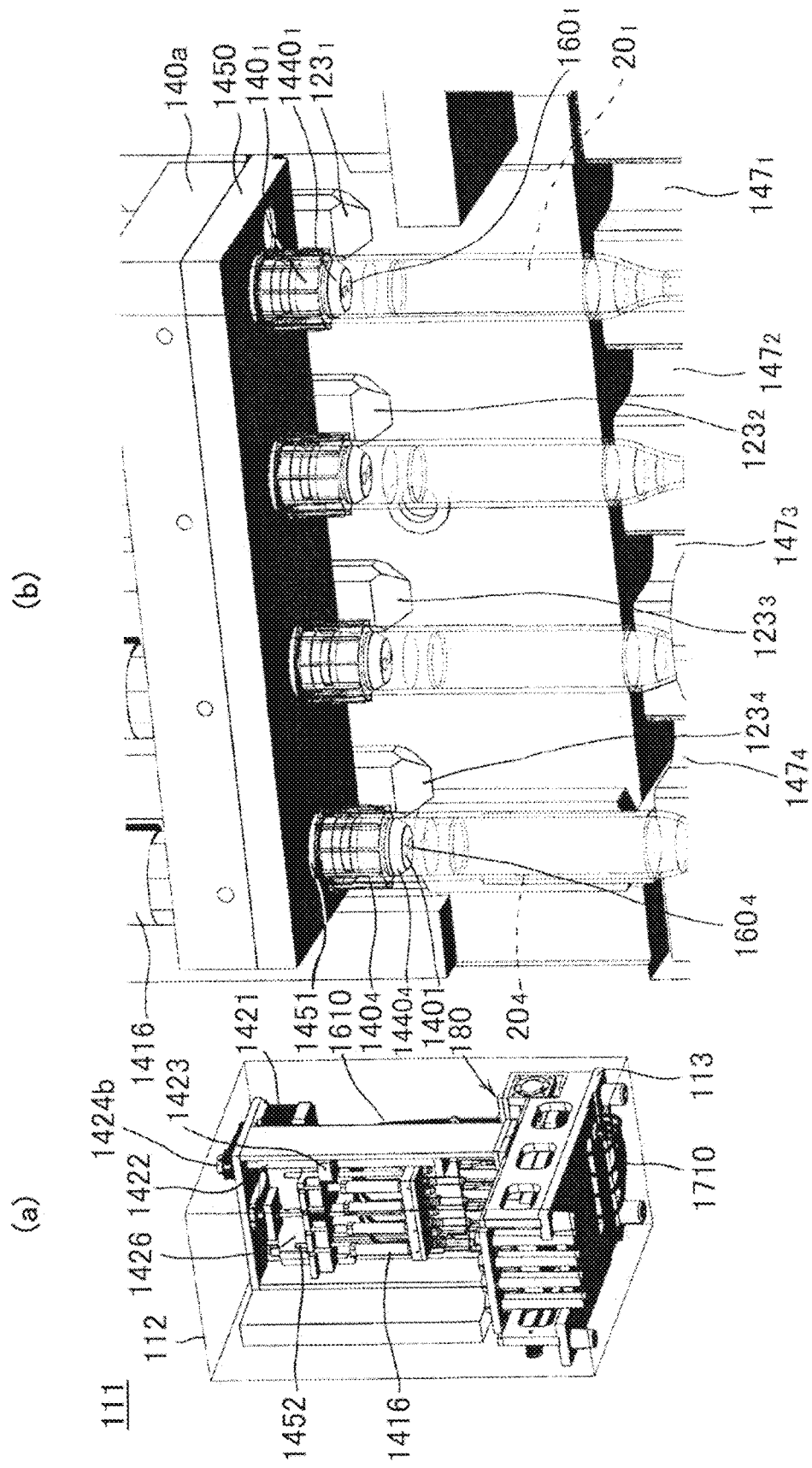
FIG. 18 is a lower side perspective view of the general-purpose optical measuring device illustrated in FIG. 16, and a partially-enlarged perspective view thereof.

As illustrated in FIGS. 17, 18, 20 and 22, the other elements of the plurality of (4 in this example) pairs of the irradiation reception pairs, that is, a plurality of (4 in this example) reception ends $170_1$ to $170_8$ that can receive light emitted from the emission ends $160_1$ to $160_8$ is provided with being closely attached to the bottom portion 350a which is a lower side of the translucent region of each bottom portion 350a of the plurality of (4 in this example) photometric containers $350_1$ to $350_4$ as illustrated in FIG. 17, and provided as one end portions of the four (or bundles of) optical fibers 1710. The four optical fibers 1710 penetrate through the substrate 113 to reach the optical measurement unit 180, and the other end portions of the optical fibers 1710 are arrayed in parallel in a line in the horizontal direction at a predetermined distance from the first connection end line, as a second connection end line on the second connection end array surface 1832 of the connection end array body 183 provided on the irradiation reception pair interlock switching unit 181 of the optical measurement unit 180 as second connection ends $189_1$ to $189_4$. At this time, sets (sets having the same subscript numbers) of first connection ends and second connection ends arrayed along the vertical direction on the first connection end array surface 1831 and the second connection end array surface 1832 form four pairs of connection end pair (1) to (4). Here, the first connection end array surface 1831 and the second connection end array surface 1832 are formed in parallel so as to face as two planes.

The photometric container $350_1$ is similar to the first embodiment, and the detailed description will be omitted. In addition, because the photometric flow tube $20_1$ is also similar to the first embodiment, the detailed description will be omitted.

As illustrated in FIG. 9, a state where the narrow tube 20c of the photometric flow tube $20_1$ attached to the nozzle $140_1$ is inserted into the thin cylindrical portion 35c of the photometric container $350_1$ is as described in the first embodiment.

Figure 22:
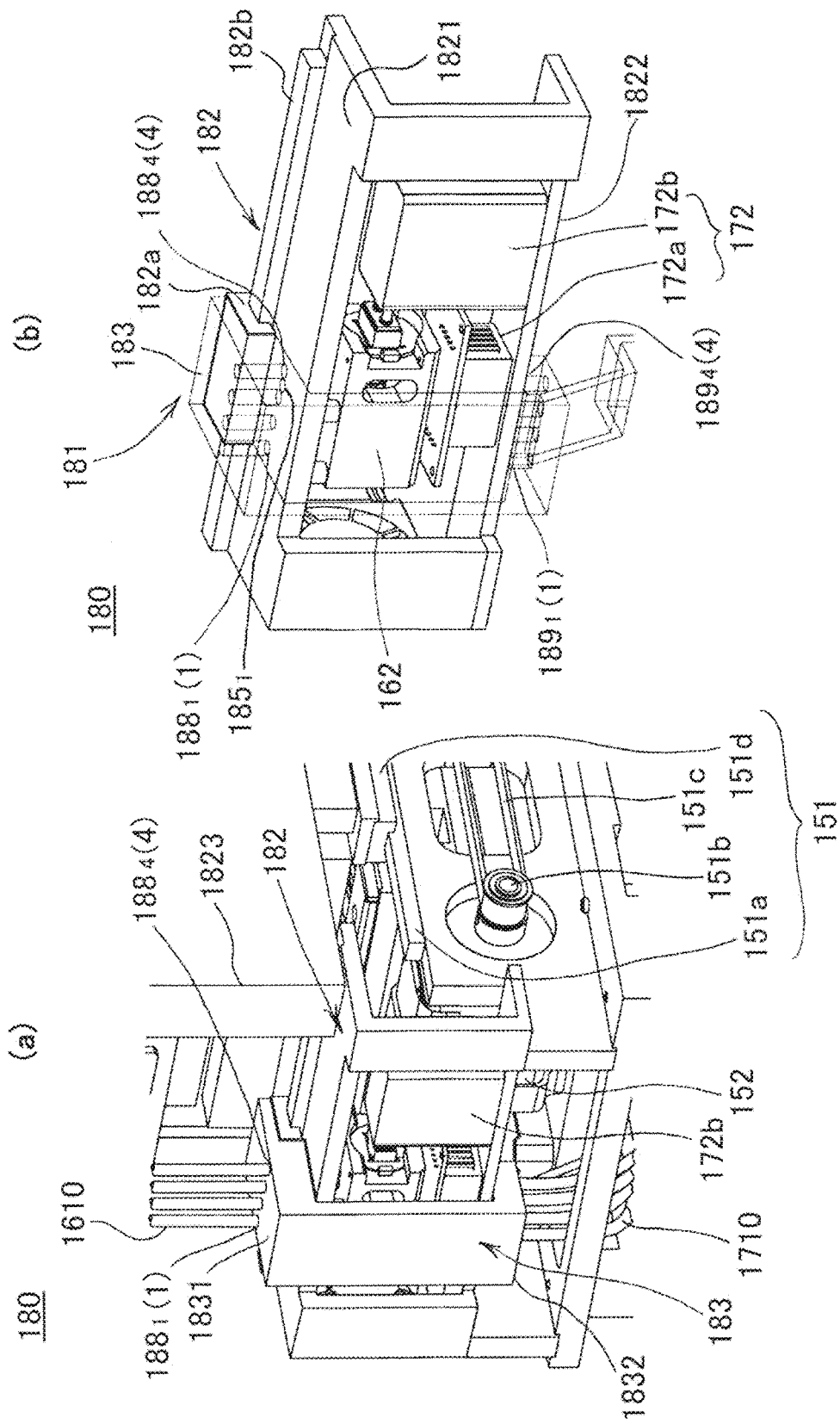
FIG. 22 is a perspective view illustrating an optical measurement unit of the general-purpose optical measuring device illustrated in FIG. 16.

As illustrated in FIG. 22, the optical measurement unit 180 of the general-purpose optical measuring device 111 according to the second embodiment of the present invention is one light source 162, that is, is a wavelength variable light source set so that emission can be performed after absorption measurement, and is optically connected with a first measurement end 185. In addition, the photoelectric conversion unit 172 includes a first photoelectric conversion unit 172a and a second photoelectric conversion unit 172b, and the first photoelectric conversion unit 172a is a plurality of photoelectric conversion units (e.g. line sensor-type spectrophotometer) connected via a spectral device, and is optically connected with the second measurement end by a light guide portion. The first measurement end 185 and the second measurement end correspond to the measurement end pair, and perform measurement of absorbance.

As for a measurement end pair <2>, there is no light source, light is shielded, and the photoelectric conversion unit 172b is a PMT, for example.

The optical measurement unit 180 further includes an irradiation reception pair interlock switching unit 181, and the irradiation reception pair interlock switching unit 181 switches, for the plurality of pairs of irradiation reception pairs, connection or interruption between the emission ends $160_1$ to $160_4$ and the light sources 162, and connection and interruption between the reception ends $170_1$ to $170_4$ and the plurality of photoelectric conversion units 172a and 172b, for each of the irradiation reception pairs, in an interlocked manner, by an unidirectional motion at a predetermined speed, or a reciprocating motion or fluctuation at a predetermined cycle (rotational reciprocating motion at a predetermined angle).

As illustrated in FIG. 22, the irradiation reception pair interlock switching unit 181 includes the connection end array body 183 including a first connection end array surface 1831 and a second connection end array surface 1832 on which a plurality of (4 in this example) pairs of connection end pairs (1) to (4) including the plurality of first connection ends $188_1$ to $188_4$ optically connected with the plurality of emission ends $160_1$ to $160_4$ by the plurality of optical fibers 1610, and the plurality of second connection ends $189_1$ to $189_4$ optically connected with the plurality of reception ends $170_1$ to $170_4$ by the plurality of optical fibers 1710 are arrayed, a measurement end array body 182 including a first measurement end array surface 1821 and a second measurement end array surface 1822 on which a plurality of (2 in this example) pairs of measurement end pairs <1> to <2> (sets (sets having the same subscript numbers) of first measurement ends and second measurement ends) including first measurement ends $185_1$ to $185_2$ (measurement ends other than measurement end $185_1$ are not connected with a light source, and optically interrupted by the first measurement end array surface 1821) connected via the light source 162 and a light guide portion, and a second measurement end connected via the plurality of photoelectric conversion units 172a and 172b, and a light guide portions are arrayed, and switching mechanisms 187 and 184 that moves the connection end array body 183 with respect to the measurement end array body 182 so that the first connection end array surface 1831 and the second connection end array surface 1832, and the first measurement end array surface 1821 and the second measurement end array surface 1822 slide, enables simultaneous connection or interruption between corresponding elements belonging to the connection end pairs (1) to (4) and the measurement end pairs <1> to <2>, and sequentially performs, for each of the one or two or more irradiation reception pairs, connection or interruption between the emission end and the light source, in an interlocked manner with connection and interruption between the reception end and the photoelectric conversion unit. Here, the first measurement end array surface 1821 and the second measurement end array surface 1822 are formed in parallel so as to face as two planes.

Figure 19:
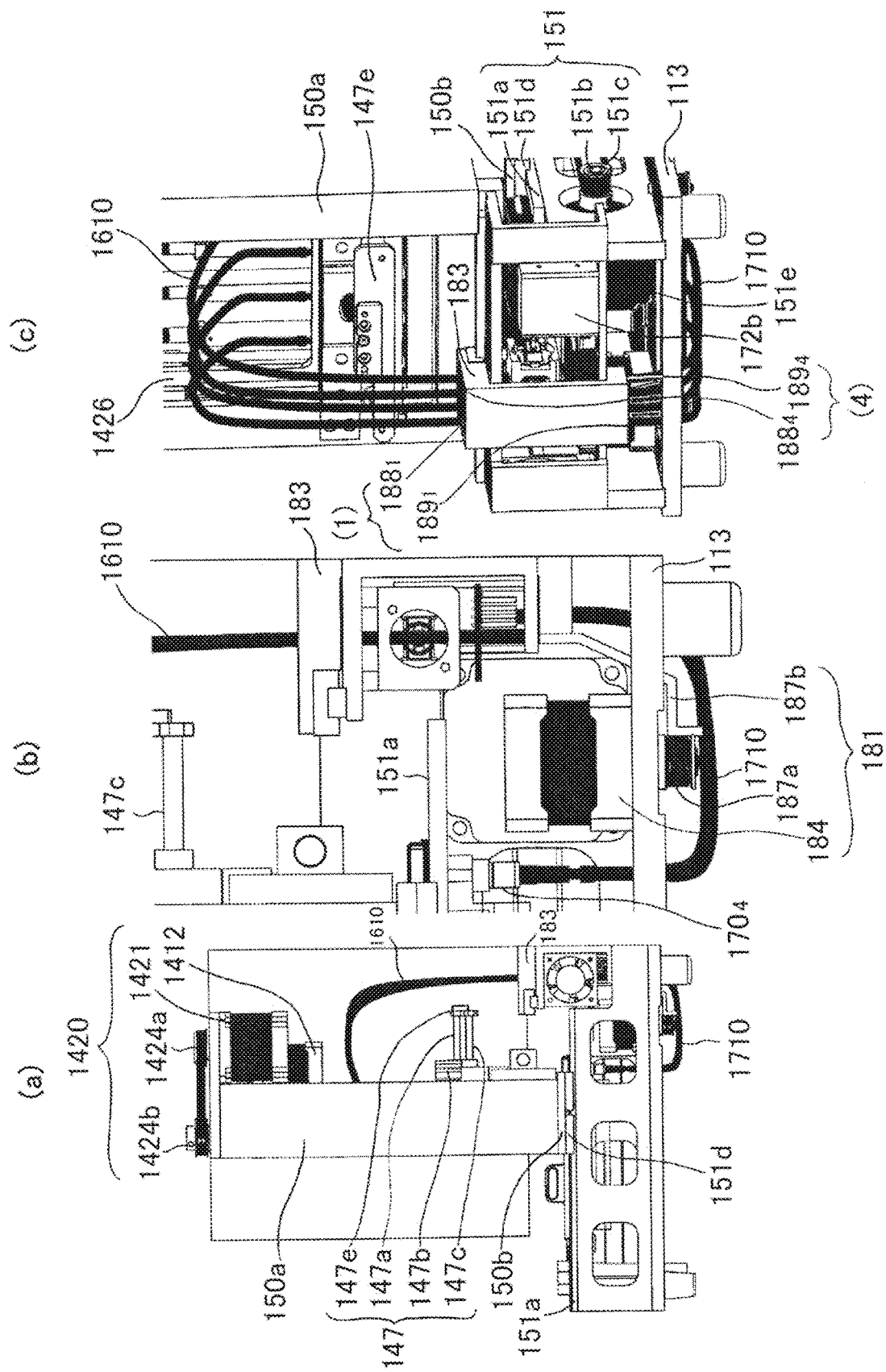
FIG. 19 is a back surface perspective view of the general-purpose optical measuring device illustrated in FIG. 16, and a partially-enlarged perspective view thereof.
Figure 20:
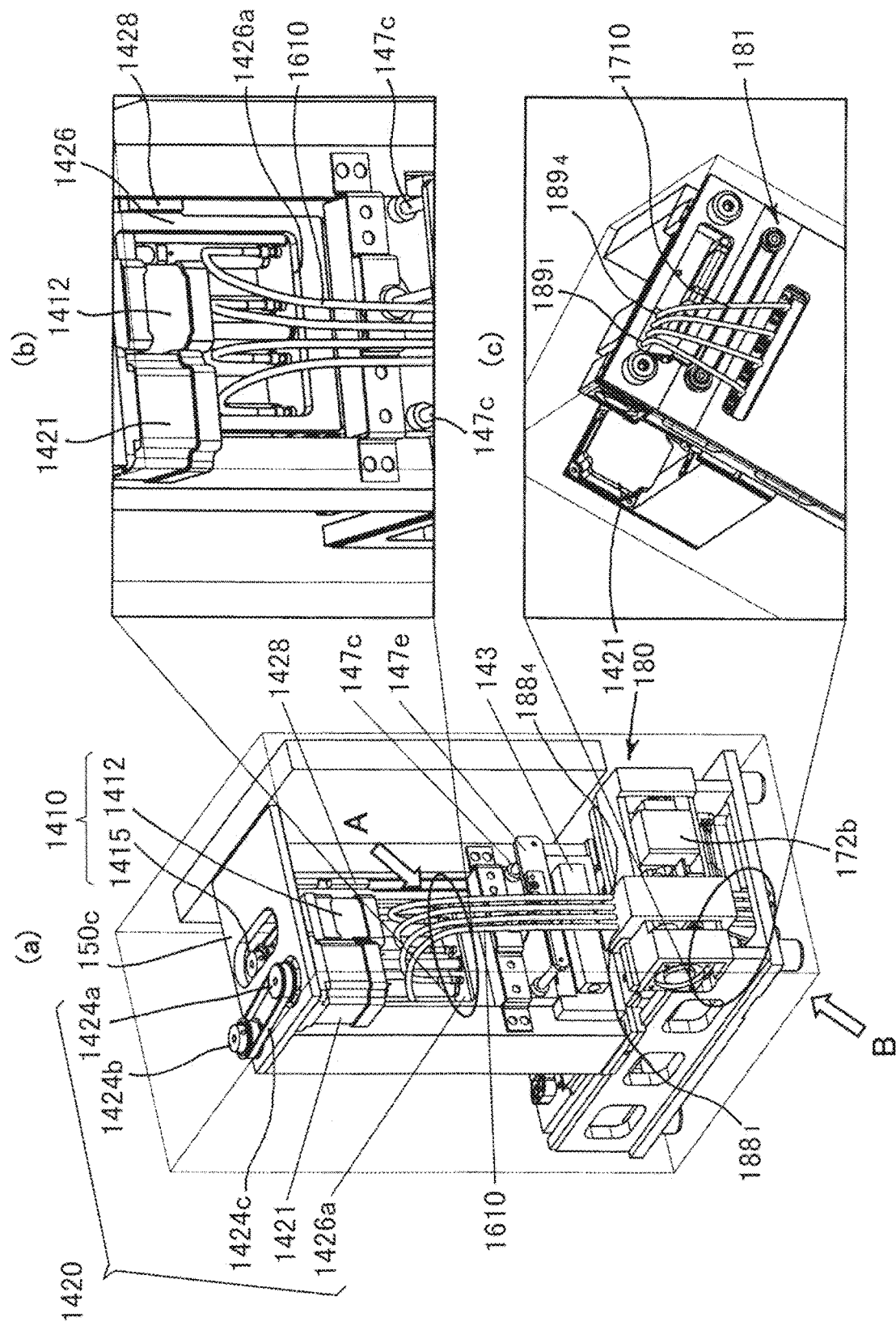
FIG. 20 is an upper side back surface perspective view of the general-purpose optical measuring device illustrated in FIG. 16, and partially-enlarged perspectives thereof toward arrow A and arrow B directions.

In this example, on the first connection end array surface 1831, the first connection end line in which the plurality of first connection ends $188_1$ to $188_4$ are arrayed in a line, and on the second connection end array surface 1832, the second connection end line in which the plurality of second connection ends $189_1$ to $189_4$ are arrayed in a line are formed for each connection end pair at a predetermined distance, and on the first measurement end array surface 1821, the first measurement end line in which the two first measurement ends $185_1$ to $185_2$ are arrayed, and on the second measurement end array surface 1822, the second measurement end line in which the two second measurement ends $186_1$ to $186_2$ are arrayed are formed for each measurement end pair at the predetermined distance. In addition, the respective array routes or directions of the first connection end line, the second connection end line, the first measurement end line, and the second measurement end line coincide with or are parallel to a movement route or direction of the connection end array body, and the first connection end line and the first measurement end line pass through each other, and the second connection end line and the second measurement end line pass through each other. As illustrated in FIG. 19, by the switching mechanisms 187 and 184 coupling a motor 184 and an arm 187b coupled to a timing belt stretched over a pulley 187a rotationally-driven by the motor 184, and traveling along the X-axis direction, the connection end array body 183 travels along the X-axis direction. As illustrated in FIG. 22, the measurement end array body 182 of the irradiation reception pair interlock switching unit 181 is provided with a direct movement guide device, and the movement of the connection end array body 183 is smoothly guided along the X-axis direction. The direct movement guide device includes a guide portion 182a slidingly moving on a rail 182b laid along the X-axis direction of the first measurement end array surface 1821.

Here, the measurement end pair <1> is applied to measurement of absorbance and concentration, and the measurement end pair <2> measures existence or non-existence of or an amount of a target chemical substance labeled with a chemiluminescence, and the first measurement end $185_2$ is not connected with a light source. In addition, the emission ends $160_1$ to $160_n$, the reception ends $170_1$ to $170_n$, and the optical measurement unit 180 correspond to an optical measurement device.

Subsequently, as an operation of the general-purpose optical measuring device 111 according to the present embodiment, for example, the case of performing measurement of immune antibody quantitative measurement (CRP) using the storing unit groups $130_1$ to $130_4$ illustrated in FIG. 21(a) will be described based on FIGS. 16 to 22.

As illustrated in FIG. 21(a), as a specimen obtained from whole blood solution collected from four different dogs that is stored in the sample liquid storing units $1361_1$ to $1361_4$ of the stage 130 of the general-purpose optical measuring device 111, measurement of C responsive protein (CRP) concentration in the dog blood serum is perform using antigen-antibody reaction, and CRP concentration in the blood serum is measured by optically measuring the degree of agglutination of agglutination reaction that corresponds to concentration of CRP serving as antigen of resin latex fixing anti-dog CRP (rabbit and goat) polyclonal antibody. In this example, measurement is performed for liquid obtained by diluting the dog blood serum obtained from the dog whole blood solution serving as a sample that is stored in the sample liquid storing units $1361_1$ to $1361_4$, with normal saline solution. As illustrated in FIG. 21(a), in the liquid storing units $1360_1$ to $1360_4$, absorbance measurement cartridge containers 138a and 138b storing latex slurry fixing the anti-dog CRP (rabbit and goat) polyclonal antibody, buffer fluid, and cleaning liquid are mounted.

In step S51, with respect to the storing unit groups $130_1$ to $130_4$ provided on the stage 130 of the general-purpose optical measuring device 111, in the sample liquid storing units $1361_1$ to $1361_4$, dog blood serum solution is prestored as measurement target chemical substance solution. In addition, the dispensing flow tubes $21_1$ to $21_4$ are stored in the dispensing flow tube storing units $1320_1$ to $1320_4$, and the measurement flow tubes $20_1$ to $20_4$ are stored in the measurement flow tube storing units $1310_1$ to $1310_4$. Furthermore, in liquid storing units $1360_1$ to $1360_4$, resin latex slurry fixing dog CRP polyclonal antibody, buffer fluid, and cleaning liquid are stored.

In step S52, using the nozzle head moving mechanism 151 of the nozzle head 150, the liquid storing units $1360_1$ to $1360_4$ of the storing unit groups $130_1$ to $130_4$, a prepackage film of the reaction containers $1340_1$ to $1340_4$, the boring protruding portions 1231 to 1234, the nozzle moving unit 1420, and the suction discharge mechanism 1410 are further lowered more than the suction and discharge section, and concurrently lowered together with the detachment plate 1450, and thereby sequentially pierced.

Next, by moving the nozzle head 150 using the nozzle head moving mechanism 151 to the upper side of the dispensing flow tube storing units $1320_1$ to $1320_4$, and concurrently lowering the nozzles $140_1$ to $140_4$ using the nozzle moving unit 1420, the flow tubes $21_1$ to $21_4$ are concurrently attached to the nozzles $140_1$ to $140_4$. After concurrently raising the attached flow tubes $21_1$ to $21_4$ by the nozzle moving unit 1420, by positioning to the upper side of the sample liquid storing units $1361_1$ to $1361_4$ using the nozzle head moving mechanism 151, lowering by the nozzle moving unit 1420, sucking a prescribed amount of the dog blood serum solution into the flow tubes $21_1$ to $21_4$ by the suction discharge mechanism 1410, and raising again, the flow tubes $21_1$ to $21_4$ are positioned on the upper side of the reaction containers $1340_1$ to $1340_4$ of the stage 130 by the nozzle head moving mechanism 151.

In step S53, by the nozzle moving unit 1420, the port portion of the flow tubes $21_1$ to $21_4$ is inserted into the reaction containers $1340_1$ to $1340_4$, and 3 µL of the dog blood serum solution is discharged and stored into the container. The flow tubes $21_1$ to $21_4$ are raised again and moved to the upper side of the flow tube storing units $1320_1$ to $1320_4$ by the nozzle head moving mechanism 151, detached by the detachment plate 1450, and instead, the photometric flow tubes $20_1$ to $20_4$ are attached to the nozzles $140_1$ to $140_4$. By the nozzle head moving mechanism 151, the photometric flow tubes $20_1$ to $20_4$ suck buffer fluid and the latex slurry stored in the liquid storing unit of the liquid storing units $1360_1$ to $1360_4$, into the flow tube, transfer and store into the reaction container by the nozzle head moving mechanism 151 and nozzle moving unit 1420, and repeat suction and discharge by the flow tube, and the sample liquid and the latex slurry are thereby mixed and agitated at predetermined temperature. The mixed liquid is sucked by the photometric flow tubes $20_1$ to $20_4$, and in the sucked state, the photometric flow tubes $20_1$ to $20_4$ are moved to the upper side of the photometric containers $350_1$ to $350_4$ by the nozzle head moving mechanism 151 and the nozzle moving unit 1420.

In step S54, by the nozzle moving unit 1420, the port portion $20a$ of the flow tubes $20_1$ to $20_4$ is brought into contact with the bottom portion of the photometric containers $350_1$ to $350_4$, and the heating walls $147_1$ to $147_4$ of the isothermal means 147 is brought closer to the photometric flow tubes $20_1$ to $20_4$, and in a state where temperature is kept at predetermined temperature such as, for example, 37° C., the connection end array body 183 is moved in the X-axis direction with respect to the measurement end array body 182, and corresponding elements of the connection end pairs (1) to (4) optically connected with the irradiation reception pair and the measurement end pair <2> are optically connected. This state is immobilized, and by the white light source 162 by a deuterium lamp, for example, measurement light mainly containing wavelength of 658 nm is emitted from the emission ends $160_1$ to $160_4$, intensity of transmitted light received at the reception ends $170_1$ to $170_4$ is converted into intensity data as an electrical signal by the photoelectric conversion unit 172, and absorbance is measured for every the ten seconds as a measurement cycle (a reciprocating motion of the connection end array body is not performed, but corresponds to a predetermined cycle being a cycle of connection or interruption between the connection end pair and the measurement end pair).

In step S55, the photometric analysis unit serving as the control unit calculates absorbance based on the intensity data. By measuring last absorbance (or absorbance at a prescribed time) using a spectrophotometer, concentration of a measurement target object can be estimated. The measurement has been repeatedly performed at a predetermined cycle (1 second) while moving at the predetermined speed of 10 cm in 1 second, for example.

In the above description, a case where the emission end is provided on the nozzle, and the reception end is provided on the stage has been specifically described. Nevertheless, the present invention is not limited to this case, and an emission end can also be provided on a stage, and a reception end can also be provided on a nozzle. In addition, the description has been given only of a case where eight or four nozzles are provided, and eight or four storing unit groups are provided, but the number is not limited to eight or four.

Furthermore, the shapes, structures, and functions of the components described above are not limited to examples described in the embodiments. For example, the above description has been given of a case where a nozzle head moving mechanism uses a timing belt, and a nozzle moving unit uses a ball screw, but the timing belt and the ball screw can be arbitrarily replaced, and similar configurations can be obtained by using another mechanism.

INDUSTRIAL APPLICABILITY

The present invention relates to a general-purpose optical measuring device and a method of the same. The present invention relates to a field requiring handling of biological macromolecule such as gene, immune system, amino acid, protein, and sugar, and biological low molecular, and to a variety of fields such as an industrial field, food, agriculture, an agricultural field such as fish processing, a pharmaceutical field, a medical field such as sanitation, health, immunity, illness, and heredity, and a scientific field such as a chemistry or biology, for example. The present invention is especially effective in the case of consecutively executing, in a predetermined order, a series of processes that uses a number of reagents and substances.

REFERENCE SIGNS LIST 10, 11, 111 general-purpose optical measuring device
$2_1$ to $2_n$ flow tube
$20_1$ to $20_n$ dispensing flow tube
$21_1$ to $21_n$ photometric flow tube
$22_1$ to $22_n$ minute amount dispensing flow tube
$23_1$ to $23_n$ boring chip
$123_1$ to $123_n$ boring protruding portion
25 sealed lid
3, 30, 130 stage
$3_1$ to $3_n$, $30_1$ to $30_n$, $130_1$ to $130_n$ accommodation unit group $31_1$ to $31_n$, $310_1$ to $310_n$, $1310_1$ to $1310_n$ photometric flow tube storing unit
$32_1$ to $32_n$, $320_1$ to $320_n$, $1320_1$ to $1320_n$ dispensing flow tube storing unit
$321_1$ to $321_n$ minute amount dispensing flow tube storing unit
$322_1$ to $322_n$ boring chip storing unit
$33_1$ to $33_n$, $330_1$ to $330_n$ sealed lid storing unit
$34_1$ to $34_n$, $340_1$ to $340_n$, $1340_1$ to $1340_n$ reaction container
35, $350_1$ to $350_n$ photometric container
$4_1$ to $4_n$, $40_1$ to $40_n$, $140_1$ to $140_n$ nozzle
41, 410, 141 suction and discharge mechanism
1416 dispensing cylinder
45, 450(1450) detachment mechanism (detachment plate)
5, 50, 150 nozzle head
51, 151 nozzle head moving mechanism
$6_1$ to $6_n$, $60_1$ to $60n$, $160_1$ to $160_n$ emission end (optical measurement device)
61, 71, 610, 710, 1610, 1710 light guide path (optical measurement device)
62, 620, 162 light source (optical measurement device)
$7_1$ to $7_n$, $70_1$ to $70n$, $170_1$ to $170_n$ reception end (optical measurement device)
72, 720, 172 photoelectric conversion unit (optical measurement device)
8, 80, 180 optical measurement unit (optical measurement device)
81, 181 irradiation reception pair interlock switching unit (optical measurement device)
9 CPU+ program+memory
93 photometric analysis unit

The invention claimed is:

1. A general-purpose optical measuring device comprising:
a photometric content designation unit configured to designate photometric content for a chemical substance solution serving as a target of any of at least: 1) measurement of an amplification amount by a nucleic acid amplification method; 2) detection or quantitative measurement by a nucleic acid detection method, an immunoassay method or an enzyme method; or 3) measurement of concentration or absorbance, wherein designation of the photometric content comprises determination of at least one of a number of samples comprising the chemical substance solution and a content of the samples comprising the chemical substance solution based on at least one instruction received at an operation panel prior to an optical measurement step;
one or two or more irradiation reception pairs each including an emission end that can emit measurement light defined by the designated photometric content, and a reception end that can receive at least light emitted from the emission end;
one or two or more photometric containers that can store the chemical substance solution, and include a bottom portion having a formed translucent region translucent to the measurement light;
one or two or more nozzles communicated with a suction discharge mechanism configured to perform suction and discharge of gas;
one or two or more flow tubes each having, at a lower end, a port portion that can be inserted into the photometric container, and being detachably attached to the nozzle at an upper end;
an optical measurement unit configured to supply measurement light to the emission end, and obtain intensity of light received at the reception end; and
a control unit configured to control, based on the designated photometric content, at least the suction discharge mechanism and the optical measurement unit, suck and hold the chemical substance solution into the flow tube attached to the nozzle, or store the chemical substance solution into the photometric container, and derive a physicochemical character or numerical value that is related to the chemical substance solution, based on intensity of light received at the reception end,
wherein one element of the irradiation reception pair is provided on the nozzle or the suction discharge mechanism, and the translucent region of the photometric container is installed on an upper side of the other element of the irradiation reception pair, and the port portion of the flow tube attached to the nozzle is provided to be able to be positioned so as to be inserted into the photometric container and to let through a vertical common axis line passing through in common an end surface of the emission end and an end surface of the reception end; and
wherein the optical measurement unit includes:
one or two or more light sources;
one or two or more photoelectric conversion units; and
an irradiation reception pair interlock switching unit comprising a connection end array body and a measurement end array body, wherein relative movement of the connection end array body and the measurement end array body is configured to switch, based on the designated photometric content, for the one pair or two pairs or more irradiation reception pairs, connection or interruption between the emission end and the one or two or more light sources, and connection and interruption between the reception end and the one or two or more photoelectric conversion units, for each of the irradiation reception pairs in an interlocked manner;
wherein the irradiation reception pair interlock switching unit includes, for the emission end and the reception end belonging to each of the one pair or two pairs or more irradiation reception pairs:
one pair or two pairs or more connection end pairs including a first connection end optically connected with the emission end, and a second connection end optically connected with the reception end,
one pair or two pairs or more measurement end pairs including a first measurement end optically connected with zero, one or two or more light sources, and a second measurement end optically connected with one or two or more photoelectric conversion units that are combined based on the designated photometric content,
the connection end array body having a connection end array surface on which the one pair or two pairs or more connection end pairs are arrayed,
the measurement end array body having a measurement end array surface on which the one pair or two pairs or more measurement end pairs are arrayed, and
a switching mechanism configured to relatively move the connection end array body and the measurement end array body so that the connection end array surface and the measurement end array surface slide, enable simultaneous connection or interruption between corresponding elements belonging to the connection end pair and the measurement end pair, and sequentially perform, for each of the one pair or two pairs or more irradiation reception pairs, connection or interruption between the emission end and the light source, in an interlocked manner with connection and interruption between the reception end and the photoelectric conversion unit, based on the designated photometric content.

2. The general-purpose optical measuring device according to claim 1, wherein the other element of the irradiation reception pair is provided on a stage,
a nozzle moving mechanism that makes the nozzle relatively movable with respect to the stage is included, and
the control unit derives a physicochemical character or numerical value related to the chemical substance solution, by controlling at least the nozzle moving mechanism, the suction discharge mechanism, and the optical measurement unit.

3. The general-purpose optical measuring device according to claim 1, further comprising a temperature control unit,
wherein the photometric container is provided so as to be temperature-controllable by the temperature control unit, and an opening portion of the photometric container can fit with the nozzle directly or indirectly.

4. The general-purpose optical measuring device according to claim 1, wherein a carrier that can be measured from lower outside, and to which a bound substance bondable with the chemical substance of the chemical substance solution is fixed, is sealed into or stored in the flow tube or the photometric container.

5. The general-purpose optical measuring device according to claim 1, wherein one or two or more cartridge containers at least including the photometric container, a flow tube storing unit storing the flow tube so as to be attachable to the nozzle, and a sealed lid storing unit storing a sealed lid that is translucent to the measurement light, and is configured to fit with the opening portion of the photometric container to seal the photometric container, so as to be attachable to the nozzle are provided to be mountable on the stage.

6. The general-purpose optical measuring device according to claim 5, wherein the photometric content designation unit can designate, for any one solution selected as a measurement target chemical substance solution from among nucleic acid solution, protein solution including immune substance solution, amino acid solution, fat solution, or sugar chain solution, at least one photometric content selected from among the absorbance, the concentration, existence or non-existence of a target substance, and an amount of the target substance,
at least one of the one or two or more light sources is a white light source that emits white light as measurement light, and at least one is a light source that can emit light with wavelength that has been designated as measurement light,
a part of the one or two or more photoelectric conversion units are a plurality of photoelectric conversion units connected via one spectral device, and at least one is a photoelectric conversion unit connected via a bandpass filter that the fluorescence can pass through,
when the photometric content of the absorbance or concentration is designated for the measurement target chemical substance solution by the photometric content designation unit,
the irradiation reception pair interlock switching unit switches connection and interruption between the emission end of the one pair or two pairs or more irradiation reception pairs and the white light source, and connection and interruption of the reception end with a plurality of photoelectric conversion units connected via one spectral device, in an interlocked manner,
when the photometric content of existence or non-existence or an amount of a target substance in which a fluorescence substance is used is designated for the measurement target chemical substance solution by the photometric content designation unit,
the irradiation reception pair interlock switching unit switches connection and interruption between the emission end of the one pair or two pairs or more irradiation reception pairs and the light source that emits excitation light for exciting the fluorescence, and connection and interruption of the reception end with a photoelectric conversion unit via a bandpass filter that the fluorescence can pass through, in an interlocked manner, and
when the photometric content of existence or non-existence or an amount of a target substance labeled with a chemiluminescence substance is designated for the measurement target chemical substance solution by the photometric content designation unit,
the irradiation reception pair interlock switching unit switches interruption of the emission end of the one pair or two pairs or more irradiation reception pairs from the one or two or more light sources, and connection and interruption of the reception end with the photoelectric conversion unit, in an interlocked manner.

7. A general-purpose optical measuring device comprising:
a photometric content designation unit configured to designate photometric content for a chemical substance solution serving as a target of any of at least: 1) measurement of an amplification amount by a nucleic acid amplification method; 2) detection or quantitative measurement by a nucleic acid detection method, an immunoassay method or an enzyme method; or 3) measurement of concentration or absorbance, wherein designation of the photometric content comprises determination of at least one of a number of samples comprising the chemical substance solution and a content of the samples comprising the chemical substance solution based on at least one instruction received at an operation panel prior to an optical measurement step;
one or two or more irradiation reception pairs each including an emission end that can emit measurement light defined by the designated photometric content, and a reception end that can receive at least light emitted from the emission end;
one or two or more photometric containers that can store the chemical substance solution, and include a bottom portion having a formed translucent region translucent to the measurement light;
one or two or more nozzles communicated with a suction discharge mechanism configured to perform suction and discharge of gas;
one or two or more flow tubes each having, at a lower end, a port portion that can be inserted into the photometric container, and being detachably attached to the nozzle at an upper end;
an optical measurement unit configured to supply measurement light to the emission end, and obtain intensity of light received at the reception end; and
a control unit configured to control, based on the designated photometric content, at least the suction discharge mechanism and the optical measurement unit, suck and hold the chemical substance solution into the flow tube attached to the nozzle, or store the chemical substance solution into the photometric container, and derive a physicochemical character or numerical value that is related to the chemical substance solution, based on intensity of light received at the reception end, wherein one element of the irradiation reception pair is provided on the nozzle or the suction discharge mechanism, and the translucent region of the photometric container is installed on an upper side of the other element of the irradiation reception pair, and the port portion of the flow tube attached to the nozzle is provided to be able to be positioned so as to be inserted into the photometric container and to let through a vertical common axis line passing through in common an end surface of the emission end and an end surface of the reception end, wherein the optical measurement unit includes:
one or two or more light sources;
one or two or more photoelectric conversion units; and
an irradiation reception pair interlock switching unit comprising a connection end array body and a measurement end array body, wherein relative movement of the connection end array body and the measurement end array body is configured to switch, based on the designated photometric content, for the one pair or two pairs or more irradiation reception pairs, connection or interruption between the emission end and the one or two or more light sources, and connection and interruption between the reception end and the one or two or more photoelectric conversion units, for each of the irradiation reception pairs in an interlocked manner, wherein the photometric content designation unit can designate, for any one solution selected as a measurement target chemical substance solution from among nucleic acid solution, protein solution including immune substance solution, amino acid solution, fat solution, or sugar chain solution, at least one photometric content selected from among the absorbance, the concentration, existence or non-existence of a target substance, and an amount of the target substance, at least one of the one or two or more light sources is a white light source that emits white light as measurement light, and at least one is a light source that can emit light with wavelength that has been designated as measurement light, a part of the one or two or more photoelectric conversion units are a plurality of photoelectric conversion units connected via one spectral device, and at least one is a photoelectric conversion unit connected via a bandpass filter that the fluorescence can pass through, when the photometric content of the absorbance or concentration is designated for the measurement target chemical substance solution by the photometric content designation unit, the irradiation reception pair interlock switching unit switches connection and interruption between the emission end of the one pair or two pairs or more irradiation reception pairs and the white light source, and connection and interruption of the reception end with a plurality of photoelectric conversion units connected via one spectral device, in an interlocked manner, when the photometric content of existence or non-existence or an amount of a target substance in which a fluorescence substance is used is designated for the measurement target chemical substance solution by the photometric content designation unit, the irradiation reception pair interlock switching unit switches connection and interruption between the emission end of the one pair or two pairs or more irradiation reception pairs and the light source that emits excitation light for exciting the fluorescence, and connection and interruption of the reception end with a photoelectric conversion unit via a bandpass filter that the fluorescence can pass through, in an interlocked manner, and when the photometric content of existence or non-existence or an amount of a target substance labeled with a chemiluminescence substance is designated for the measurement target chemical substance solution by the photometric content designation unit, the irradiation reception pair interlock switching unit switches interruption of the emission end of the one pair or two pairs or more irradiation reception pairs from the one or two or more light sources, and connection and interruption of the reception end with the photoelectric conversion unit, in an interlocked manner.

8. The general-purpose optical measuring device according to claim 7, further comprising a temperature control unit,
wherein the photometric container is provided so as to be temperature-controllable by the temperature control unit, and an opening portion of the photometric container can fit with the nozzle directly or indirectly.

9. The general-purpose optical measuring device according to claim 7, wherein a carrier that can be measured from lower outside, and to which a bound substance bondable with the chemical substance of the chemical substance solution is fixed, is sealed into or stored in the flow tube or the photometric container.

10. The general-purpose optical measuring device according to claim 7, wherein one or two or more cartridge containers at least including the photometric container, a flow tube storing unit storing the flow tube so as to be attachable to the nozzle, and a sealed lid storing unit storing a sealed lid that is translucent to the measurement light, and is configured to fit with the opening portion of the photometric container to seal the photometric container, so as to be attachable to the nozzle are provided to be mountable on the stage.

11. A general-purpose optical measurement method comprising:
a photometric content designation step of designating photometric content for a chemical substance solution serving as a target of any of at least: 1) measurement of an amplification amount by a nucleic acid amplification method; 2) detection or quantitative measurement by a nucleic acid detection method, an immunoassay method or an enzyme method; or 3) measurement of concentration or absorbance, wherein the designation step comprises determination of at least one of a number of samples comprising the chemical substance solution and a content of the samples comprising the chemical substance solution based on at least one instruction received at an operation panel prior to an optical measurement step;
a holding storage step of, for one or two or more irradiation reception pairs each including one or two or more emission ends that can emit measurement light defined by the designated photometric content, and a reception end that can receive at least light emitted from the emission end, one element of the irradiation reception pair being provided on one or two or more nozzles or a suction discharge mechanism, a photometric container including a bottom portion having a formed translucent region translucent to the measurement light being installed on an upper side of the other one element of the irradiation reception pair, based on the designated photometric content, sucking and holding the chemical substance solution into a flow tube having, at a lower end, a port portion, and being detachably attached to the nozzle at an upper end, using a suction discharge mechanism, or storing the chemical substance solution into the photometric container;

the optical measurement step of receiving light generated by positioning the port portion of the flow tube or the nozzle on an upper portion of the other element of the irradiation reception pair so as to be inserted into the photometric container and to let through a vertical common axis line passing through in common an end surface of the emission end and a reception end surface, and emitting the measurement light from the emission end along a vertical direction through an inside of the flow tube or an inside of the photometric container, or light generated inside the flow tube or inside the photometric container, at the reception end, and obtaining intensity of light; and a photometry analysis step of deriving the physicochemical character or numerical value related to the chemical substance solution, based on intensity of light received at the reception end;

wherein the optical measurement step includes an irradiation reception pair interlock switching step of switching, based on the designated photometric content, for the one pair or two pairs or more irradiation reception pairs, connection or interruption between the emission end and the one or two or more light sources, and connection and interruption between the one or two or more reception ends and the one or two or more photoelectric conversion units, for each of the irradiation reception pairs in an interlocked manner, and wherein the optical measurement step includes a switching step of sequentially performing, for the emission end and the reception end belonging to each of the one pair or two pairs or more irradiation reception pairs, by simultaneous connection or interruption between corresponding elements belonging to one pair or two pairs or more connection end pairs including a first connection end optically connected with the emission end, and a second connection end optically connected with the reception end, and one pair or two pairs or more measurement end pairs including a first measurement end optically connected with zero, one or two or more light sources, and a second measurement end optically connected with one or two or more photoelectric conversion units that are combined based on the designated photometric content, for each of the one pair or two pairs or more irradiation reception pairs, connection or interruption between the emission end and the light source, in an interlocked manner with connection and interruption between the reception end and the photoelectric conversion unit.

12. The general-purpose optical measurement method according to claim 11, wherein, in the optical measurement step, the other element of the irradiation reception pair is provided on the stage, and by a nozzle moving mechanism that makes the nozzle relatively-movable with respect to the stage, the port portion of the flow tube or the nozzle is positioned on the upper portion of the other element of the irradiation reception pair.

13. The general-purpose optical measurement method according to claim 11, wherein the holding storage step sucks the chemical substance solution stored in the photometric container into the flow tube using a suction discharge mechanism while leaving a part of the chemical substance solution, and the optical measurement step positions the port portion of the flow tube on the upper portion of the emission end or the reception end by bringing the port portion of the flow tube into contact with the translucent region of the bottom portion, and emits the measurement light from the emission end along the vertical direction through an inside of the flow tube.

14. The general-purpose optical measurement method according to claim 11, in the optical measurement step, the photometric container is temperature-controlled by a temperature control unit, and the opening portion is fitted with the nozzle directly or indirectly.

15. The general-purpose optical measurement method according to claim 11, wherein the flow tube is provided so as to be shielded from outside light, the lower end portion of the flow tube can be inserted or loosely inserted into the photometric container from the above, and the optical measurement step moves the flow tube onto the photometric container, and in a state where the lower end portion of the flow tube is inserted or loosely inserted into the photometric container to bring the port portion into contact with the bottom portion, emits the measurement light from the emission end in the vertical direction through the flow tube.

16. A general-purpose optical measurement method comprising:

a photometric content designation step of designating photometric content for a chemical substance solution serving as a target of any of at least: 1) measurement of an amplification amount by a nucleic acid amplification method; 2) detection or quantitative measurement by a nucleic acid detection method, an immunoassay method or an enzyme method; or 3) measurement of concentration or absorbance, wherein the designation step comprises determination of at least one of a number of samples comprising the chemical substance solution and a content of the samples comprising the chemical substance solution based on at least one instruction received at an operation panel prior to an optical measurement step;

a holding storage step of, for one or two or more irradiation reception pairs each including one or two or more emission ends that can emit measurement light defined by the designated photometric content, and a reception end that can receive at least light emitted from the emission end, one element of the irradiation reception pair being provided on one or two or more nozzles or a suction discharge mechanism, a photometric container including a bottom portion having a formed translucent region translucent to the measurement light being installed on an upper side of the other one element of the irradiation reception pair, based on the designated photometric content, sucking and holding the chemical substance solution into a flow tube having, at a lower end, a port portion, and being detachably attached to the nozzle at an upper end, using a suction discharge mechanism, or storing the chemical substance solution into the photometric container;

the optical measurement step of receiving light generated by positioning the port portion of the flow tube or the nozzle on an upper portion of the other element of the irradiation reception pair so as to be inserted into the photometric container and to let through a vertical common axis line passing through in common an end surface of the emission end and a reception end surface, and emitting the measurement light from the emission end along a vertical direction through an inside of the flow tube or an inside of the photometric container, or light generated inside the flow tube or inside the photometric container, at the reception end, and obtaining intensity of light; and a photometry analysis step of deriving the physicochemical character or numerical value related to the chemical substance solution, based on intensity of light received at the reception end, wherein the optical measurement step includes an irradiation reception pair interlock switching step of switching, based on the designated photometric content, for the one pair or two pairs or more irradiation reception pairs, connection or interruption between the emission end and the one or two or more light sources, and connection and interruption between the one or two or more reception ends and the one or two or more photoelectric conversion units, for each of the irradiation reception pairs in an interlocked manner, and wherein the photometric content designation step designates, for any one solution selected as a measurement target chemical substance solution from among nucleic acid solution, protein solution including immune substance solution, amino acid solution, fat solution, or sugar chain solution, at least one photometric content selected from among the absorbance, the concentration, existence or non-existence of a target substance, and an amount of the target substance, when the photometric content designation step designates, for the measurement target the chemical substance solution, the photometric content of the absorbance or concentration, the irradiation reception pair interlock switching step switches connection and interruption between the emission end of the one pair or two pairs or more irradiation reception pairs and the white light source, and connection and interruption of the reception end with a plurality of photoelectric conversion units connected via one spectral device, in an interlocked manner, when the photometric content designation step designates, for the measurement target chemical substance solution, the photometric content of existence or non-existence or an amount of a target substance in which a fluorescence substance is used, the irradiation reception pair interlock switching step switches connection and interruption between the emission end of the one pair or two pairs or more irradiation reception pairs and the light source that emits excitation light for exciting the fluorescence, and connection and interruption of the reception end with a photoelectric conversion unit via a bandpass filter that the fluorescence can pass through, in an interlocked manner, and when the photometric content designation step designates, for the measurement target chemical substance solution, the photometric content of existence or non-existence or an amount of a target substance labeled with a chemiluminescence substance, the irradiation reception pair interlock switching step switches interruption of the emission end of the one pair or two pairs or more irradiation reception pairs from the one or two or more light sources, and connection and interruption of the reception end with the photoelectric conversion unit, in an interlocked manner.

17. An optical measurement device comprising:
a photometric content designation unit configured to designate photometric content for chemical substance solution serving as a target of any of at least: 1) measurement of an amplification amount by a nucleic acid amplification method; 2) detection or quantitative measurement by a nucleic acid detection method, an immunoassay method or an enzyme method; or 3) measurement of concentration or absorbance, wherein designation of the photometric content comprises determination of at least one of a number of samples comprising the chemical substance solution and a content of the samples comprising the chemical substance solution based on at least one instruction received at an operation panel prior to an optical measurement step;

one pair or two pairs or more irradiation reception pairs each including an emission end that can emit measurement light defined by the designated photometric content, and a reception end that can receive at least light emitted from the emission end; and an optical measurement unit configured to supply measurement light to the emission end, and obtain intensity of light received at the reception end, wherein the optical measurement unit includes:
one or two or more light sources;
one or two or more photoelectric conversion units; and
an irradiation reception pair interlock switching unit comprising a connection end array body and a measurement end array body, wherein relative movement of the connection end array body and the measurement end array body is configured to switch, based on the designated photometric content, for the one pair or two pairs or more irradiation reception pairs, connection or interruption between the emission end and the one or two or more light sources, and connection and interruption between the reception end and the one or two or more photoelectric conversion units, for each of the irradiation reception pairs in an interlocked manner.

* * * * *